(12) United States Patent
Koo et al.

(10) Patent No.: US 11,972,065 B2
(45) Date of Patent: Apr. 30, 2024

(54) METHOD AND APPARATUS FOR PROVIDING INTERFACE TO CONTROL EXTERNAL DEVICE

(71) Applicant: SAMSUNG ELECTRONICS CO., LTD., Suwon-si (KR)

(72) Inventors: Bonheon Koo, Suwon-si (KR); Seoyoung Ko, Suwon-si (KR); Kyoungae Kim, Suwon-si (KR); Hyungjoo Nam, Suwon-si (KR); Semin Park, Suwon-si (KR); Sooah Park, Suwon-si (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/122,290

(22) Filed: Mar. 16, 2023

(65) Prior Publication Data

US 2023/0288991 A1    Sep. 14, 2023

Related U.S. Application Data

(63) Continuation of application No. PCT/KR2023/003178, filed on Mar. 8, 2023.

(30) Foreign Application Priority Data

Mar. 8, 2022   (KR) .................. 10-2022-0029185
Mar. 11, 2022  (KR) .................. 10-2022-0030609

(51) Int. Cl.
*G06F 3/03*       (2006.01)
*G06F 3/04842*    (2022.01)
(Continued)

(52) U.S. Cl.
CPC ............. *G06F 3/03* (2013.01); *G06F 3/04842* (2013.01); *G16Y 10/75* (2020.01); *G16Y 20/20* (2020.01); *G16Y 40/30* (2020.01)

(58) Field of Classification Search
CPC ....... G06F 3/03; G06F 3/04842; G16Y 40/30; G16Y 20/20; G16Y 10/75
(Continued)

(56) References Cited

U.S. PATENT DOCUMENTS 10,732,827 B2    8/2020  Han et al.
2003/0197740 A1* 10/2003 Reponen ............... G06F 3/0362
                                                 715/810

(Continued)

FOREIGN PATENT DOCUMENTS

KR   10-2017-0041601    4/2017
KR   10-2017-0089146    8/2017
(Continued)

OTHER PUBLICATIONS

Search Report dated May 30, 2023 in International Patent Application No. PCT/KR2023/003178.
(Continued)

*Primary Examiner* — Mark Edwards
(74) *Attorney, Agent, or Firm* — Nixon & Vanderhye, P.C.

(57) ABSTRACT

An example electronic device may include a display module, a communication module, a physical input device, and a processor. The processor may detect a trigger related to external device control from the electronic device and identify a capability to be controlled by the external device, based on the detection of the trigger. The processor may change a first function configured to cause a designated physical input device of the electronic device to operate, to a second function related to control of the identified capa-
(Continued)

bility of the external device and control the capability of the external device on the basis of detection of a user input through the physical input device.

18 Claims, 40 Drawing Sheets

(51) Int. Cl.
  *G16Y 10/75* (2020.01)
  *G16Y 20/20* (2020.01)
  *G16Y 40/30* (2020.01)
(58) Field of Classification Search
  USPC .......................................................... 345/156
  See application file for complete search history.

(56) References Cited

U.S. PATENT DOCUMENTS

| | | | |
|---|---|---|---|
| 2016/0323863 A1 | 11/2016 | Park et al. | |
| 2017/0105095 A1 | 4/2017 | Um et al. | |
| 2018/0059716 A1* | 3/2018 | Cronin | G06F 1/163 |
| 2018/0246639 A1* | 8/2018 | Han | G06F 1/1684 |
| 2020/0084060 A1 | 3/2020 | Bang et al. | |
| 2021/0192933 A1 | 6/2021 | Sohn et al. | |
| 2021/0314229 A1 | 10/2021 | Du et al. | |
| 2021/0329073 A1 | 10/2021 | Sharma et al. | |

FOREIGN PATENT DOCUMENTS

| | | |
|---|---|---|
| KR | 10-2017-0092379 A | 8/2017 |
| KR | 10-1770156 | 8/2017 |
| KR | 10-2018-0097977 | 9/2018 |
| KR | 10-1914604 | 11/2018 |
| KR | 10-2019-0139773 | 12/2019 |
| KR | 10-2248094 | 5/2021 |

OTHER PUBLICATIONS

Written Opinion dated May 30, 2023 in International Patent Application No. PCT/KR2023/003178.

* cited by examiner

FIG. 11A
FIG. 11B
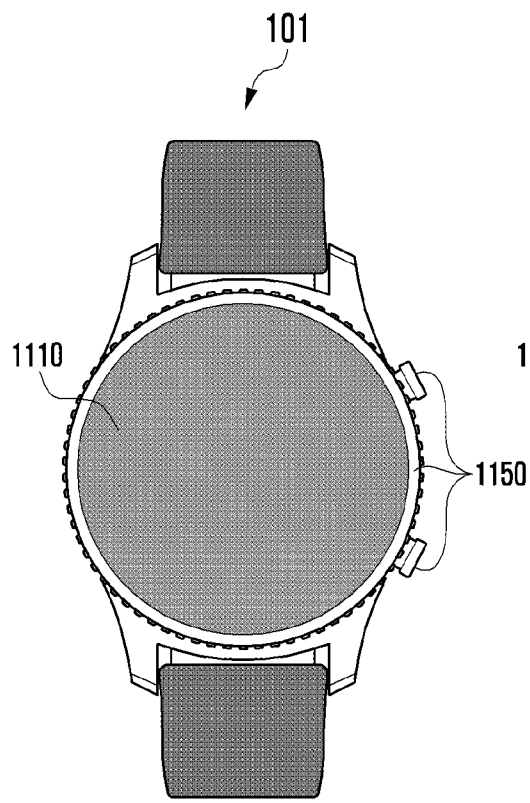
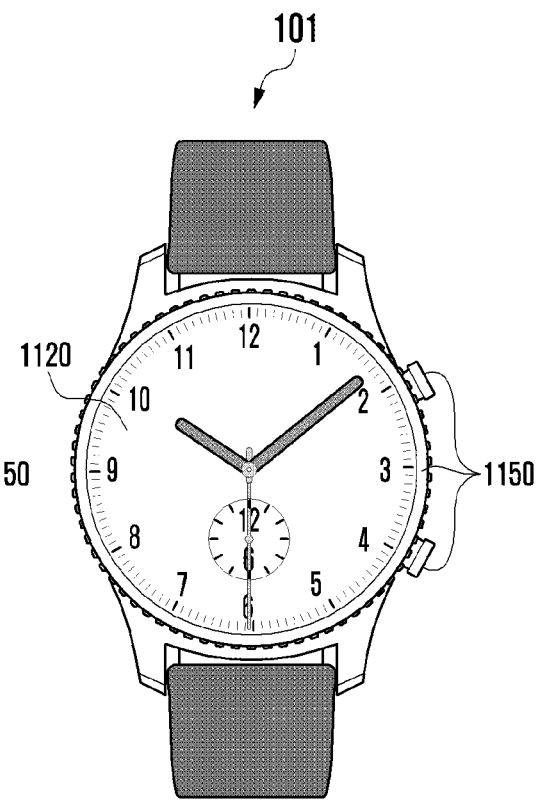

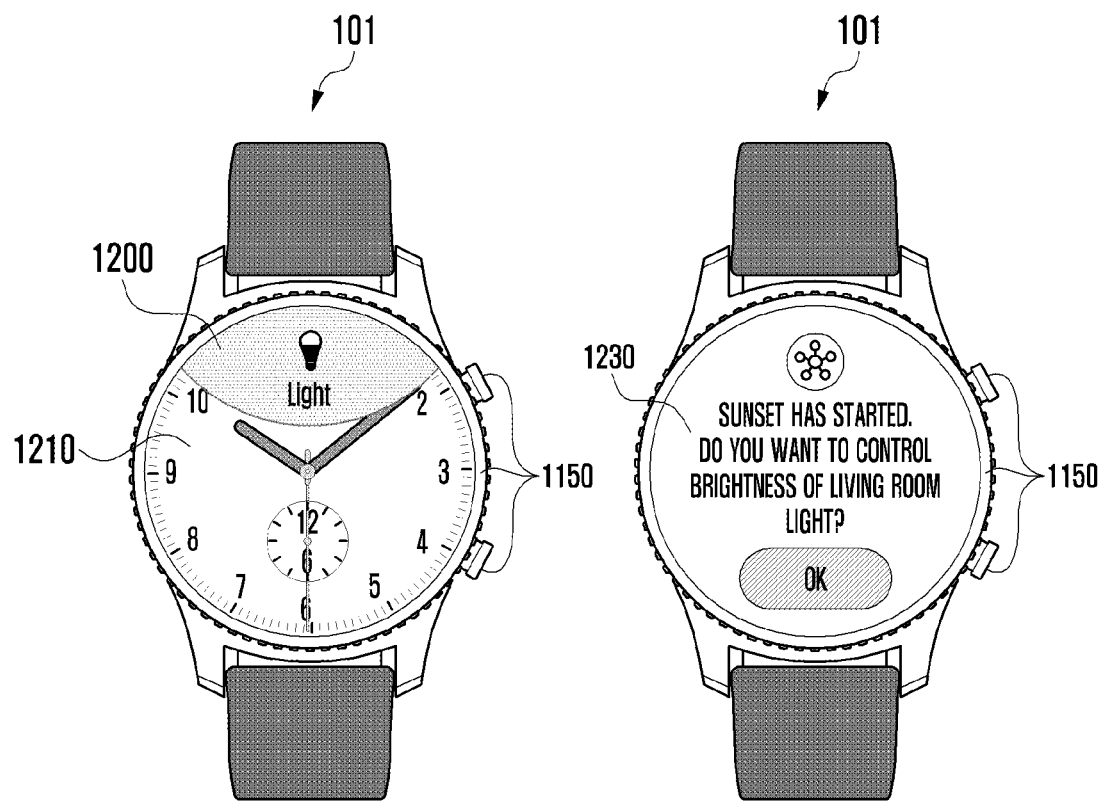

FIG. 15A
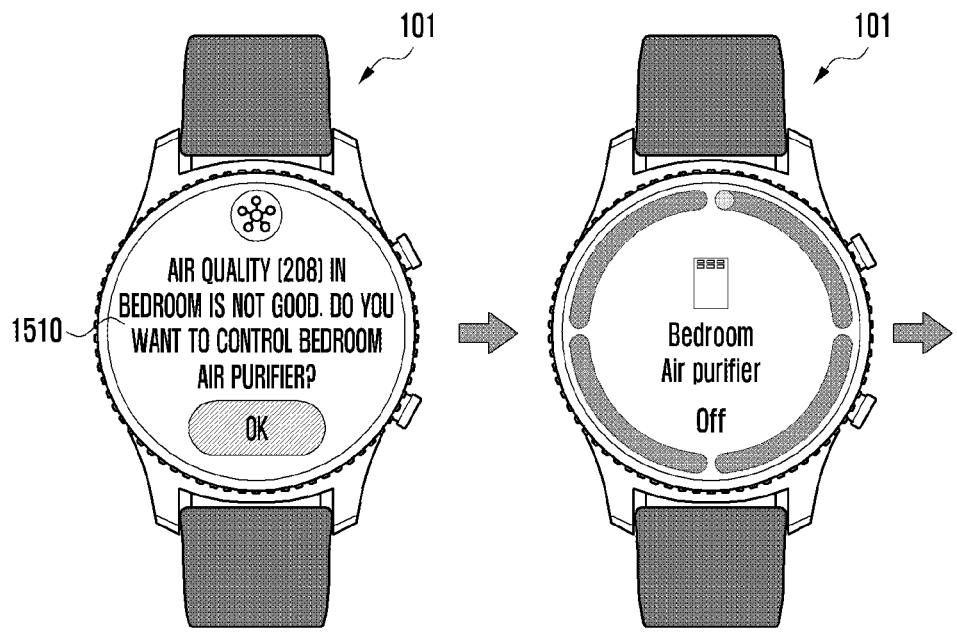
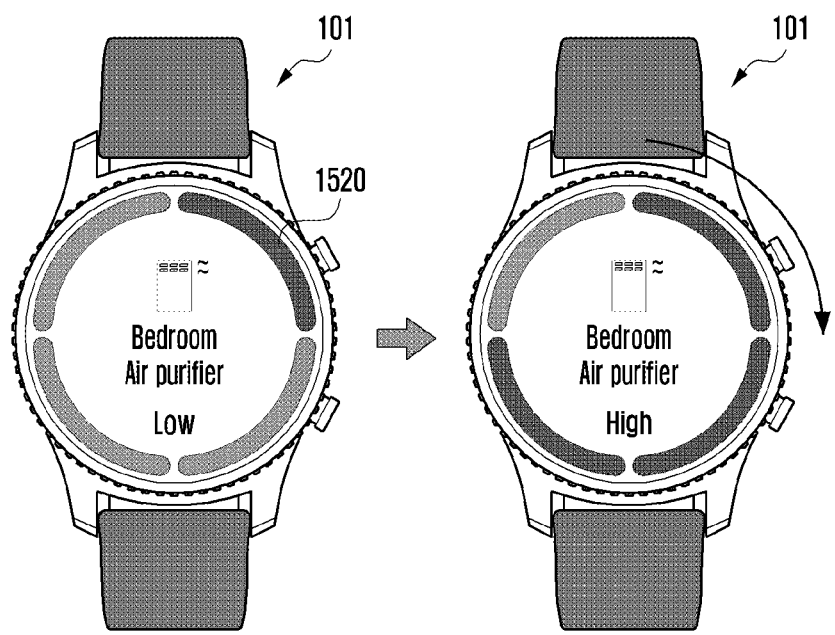

FIG. 15B
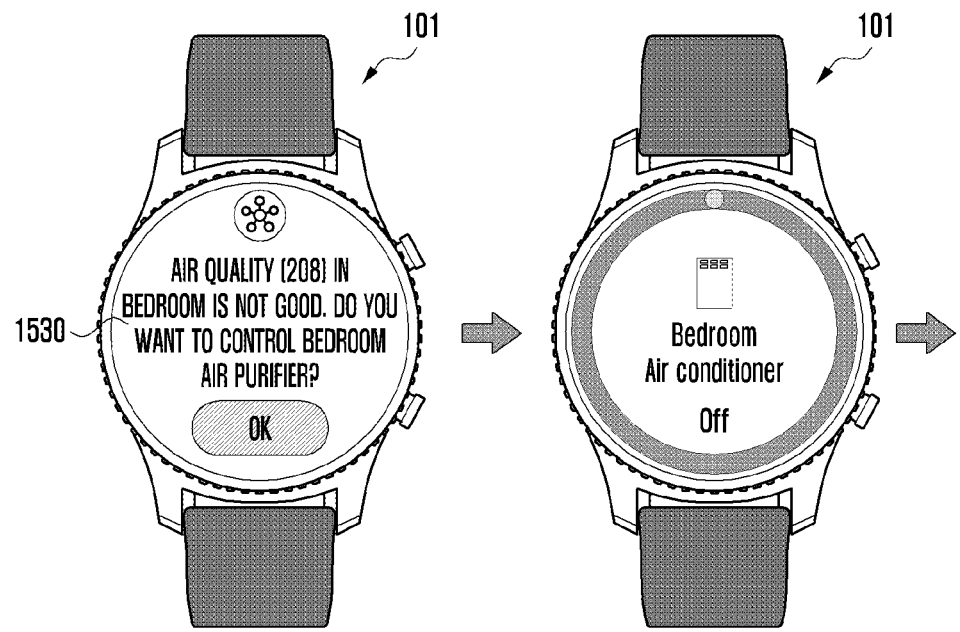
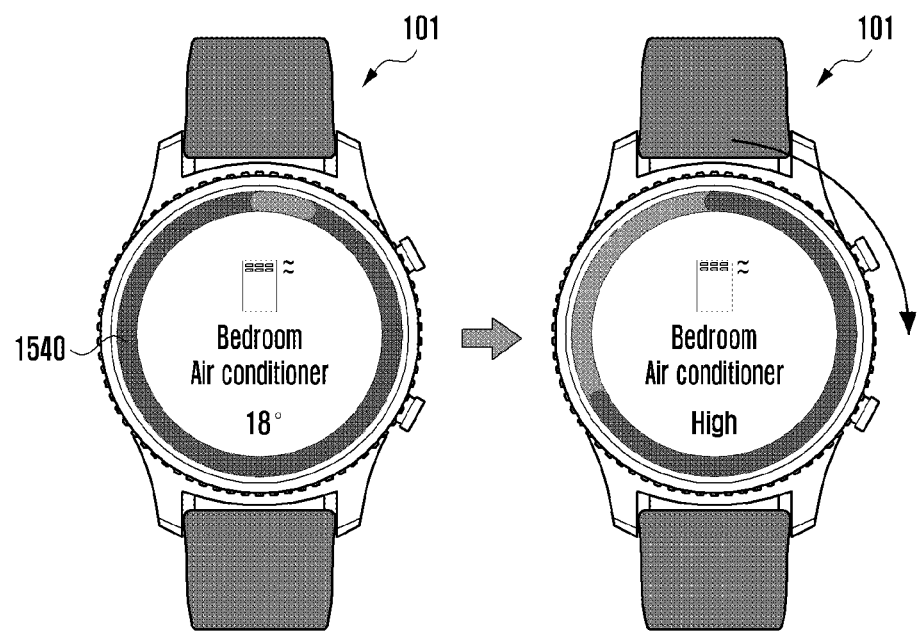

FIG. 15C
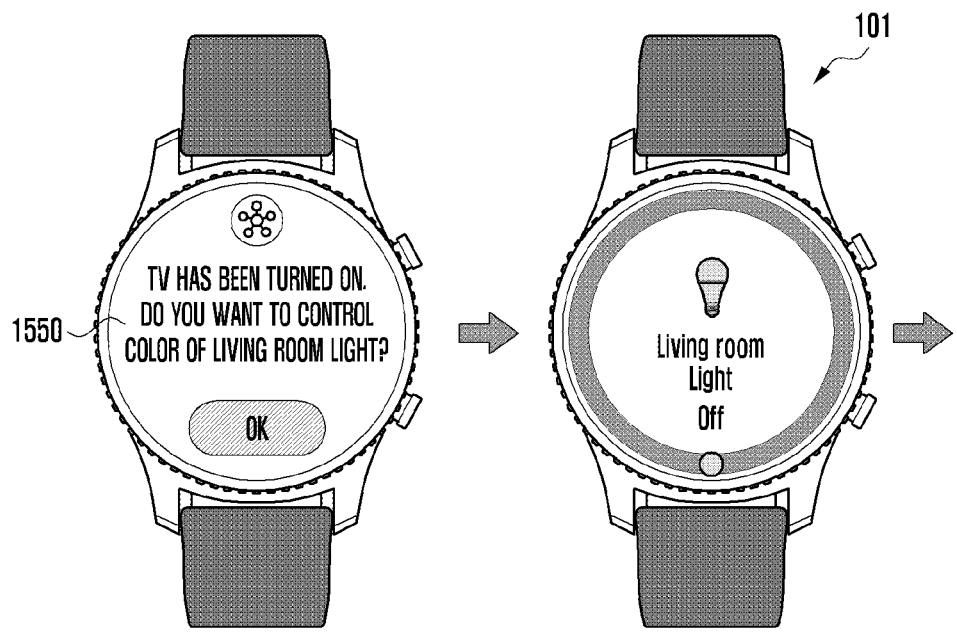
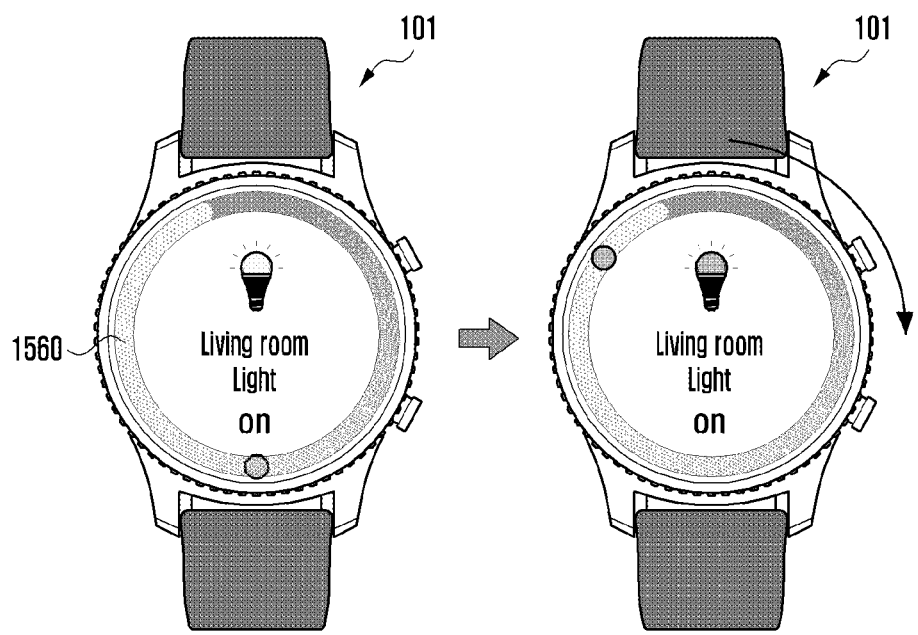

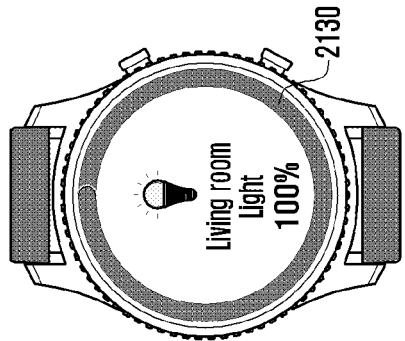
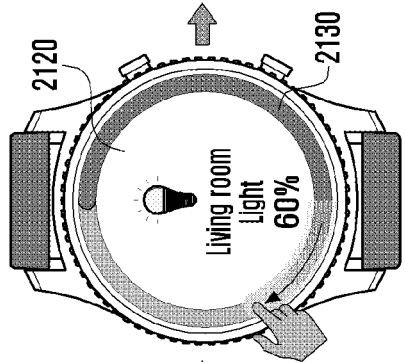
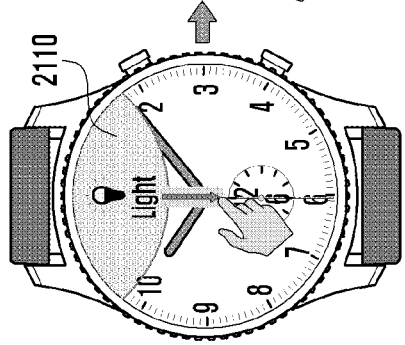
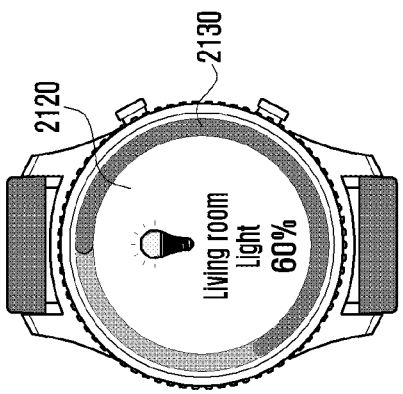
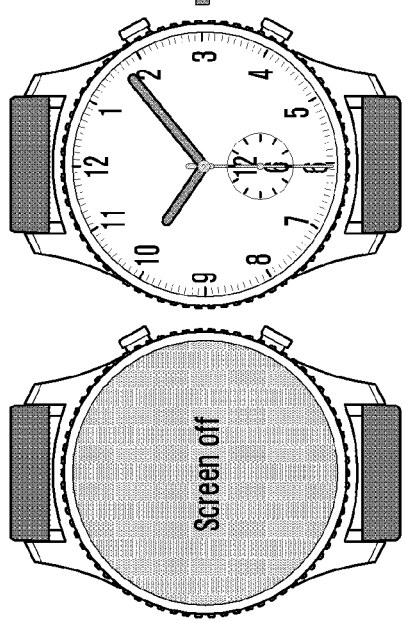

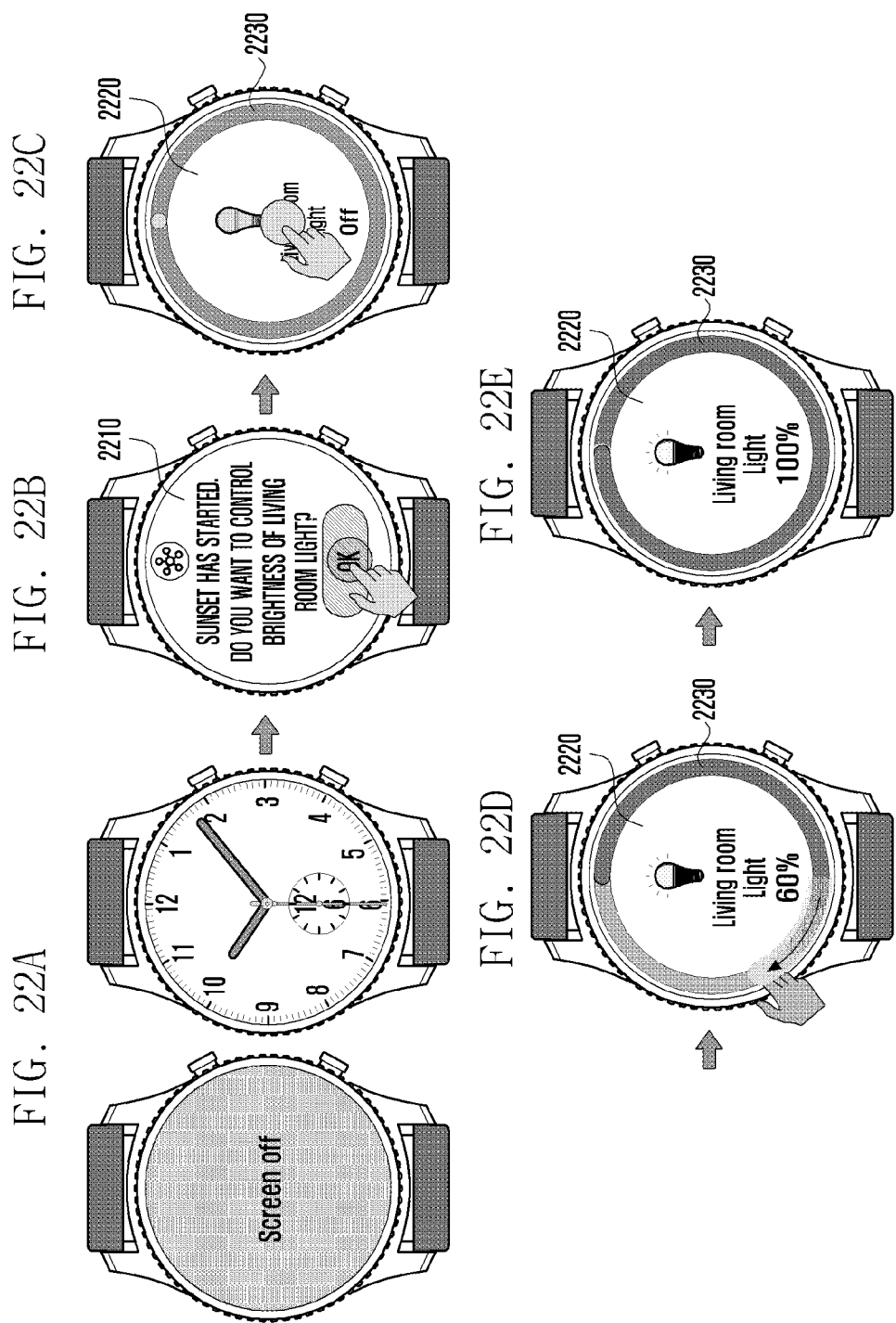

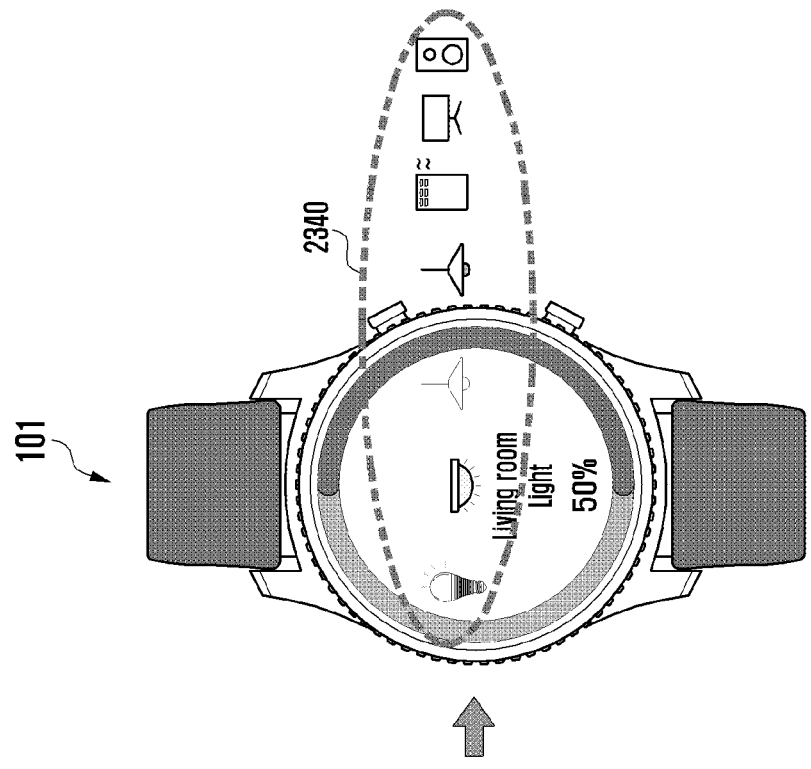
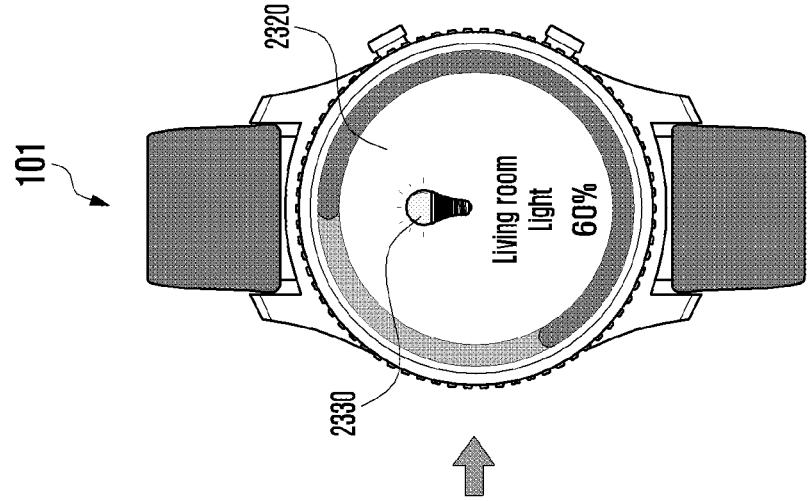
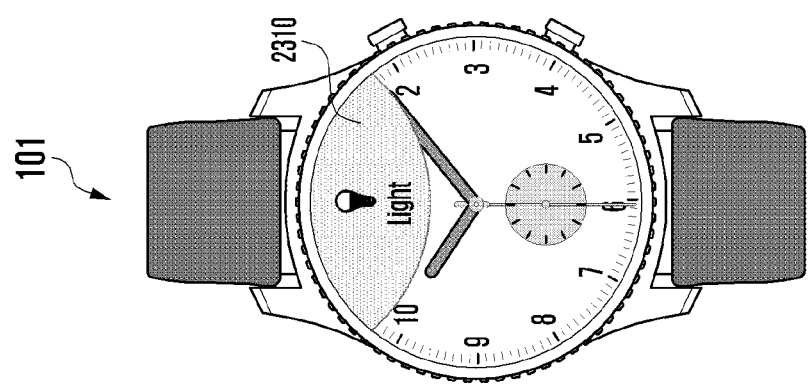

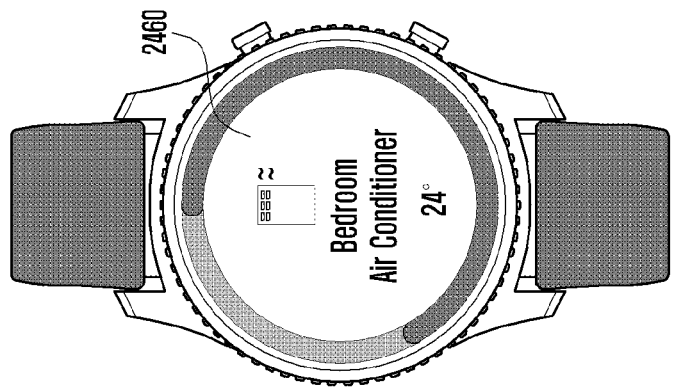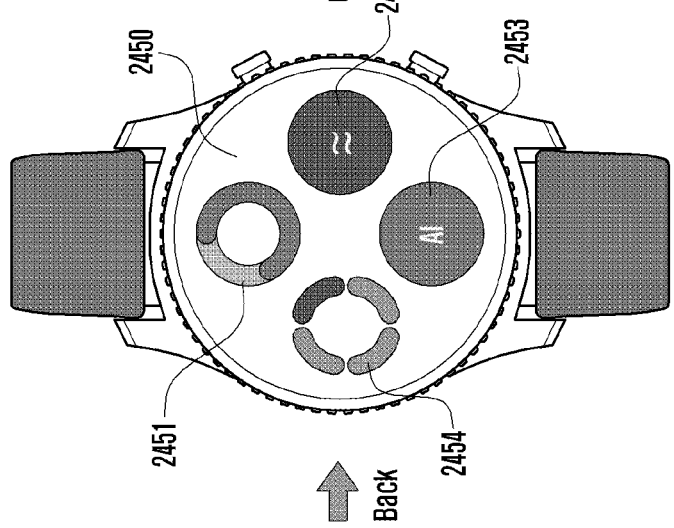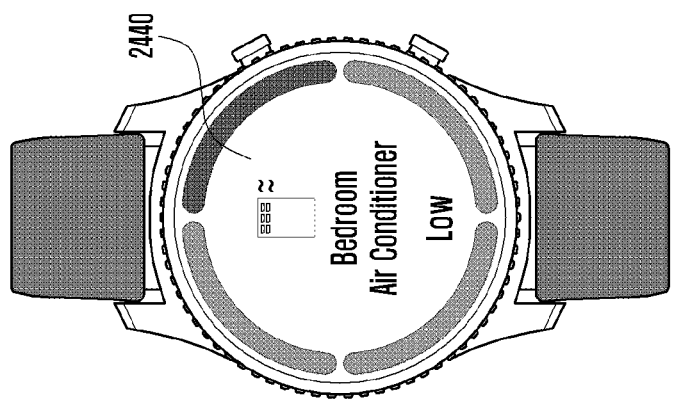

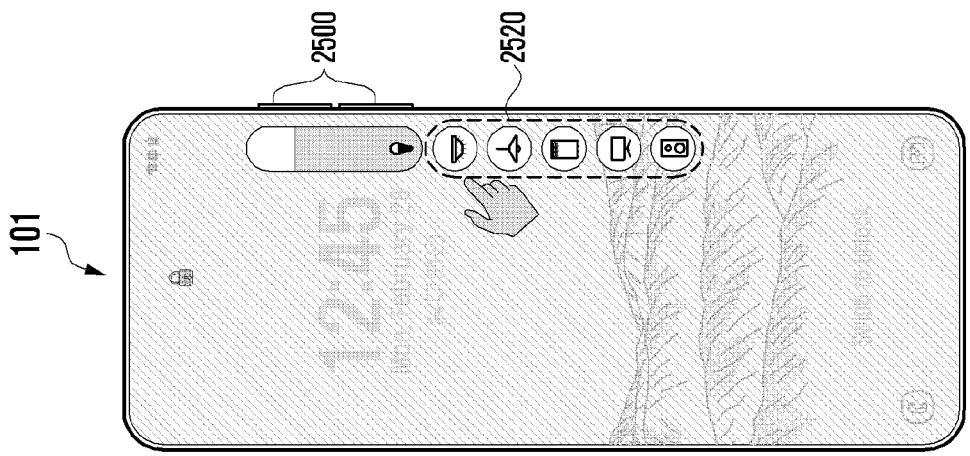
FIG. 25B
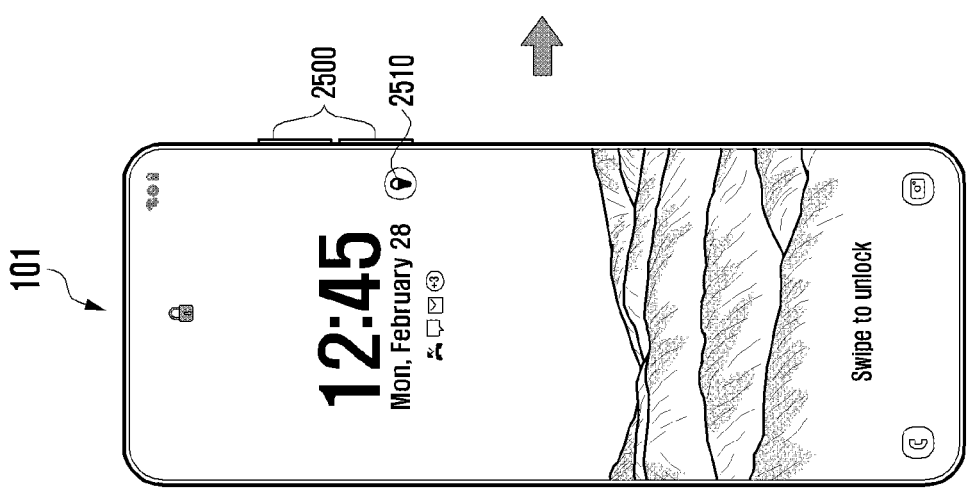
FIG. 25A
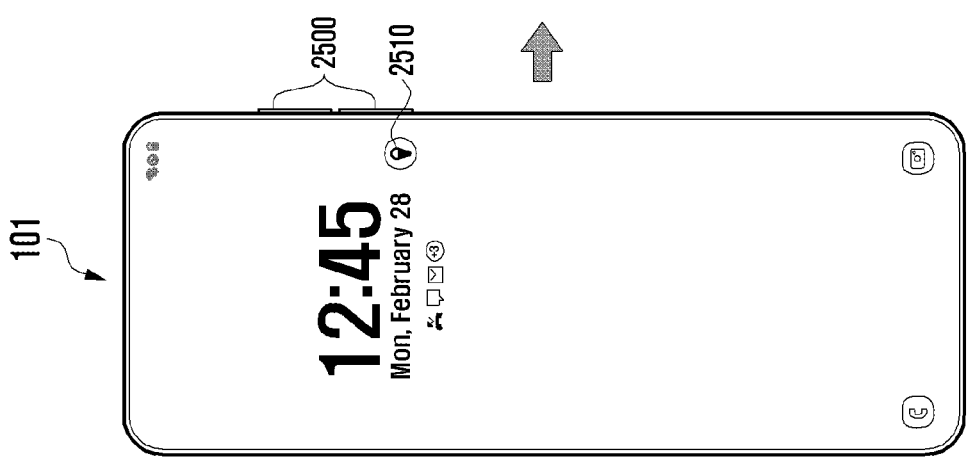

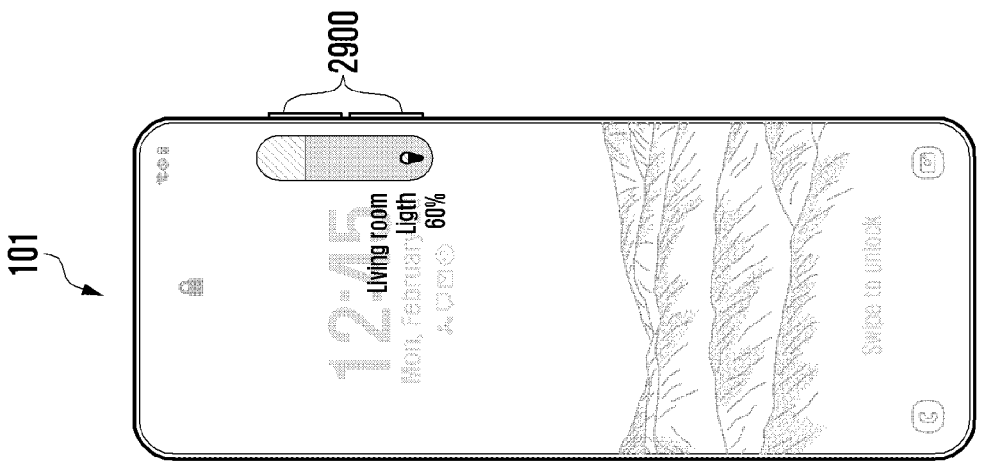
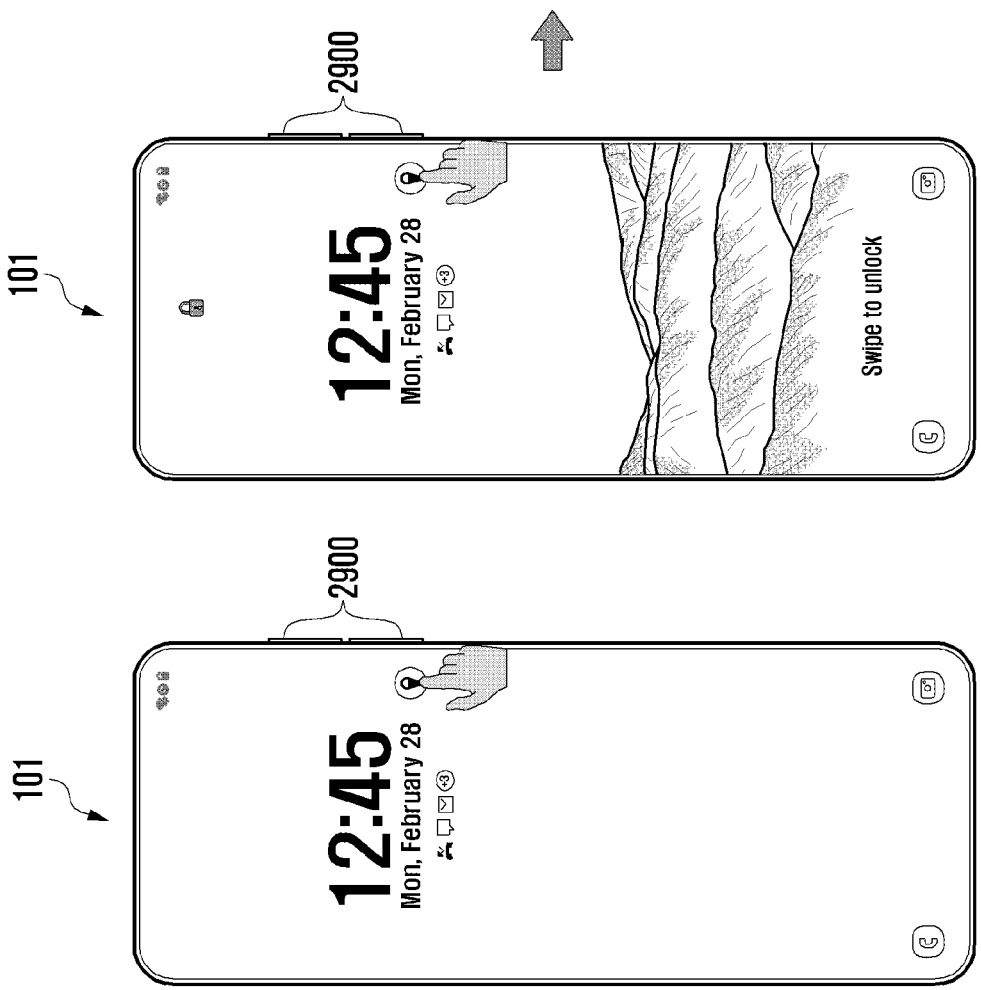

FIG. 29E
FIG. 29F
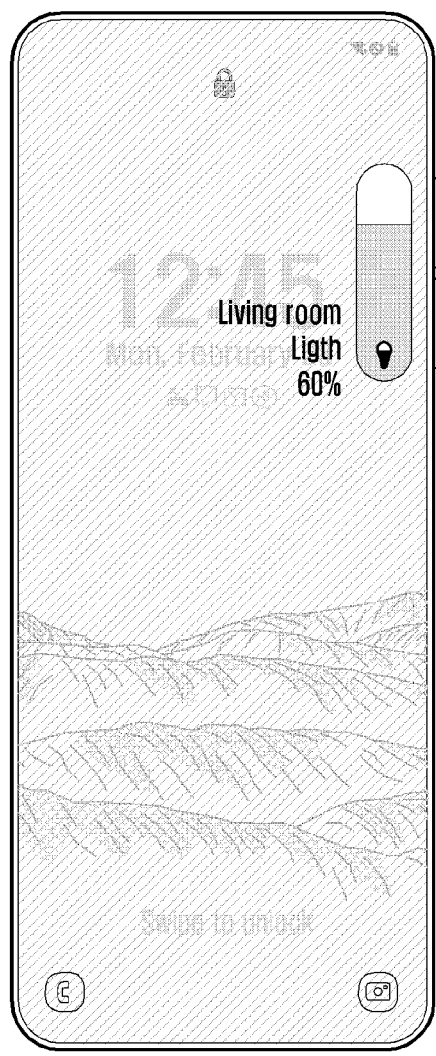
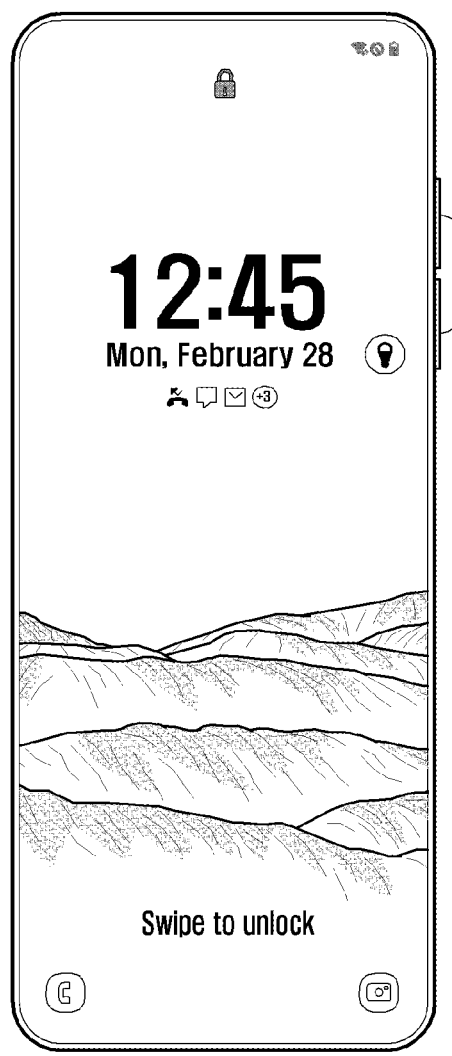

METHOD AND APPARATUS FOR PROVIDING INTERFACE TO CONTROL EXTERNAL DEVICE

CROSS-REFERENCE TO RELATED APPLICATIONS

This application is a continuation of International Application No. PCT/KR2023/003178 designating the United States, filed on Mar. 8, 2023, in the Korean Intellectual Property Receiving Office and claiming priority to Korean Patent Application No. 10-2022-0029185, filed on Mar. 8, 2022, in the Korean Intellectual Property Office, and to Korean Patent Application No. 10-2022-0030609, filed on Mar. 11, 2022, in the Korean Intellectual Property Office, the disclosures of all of which are incorporated by reference herein in their entireties.

BACKGROUND

Field

The disclosure relates to a method and an apparatus capable of controlling an external device existing around an electronic device by using a physical user interface (PUI) of the electronic device.

Description of Related Art

With the development of digital technology, various types of electronic devices such as mobile communication terminals, personal digital assistants (PDAs), electronic notebooks, smartphones, tablet personal computers (PCs), wearable devices, laptop PCs, or internet of things (IoT) devices are in widespread use. Hardware and/or software parts of such electronic devices have been continuously developed to support and increase functions.

Recently, functions of an electronic device have become more advanced and complicated, and approaches in emotional engineering have been applied and developed. Emotional engineering may, for example, refer to interpreting a user's sensibility in an engineering perspective and applying the same in a designing stage of an electronic device. For example, while an electronic device before application of emotional engineering may be focused on function-centered development, an electronic device to which approaches in emotional engineering have been applied may be designed to apply a user's sensibility in the planning and/or designing stage of the electronic device.

Current considerations of a user's sensibility may include not only an external design of the electronic device, but also a graphical user interface (GUI) and a physical user interface (PUI). Specifically, the sensibility quality of a PUI for physically connecting a function of an electronic device with a user may include a combination of the user's various sensibilities such as not only a visual sense but also a tactile sense, a movement sense, and an acoustic sense. Accordingly, the PUI for interaction between the user and the electronic device is considered as an important element for the user to use the electronic device.

Recently, home IoT technology is gaining popularity, and a function of performing control to turn on/off an IoT device (e.g., an air conditioner, an air purifier, a lighting device, a TV, a humidifier, a dehumidifier, and/or a refrigerator) using an electronic device, or controlling a capability (or a function) of the IoT device is included in an electronic device and an IoT device.

However, a function of controlling an IoT device using an electronic device is only focused on, for example, direct setting or controlling of the IoT device by a user using an application (or software) installed in the user's electronic device.

A conventional IoT device control function is only focused on simple control by a user using an electronic device. Accordingly, to control an IoT device, it is inconvenient for the user to find and control a plug-in of the corresponding IoT device for control by himself or herself after executing an application in the electronic device. Alternatively, the IoT device can be controlled in a simple manner such as voice commands, but this may cause a difficulty because the user should make commands while accurately recognizing a capability (or function) of the corresponding IoT device, and accurately recognizing a current state of the corresponding IoT device and a numerical value of a specific interval of a control level (or range) based on the current state.

SUMMARY

Various example embodiments of the disclosure provide a method and an apparatus capable of controlling an external device existing around an electronic device using a physical input device (e.g., a physical user interface (PUI)) of the electronic device.

Various example embodiments of the disclosure provide a method and an apparatus capable of mapping, for interaction for control of an external device, a physical input device of an electronic device to a function other than a designated function of the physical input device, which corresponds to a control capability of the external device, and controlling the external device according to a user input based on the physical input device.

Various example embodiments of the disclosure provide a method and an apparatus for detecting a controllable external device, based on recognition of a situation related to an external device, providing an intuitive interface related to a control capability of the detected external device, and supporting simple, easy, and prompt control of the external device by a user by using a physical input device of an electronic device.

An electronic device according to an embodiment of the disclosure may include a communication circuit, a physical input device, and a processor. According to an embodiment, the processor may detect a trigger related to external device control from the electronic device. According to an embodiment, the processor may identify, based on the detection of the trigger, a capability to be controlled by an external device. According to an embodiment, the processor may change a first function configured to cause a designated physical input device of the electronic device to operate, to a second function related to control of the identified capability of the external device. According to an embodiment, the processor may control, based on detection of a user input through the physical input device, the capability of the external device.

An operation method of an electronic device according to an embodiment of the disclosure may include detecting a trigger related to external device control from the electronic device. The operation method may include identifying, based on the detection of the trigger, a capability to be controlled by an external device. The operation method may include changing a first function configured to cause a designated physical input device of the electronic device to operate, to a second function related to control of the identified capability of the external device. The operation method may include controlling, based on detection of a user input through the physical input device, the capability of the external device.

To solve the above-described problems, various embodiments of the disclosure may include a non-transitory computer-readable recording medium in which a program for executing the method in a processor is recorded.

Additional scope of applicability of the disclosure will become apparent from the detailed description below. However, various changes and modifications within the spirit and scope of the disclosure can be clearly understood, and thus specific embodiments such as the detailed description and preferred embodiments of the disclosure should be understood as merely given as examples.

According to an electronic device and an operation method thereof according to various embodiments of the disclosure, a user can accurately and easily control a capability (or function) of an external device around an electronic device using a physical input device (e.g., a physical user interface (PUI)) of the electronic device. According to various embodiments of the disclosure, with respect to the physical input device of the electronic device, for interaction for controlling of the external device, a designated function of the physical input device is automatically changed to another function corresponding to a control capability of the external device, and provided, whereby a user can intuitively and accurately control the capability of the external device, based on the physical input device.

According to various embodiments of the disclosure, an electronic device may automatically detect a controllable external device, based on recognition of a situation related to the external device, and provide the same to a user. According to various embodiments of the disclosure, the electronic device visually, haptically, and/or acoustically provides an affordance related to control of a capability of the external device, so that the user can easily recognize a controllable external device and a capability thereof. According to various embodiments of the disclosure, support for more simply and easily controlling the external device through a physical input device of the electronic device is given, so that the user can be provided with experiences of various sensibilities such as not only a visual sense but also a tactile sense, a movement sense, and an acoustic sense.

According to various embodiments of the disclosure, even though a user cannot recognize a capability of an external device to be controlled, the user can easily and promptly control the external device through a physical input device associated with a designated interface.

Various other effects directly or indirectly identified through the disclosure can be provided.

BRIEF DESCRIPTION OF THE DRAWINGS

With regard to description of drawings, the same or similar elements may be assigned with the same or similar reference numerals. The above and other aspects, features and advantages of certain embodiments of the present disclosure will be more apparent from the following detailed description, taken in conjunction with the accompanying drawings, in which:

FIGS. 11A, 11B, 12A, and 12B illustrate examples of providing an affordance related to control of an external device by an example electronic device according to various embodiments;

FIGS. 15A, 15B, and 15C illustrate examples of various operations for control of an external device by an example electronic device according to various embodiments;

FIGS. 21A, 21B, 21C, 21D, and 21E illustrate an example user interface related to control of an external device by an example electronic device according to various embodiments;

FIGS. 22A, 22B, 22C, 22D, and 22E illustrate an example user interface related to control of an external device by an example electronic device according to various embodiments;

FIGS. 23A, 23B, and 23C illustrate an example user interface related to control of an external device by an example electronic device according to various embodiments;

FIGS. 24A, 24B, 24C, 24D, 24E, and 24F illustrate example user interfaces related to control of an external device by an example electronic device according to various embodiments;

FIGS. 25A and 25B illustrate an example user interface related to control of an external device by an example electronic device according to various embodiments;

FIGS. 29A, 29B, 29C, 29D, 29E, and 29F illustrate examples of mapping a function of a physical input device by an example electronic device according to various embodiments.

DETAILED DESCRIPTION

Figure 1:
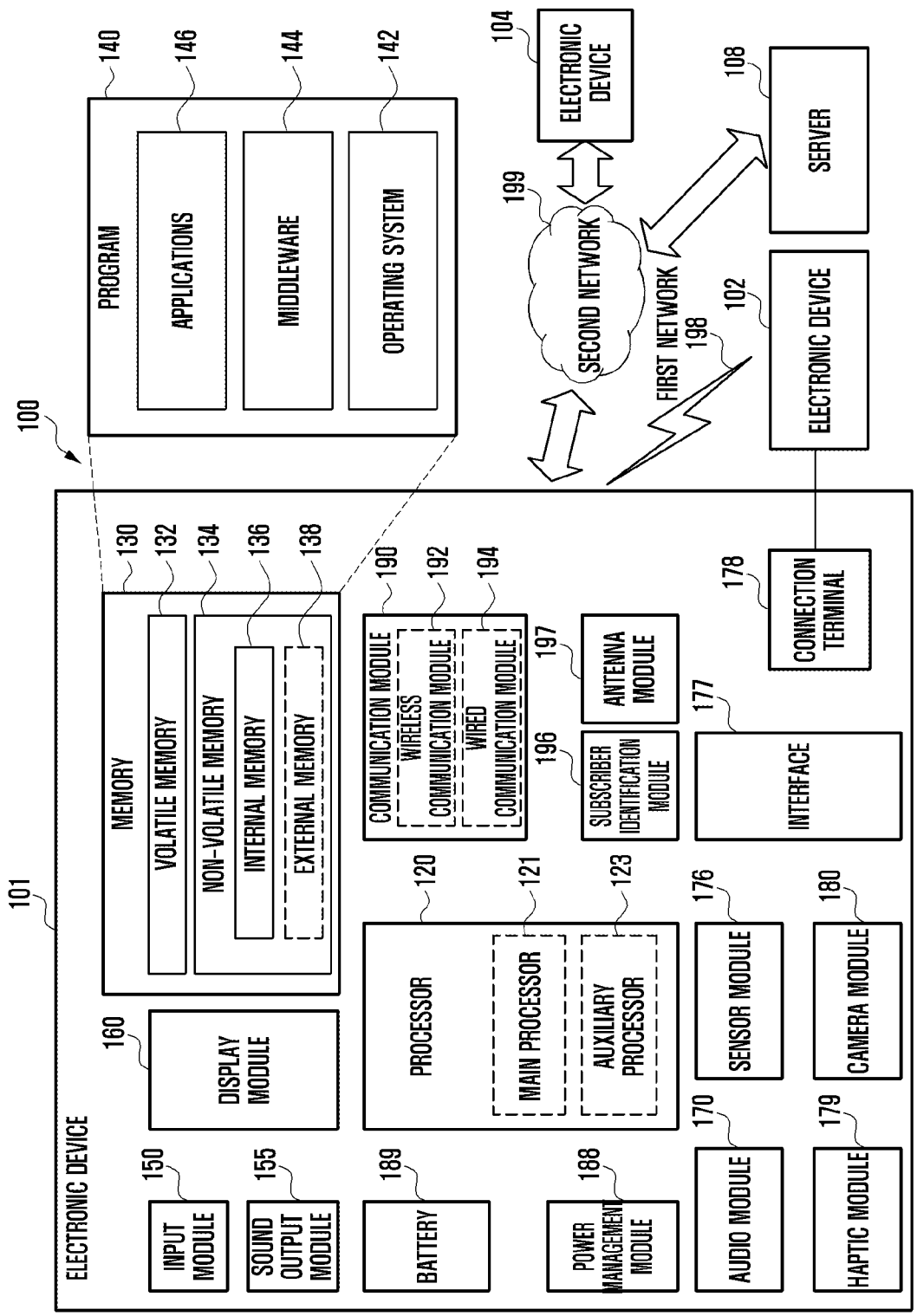
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzman machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which may refer, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
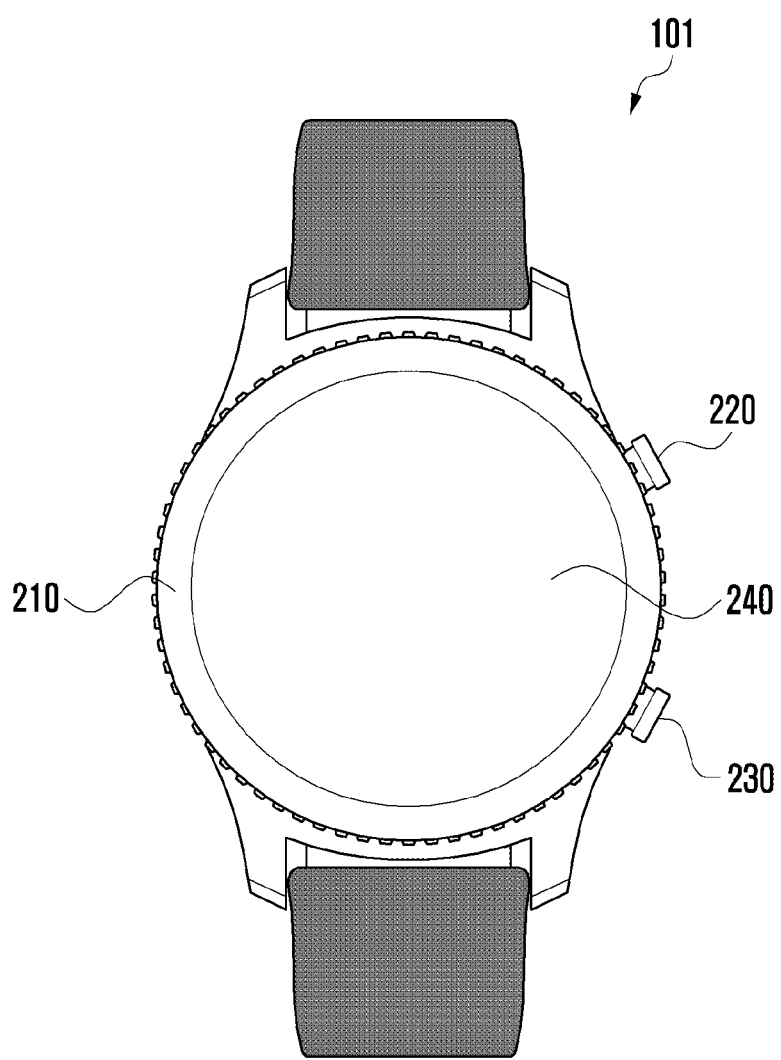
FIG. 2 illustrates an example electronic device according to various embodiments.

FIG. 2 illustrates an example electronic device according to various embodiments.

Figure 3:
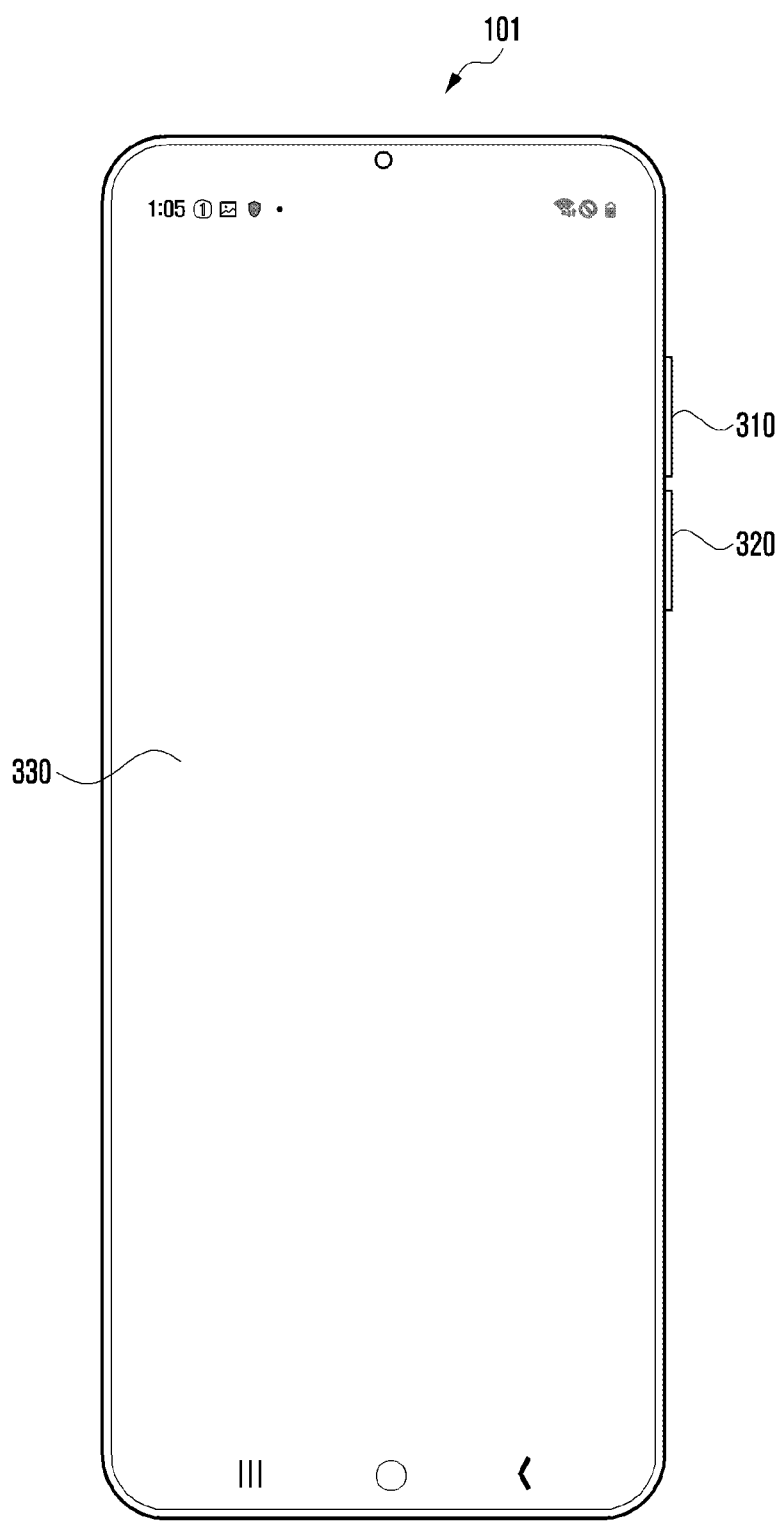
FIG. 3 illustrates an example electronic device according to various embodiments.

FIG. 3 illustrates an example electronic device according to various embodiments.

An electronic device 101 according to various embodiments may include a wearable device (e.g., a watch) as illustrated in FIG. 2, and/or a smartphone as illustrated in FIG. 3. The electronic device 101 according to various embodiments is not limited to the wearable device or the smartphone, may control, through recognition of a situation related to an external device in a standalone or a tethered scheme, the corresponding external device, and may include various devices (e.g., glasses, earbuds, an electronic pen, and/or a remote device) including a hardware (or physical) button or key input device (e.g., a side key button and/or a rotatable wheel key), as a physical input device (e.g., a physical user interface (PUI)) which can control an external device. Hereinafter, the electronic device 101 is described as a wearable device (e.g., a watch) as in the example of FIG. 2, or a smartphone as in the example of FIG. 3, but is not limited thereto, and an operation of the electronic device 101 according to various embodiments may be performed by various other devices.

Referring to FIG. 2, FIG. 2 may indicate an example in which the electronic device 101 is a wearable device (e.g., a watch), and a shape of the electronic device 101 according thereto. The electronic device 101 according to an embodiment may include a physical input device 210, 220, or 230 and a display 240 (e.g., the display module 160 of FIG. 1). In an embodiment, the electronic device 101 may additionally include other elements such as a communication module (e.g., the communication module 190 of FIG. 1), a sensor module (e.g., the sensor module 176 of FIG. 1), and/or an audio module (e.g., the sound output module 155 of FIG. 1). According to an embodiment, the audio module may include a microphone hole and a speaker hole. The microphone hole may have a microphone disposed therein to acquire a sound from the outside, and in an embodiment, the microphone may have multiple microphones arranged therein to detect the direction of a sound. The speaker hole may be used as an external speaker and/or a call receiver. In an embodiment, the speaker hole and the microphone hole may be implemented as one hole, or a speaker (e.g., a piezo speaker) may be included without a speaker hole.

According to an embodiment, for example, the display 240 may be visually exposed through a substantial part of a first surface (e.g., a front surface) of the electronic device 101. The display 240 may have a shape corresponding to a shape of a front plate, and may have various shapes such as a circle, an oval, or a polygon. The display 240 may be coupled to or disposed to be adjacent to a touch detection circuit, a pressure sensor capable of measuring the strength (pressure) of a touch, and/or a fingerprint sensor.

According to an embodiment, the physical input device 210, 220, or 230 may include a wheel key 210 which is disposed on a first surface (e.g., a front surface) of a housing of the electronic device 101 and is rotatable in at least one direction, and/or a side key button 220 or 230 disposed on a second surface (e.g., a side surface) of the housing. According to an embodiment, the rotatable wheel key 210 may have a shape corresponding to the shape of the front plate. According to an embodiment, the rotatable wheel key 210 may be implemented as a soft key using a touchscreen of the display 240 or a touch sensor positioned at a bezel part. In an embodiment, the electronic device 101 may not include some of the above-mentioned physical input devices 210, 220, and 230, and the physical input devices 210, 220, and 230 that are not included may be implemented as another shape on the display 240, such as a soft key.

According to an embodiment, the electronic device 101 may further include elements that are not shown. For example, the electronic device 101 may include an antenna (e.g., the antenna module 197 of FIG. 1), a support member (e.g., a bracket), a battery (e.g., the battery 189 of FIG. 1), and/or a printed circuit board. The support member may be formed of, for example, a metal material and/or a non-metal (e.g., polymer) material. The support member may have one surface coupled to the display 240 and the other surface coupled to the printed circuit board. A processor (e.g., the processor 120 of FIG. 1), a memory (e.g., the memory 130 of FIG. 1), and/or an interface (e.g., the interface 177 of FIG. 1) may be mounted on the printed circuit board.

Referring to FIG. 3, FIG. 3 may indicate an example in which the electronic device 101 is a bar-type smartphone, and a shape of the electronic device 101 according thereto. An electronic device 101 according to an embodiment may include a physical input device (310 or 320) and a display 330 (e.g., the display module 160 of FIG. 1). In an embodiment, the electronic device 101 may additionally include other elements such as a sound output module (e.g., the sound output module 155 of FIG. 1), a sensor module (e.g., the sensor module 176 of FIG. 1), a camera module (e.g., the camera module 180 of FIG. 1), an indicator (not shown), and/or a connector.

According to an embodiment, for example, the display 330 may be visually exposed through a substantial part of a first surface (e.g., a front surface) of the electronic device 101. The display 330 may be coupled to or disposed to be adjacent to a touch detection circuit, a pressure sensor capable of measuring the strength (pressure) of a touch, and/or a digitizer for detecting a stylus pen of a magnetic field type.

According to an embodiment, the physical input device 310 or 320 may be disposed on a second surface (e.g., a side surface) of a housing of the electronic device 101. In an embodiment, the electronic device 101 may not include some of the physical input devices 310 or 320, and the physical input devices that are not included may be implemented as another shape on the display 330, such as a soft key. In an embodiment, the physical input device 310 or 320 may be implemented to further include an additional another hardware button on a second surface (e.g., a right surface) or a third surface (e.g., a left surface) opposite to the second surface.

According to an embodiment, the electronic device 101 may further include elements that are not shown in FIG. 2 and/or FIG. 3. For example, the electronic device 101 may include an antenna (e.g., the antenna module 197 of FIG. 1), a support member (e.g., a bracket), a battery (e.g., the battery 189 of FIG. 1), and/or a printed circuit board.

The support member may be formed of, for example, a metal material and/or a non-metal (polymer) material. The support member may have one surface coupled to the display 240 or 330, and the other surface coupled to the printed circuit board. A processor (e.g., the processor 120 of FIG. 1), a memory (e.g., the memory 130 of FIG. 1), and/or an interface (e.g., the interface 177 of FIG. 1) may be mounted on the printed circuit board.

According to an embodiment, the processor (e.g., the processor 120 of FIG. 1) may include one or more of, for example, a micro-controller unit (MCU), a central processing unit (CPU), a graphics processing unit (GPU), a sensor processor, an application processor (AP), or a communication processor (CP).

The memory (e.g., the memory 130) may include, for example, a volatile memory or a non-volatile memory.

The interface (e.g., the interface 177 of FIG. 1) may include, for example, a high-definition multimedia interface (HDMI), a universal serial bus (USB) interface, an SD card interface, and/or an audio interface. For example, the interface may electrically or physically connect the electronic device 101 and an external electronic device, and include a USB connector, an SD card/MMC connector, or an audio connector.

The battery (e.g., the battery 189 of FIG. 1) supplies power to at least one element of the electronic device 101, may include, for example, a primary cell which is not rechargeable, a secondary cell which is rechargeable, or a fuel cell. For example, at least a part of the battery may be disposed on the substantially same plane as the printed circuit board. The battery may be integrally disposed inside the electronic device 101, or may be disposed to be detachable from the electronic device 101.

The antenna (e.g., the antenna module 197 of FIG. 1) may include, for example, a near field communication (NFC) antenna, a wireless charging antenna, and/or a magnetic secure transmission (MST) antenna. The antenna may perform short-distance communication with an external device, wirelessly transmit or receive power required for charging, and transmit a short-distance communication signal or a magnetic-based signal including payment data.

According to various embodiments, the electronic device 101 as shown in FIG. 2 and/or FIG. 3 may provide, based on recognition of a situation relating to a user and/or an external device, temporary control of a capability (or a function) of the external device (e.g., an IoT device) corresponding to a result of the recognition of the situation using a physical input device (e.g., hardware) of the electronic device 101 of the user.

In an embodiment, the recognition of the situation may include an operation of recognizing various situations such as a state of an external device recently controlled by a user, whether an ambient environment (e.g., environment information relating to fine dust, noise, and/or temperature/humidity) of the user can be improved through at least one IoT device corresponding to the environment of the user, and/or a recommended environment based on the user's application and/or function use history.

According to an embodiment, the electronic device 101 may provide a designated affordance (e.g., a visual affordance (GUI) and/or an acoustic affordance (a guide sound)) indicating that an external device around the electronic device can be controlled based on a result of a recognition of a situation. According to an embodiment, the electronic device 101 may control, in response to the designated affordance, a corresponding external device (or a capability of the external device), based on a user input using a physical input device.

Figure 4:
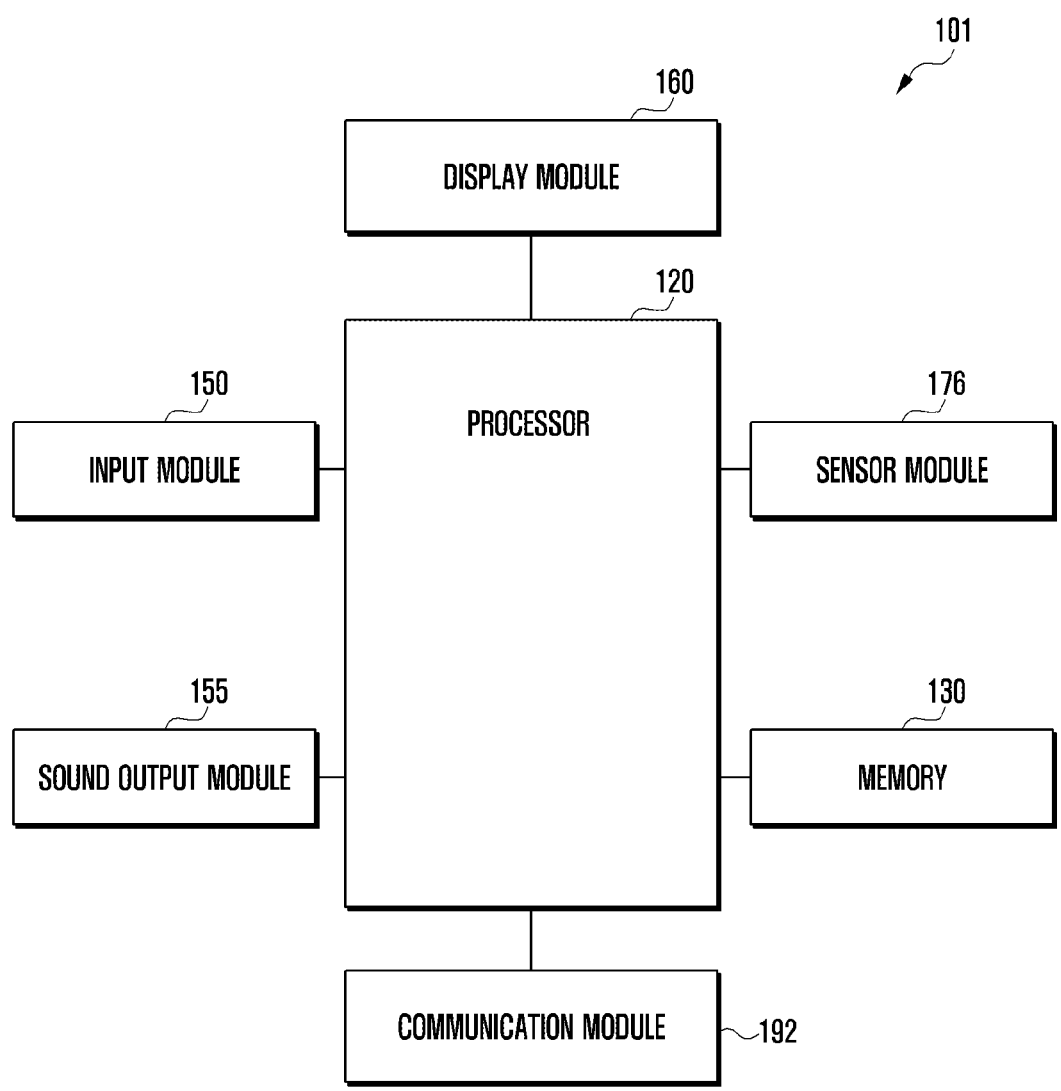
FIG. 4 is a block diagram illustrating a configuration of an example electronic device according to various embodiments.

FIG. 4 is a block diagram illustrating a configuration of an example electronic device according to various embodiments.

According to an embodiment, the configuration of the electronic device 101, illustrated in FIG. 4, may be at least a part of the configuration related to performing of an operation according to the disclosure by the electronic device 101 illustrated in FIG. 2 and/or FIG. 3.

Referring to FIG. 4, the electronic device 101 according to various embodiments of the disclosure may include a display module 160, a memory 130, a sensor module 176, an input module 150, a sound output module 155, a communication module 192, and a processor 120. According to an embodiment, the electronic device 101 may additionally include one or more other elements (e.g., the camera module 180 of FIG. 1). For example, the electronic device 101 may include all or at least some of the elements of the electronic device 101, as described with reference to FIG. 1.

The display module 160 (e.g., the display module 160 of FIG. 1) may include a display and visually provide various information to the outside (e.g., a user) of the electronic device 101. According to an embodiment, the display module 160 may include a touch detection circuit (or a touch sensor) (not shown), a pressure sensor capable of measuring the strength of a touch, and/or a touch panel (e.g., a digitizer) for detecting a stylus pen of a magnetic field type. According to an embodiment, the display module 160 may detect a touch input and/or a hovering input (or a proximity input) by measuring a change in a signal (e.g., a voltage, the amount of light, resistance, an electromagnetic signal, and/or the quantity of an electric charge) for a specific position of the display module 160, based on the touch detection circuit, the pressure sensor, and/or the touch panel. According to an embodiment, the display module 160 may include a liquid crystal display (LCD), an organic light-emitting diode (OLED), and/or an active-matrix organic light-emitting diode (AMOLED). According to an embodiment, the display module 160 may include a flexible display.

According to an embodiment, the display module 160 may visually provide, under the control by the processor 120, various information such as state information relating to a state in which an external device is controllable, guide information related to control of an external device using a designated physical input device (or PUI) of the electronic device 101, and/or control information related to a capability controlled by the external device, which changes in response to the control of the external device. According to an embodiment, the display module 160 may provide at least one information piece, based on a designated user interface. According to an embodiment, the display module 160 may provide, under the control of the processor 120, a visual affordance through a designated user interface according to detection of a trigger (or detection of entrance into a designated mode (e.g., a handover control mode)) for controlling the external device or a capability of the external device.

The communication module 192 (e.g., including communication circuitry) may support a legacy network (e.g., a 3G network and/or a 4G network), a 5G network, and out of band (OOB) and/or next-generation communication technology (e.g., new radio (NR) technology). According to an embodiment, the communication module 192 may correspond to the wireless communication module 192 as illustrated in FIG. 1. According to an embodiment, the electronic device 101 may perform communication with an external device (e.g., the server 108 and/or other electronic devices 102 and 104 of FIG. 1) through a network using the communication module 192. According to an embodiment, the communication module 192 may transmit data generated from the electronic device 101 to the external device, and receive data transmitted from the external device.

The memory 130 may store various data used by the electronic device 101. The data may include, for example, input data or output data for an application (e.g., the program 140 of FIG. 1) or a command related to the application. According to an embodiment, the memory 130 may store instructions which, when executed, cause the processor 120 to operate. For example, the application may be stored as software (e.g., the program 140 of FIG. 1) in the memory 130, and is executable by the processor 120. According to an embodiment, the application may be various applications capable of providing various services (or functions) (e.g., external device control services) in the electronic device 101.

According to an embodiment, the memory 130 may store various data related to control of the external device using a physical input device (e.g., PUI) of the electronic device 101. For example, the various data may include information (e.g., identification information) related to an external device which can be interacted with the electronic device 101, information (e.g., capability information) related to control of a capability of the corresponding external device, and information (e.g., mapping information) relating to the physical input device for the control of the capability of the corresponding external device.

Figure 5:
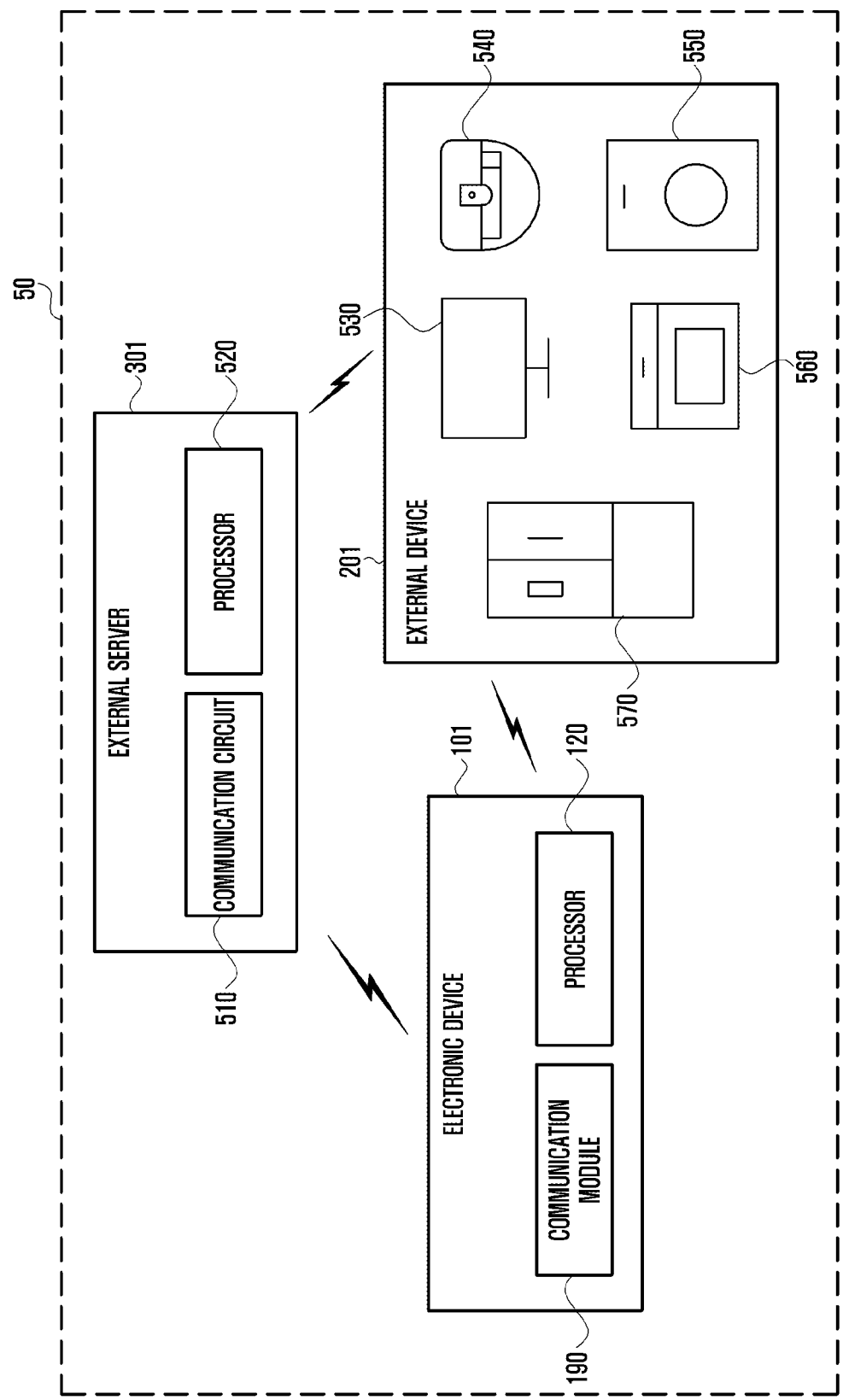
FIG. 5 is a diagram illustrating an example system capable of supporting an operation of an example electronic device according to various embodiments.

The input module 150 may receive, from the outside (e.g., a user) of the electronic device, a command or data to be used for an element (e.g., the processor 120) of the electronic device 101. In an embodiment, the input module 150 may include a physical input device (e.g., PUI) of the electronic device 101. In an embodiment, the physical input device may include various elements including a hardware (or physical) button or a key input device (e.g., a side key button and/or a rotatable wheel key) of the electronic device 101. According to an embodiment, the input module 150 may map a designated first function related to control of an operation of the electronic device 101 through a designated physical input device and a designated second function related to control of a capability of the external electronic device 201 (FIG. 5).

The sound output module 155 may output a sound signal to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The sensor module 176 may include the configuration corresponding to the sensor module 176 as described with reference to FIG. 1. For example, the sensor module 176 may detect an operational state (e.g., power or temperature) of the electronic device 101 or an environmental state (e.g., a state of an external device, a state of a user, and/or a state of a nature environment (e.g., weather, temperature, humidity, and/or brightness)) external to the electronic device, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a biometric sensor (e.g., a photoplethysmography (PPG) sensor), and/or an illuminance sensor.

According to an embodiment, the processor 120 may control a related operation for controlling an external device 201 and a capability of the external device 201 using a physical input device of the electronic device 101. According to an embodiment, the processor 120 may detect a trigger related to control of the external device 201 by the electronic device 101, identify, based on the detection of the trigger, a capability to be controlled by the external device 201, change a first function configured so as to allow a designated physical input device of the electronic device 101 to operate, to a second function related to control of the identified capability of the external device 201, and control, based on detection of a user input through the physical input device, an operation related to the control of the capability of the external device 201.

According to an embodiment, the processor 120 may determine, when the trigger related to the control of the external device 201 is detected, a type of the external device 201 and an exposure priority related to a capability of the corresponding external device 201. According to an embodiment, the processor 120 may identify a usage history according to the use of the external device 201 by a user, a context, and/or an external environmental state (e.g., a state of an external device, a state of a user, and/or a state of a natural environment (e.g., weather, temperature, humidity, and/or brightness)), and recommend control of a specific capability of the external device 201, which is most suitable at a current time point, according to a priority.

According to an embodiment, the processor 120 of the electronic device 101 may determine, based on a result of determination, a first capability (e.g., a main capability) and/or a second capability (e.g., sub capability), for the corresponding external device 201. According to an embodiment, the processor 120 of the electronic device 101 may configure and provide, based on a result of determination, a visual affordance related to the control of the external device 201.

According to an embodiment, operation of the processor 120 is described with reference to the following drawings.

According to various embodiments, operations performed by the processor 120 may be implemented using instructions recorded on a recording medium. For example, the recording medium may include a non-transitory computer-readable recording medium which stores a program for detecting a trigger related to control of the external device 201 by the electronic device 101, identifying, based on the detection of the trigger, a capability to be controlled by the external device 201, changing a first function configured so as to allow a designated physical input device of the electronic device 101 to operate, to a second function related to control of the identified capability of the external device 201, and controlling, based on detection of a user input through the physical input device, the capability of the external device 201.

FIG. 5 is a diagram illustrating an example system capable of supporting an operation of an example electronic device according to various embodiments.

According to an embodiment, FIG. 5 may illustrate an example system architecture for providing situation recognition for control of an external device 201 by the electronic device 101 (e.g., the electronic device 101 of FIG. 2 or FIG. 3) and recommendation and control related to the control of the external device 201, based on the situation recognition. According to various embodiments, a system 50 may allow the electronic device 101 to control the external device 201 and/or a capability related to the external device 201 through a physical input device, based on a result of recognition of various situations relating to a user in, for example, a smart home environment. According to an embodiment, the system 50 may provide recognition of various situations related to an operation of the external device 201, and provide a recommendation according thereto, and according to an embodiment, such an operation may be operated by the electronic device 101, or a server 301 (e.g., an internal server or an external server).

Referring to FIG. 5, the system 50 according to various embodiments may include the electronic device 101 (e.g., the electronic device 101 of FIG. 2 or FIG. 3), the external device 201 (or a peripheral device or an IoT device), and the server 301.

According to an embodiment, the electronic device 101 may include the processor 120 and the communication module 190. According to an embodiment, although not shown in FIG. 5, the electronic device 101 may include a physical input device (e.g., the input module 150 of FIG. 1 or FIG. 4) and a display module 160 (e.g., the display module 160 of FIG. 1 or FIG. 4).

According to an embodiment, the communication module 190 of the electronic device 101 may be a communicator including a circuit for communication processing. According to an embodiment, the communication module 190 may communicate with the external device 201 through first designated communication (e.g., short-distance wireless communication) or the external device 201 and/or the server 301 through second designated communication (e.g., long-distance wireless communication). According to an embodiment, the electronic device 101 may communicate with the external device 201 through the server 301. According to an embodiment, the communication module 190 may receive, based on control by the processor 120, various information (e.g., identification information and operation information) related to the external device 201 from the external device 201 directly or through the server 301.

According to an embodiment, the communication module 190 may directly transmit, based on control by the processor 120, control information (e.g., a command related to control of the external device 201) upon a user input using a physical input device to the external device 201, or transmit the control information to the external device 201 through the server 301. According to an embodiment, the communication module 190 may be connected to the external device 201, based on at least one of a direct (e.g., wired) communication channel and a wireless communication channel, and provide various data (or a command) through the connected communication channel.

According to an embodiment, the processor 120 of the electronic device 101 may support a user in simply and easily controlling a capability of the external device 201 using a physical input device (e.g., PUI) of the electronic device 101.

According to an embodiment, the processor 120 of the electronic device 101 may provide indoor environment information collected through a sensor (e.g., the sensor module 176 of FIG. 1 or FIG. 4) of the electronic device 101 and/or recommendation information for control of a capability of the external device 201, at least based on a use pattern of the external device 201 of a user, through a designated interface (e.g., a visual affordance (GUI) and/or an acoustic affordance (a guide sound)).

In an embodiment, the processor 120 of the electronic device 101 may identify the external device 201, the user pattern of which has been analyzed, as an operable (or controllable) external device 201. According to an embodiment, indoor environment information and/or a use pattern may be collected or acquired based on various situation recognition technologies. For example, the processor 120 of the electronic device 101 may operate to control, based on situation recognition for the various indoor environment information and/or use pattern, a corresponding capability of the external device, wherein the various indoor environment information and/or the use pattern may include adjusting the brightness of a lamp of a lighting device when sunset starts, changing a color of a lamp of a lighting device when a TV is turned on, turning off an air purifier when a window is opened, adjusting the temperature when an air conditioner is turned on, and/or turning off an air purifier when a robot cleaner starts operating. In an embodiment, an example of a scenario of an operation of recommending a capability of the external device 201 when the designated use pattern is satisfied is shown in <Table 1>.

TABLE 1

| Use pattern | Recommended capability |
|---|---|
| Pattern of adjusting color of lamp after 10 o'clock | Capability of adjusting color of lamp |
| Pattern of controlling brightness of lamp during sunset | Capability of adjusting brightness of lamp |
| Pattern of changing color of lamp when TV is turned on | Capability of adjusting color of lamp |
| Pattern of turning on kitchen hood when electric stove has been turned on for 3 minutes or longer | Capability of adjusting suction strength of kitchen hood |
| Pattern of adjusting temperature when air conditioner is turned on | Capability of adjusting temperature of air conditioner |
| Pattern of turning off air purifier when window is opened | Capability of adjusting mode of air purifier |
| Pattern of turning on ventilator when light is turned on bathroom | Capability of adjusting ventilator |
| Pattern of turning off device when nobody is at home | Capability of adjusting "Leave" mode |
| Pattern of closing curtain when user leaves bathroom after shower | Capability of adjusting curtain |
| Pattern or reducing volume of TV sound after 10 o'clock | Capability of adjusting TV volume |
| Pattern of adjusting channel | Capability of adjusting |

TABLE 1-continued

| Use pattern | Recommended capability |
|---|---|
| when watching TV | TV channel |
| Pattern of reducing volume of speaker sound when whole family is at home | Capability of adjusting speaker volume |

According to an embodiment, the processor 120 of the electronic device 101 may identify an external device 201 satisfying a designated condition as an operable (or controllable) external device 201. According to an embodiment, the designated condition may be collected or acquired based on various situation recognition technologies. For example, the processor 120 of the electronic device 101 may operate to control a capability corresponding to the external device 201, based on situation recognition of a designated condition, wherein the situation recognition includes controlling an air purifier when a bad quality of air is detected by an air quality sensor, controlling a humidifier when low humidity is detected by a humidity sensor, controlling an air conditioner when a high temperature is detected by a temperature sensor, controlling a lighting device when low illuminance is detected by an illuminance sensor, and/or controlling a dehumidifier when rain is detected based on weather information. In an embodiment, an example of a scenario of an operation of recommending a capability of the external device 201 when the designated use pattern is satisfied is shown in <Table 2>.

TABLE 2

| Condition | Recommended capability |
|---|---|
| When air quality sensor indicates "bad" condition | Capability of adjusting mode of air purifier |
| When air condition in my village is "bad" | Capability of adjusting mode of air purifier |
| When weather of my village indicates "raining" | Capability of adjusting dehumidification mode of air conditioner |
| When illuminance of living room indicates "dark" | Capability of adjusting brightness of lamp |
| When humidity of bedroom is "low" | Capability of mode of humidifier |
| When room temperature is "low" | Capability of adjusting room temperature |
| When room temperature is "high" | Capability of adjusting temperature of air conditioner |
| When UV sensor indicates "strong" | Capability of adjusting blind |
| When light is turned "ON" in bathroom | Capability of adjusting ventilator |
| For specific device used by user immediately before | Capability related to corresponding device |

In an embodiment, the processor 120 of the electronic device 101 may identify a user history and/or context according to use of the external device 201 of a user, and recommend control of a specific capability of the external device 201, which is most suitable at a current time point. According to an embodiment, the user can more promptly and easily control the external device 201 according the recommendation using a physical input device of the electronic device 101. According to an embodiment, when the physical input device is a rotatable bezel, the user may control a capability of the external device 201, based on rotation (e.g., clockwise/counterclockwise rotation of the bezel). According to an embodiment, when the physical input device is a hardware button (e.g., a volume key), the user may control the capability of the external device 201, based on a selection of up/down of the hardware button.

According to an embodiment, for a corresponding physical input device of the electronic device 101, the processor 120 of the electronic device 101 may change, based on an intended input to a designated interface by a user, a function designated to the physical input device (e.g., change a designated default function to a handover control function) so as to enable the capability of the external device 201 to be controlled. According to an embodiment, in response to a user input to the physical input device, the processor 120 of the electronic device 101 may control the capability of the external device 201 in association with the physical input device, and provide a related user interface corresponding to the control of the capability, through a display (e.g., the display module 160 of FIG. 1 or FIG. 4) of the electronic device 101.

According to an embodiment, the operation of the electronic device (or the processor 120) is described with reference to the following drawings.

According to an embodiment, the processor 120 of the electronic device 101 may determine the type of capability and an exposure priority for each external device 201. In an embodiment, an example of the type of capability (e.g., a main capability (or a mandatory capability) and a sub capability) for each external device 201 is shown in <Table 3>.

TABLE 3

| | Main capability (Mandatory) | Sub capability 1 | Sub capability 2 | Sub capability 3 |
|---|---|---|---|---|
| Lamp | Switch (on/off) | Brightness (0-100%) | Color Temp (2200k-9000k) | Color type (1-6) |
| Outlet | Switch (on/off) | | | |
| Wall switch | Switch (on/off) | | | |
| Air conditioner | Switch (on/off) | Temp (0-100%) | Mode (1-4) | |
| Room temperate regulator | Switch (on/off) | Temp (0-100%) | Mode (1-2) | |
| Air purifier | Switch (on/off) | Mode (1-4) | | |
| Kitchen hood | Switch (on/off) | | | |
| TV | Switch (on/off) | Volume (0-100%) | CH (0-100%) | |
| Speaker | Switch (play/pause) | Volume (0~100%) | | |
| Robot cleaner | Switch (start/pause) | Power (1-4) | | |
| Garage door | Switch (open/close) | Open/Close (0-100%) | | |
| Curtain | Switch (open/close) | Open/Close (0-100%) | | |
| Door lock | Switch (open/close) | | | |

According to an embodiment, the processor 120 of the electronic device 101 may determine the type of the external device 201 and an exposure priority related to a capability of the corresponding external device 201 when a trigger related to control of the external device 201 is detected. According to an embodiment, the processor 120 may identify a usage history according to the use of the external device 201 by a user, a context, and/or an external environmental state (e.g., a state of an external device, a state of a user, and/or a state of a natural environment (e.g., weather, temperature, humidity, and/or brightness)), and recommend control of a specific capability of the external device 201, which is most suitable at a current time point, according to a priority.

According to an embodiment, the processor 120 of the electronic device 101 may determine, based on a result of determination, a first capability (e.g., a main capability) and/or a second capability (e.g., sub capability), for the corresponding external device 201. According to an embodiment, the processor 120 of the electronic device 101 may configure and provide, based on a result of determination, a visual affordance related to the control of the external device 201.

According to various embodiments, the electronic device 101 may perform a role of central control equipment, a hub, an artificial intelligence device (e.g., an AI speaker, etc.), and/or a central server (or an integration server) for managing the external device 201 (or devices) around the electronic device 101 in a smart home environment. According to an embodiment, the electronic device 101 may perform a role of the server 301 illustrated in FIG. 5. When the electronic device 101 performs a role of the server 301, the configuration of the server 301 may not be included in the system 50 according to an embodiment of the disclosure.

According to an embodiment, the electronic device 101 may provide a function of controlling the external device 201 to the user through recommendation of control of a capability of the external device 201, based on information collected through a sensor of the electronic device 101 and/or information determined by the server 301. For example, the electronic device 101 may operate to understand a condition of a user temporarily to control a suitable capability of the external device 201 using a physical input device (or hardware) of the electronic device 101 (e.g., a smartphone, a watch, glasses, earbuds, an electronic pen, etc.) having high use accessibility of the user, and provide a user interface upon the control of the physical input device.

According to an embodiment, the server 301 may include a communication circuit 510 and a processor 520. According to an embodiment, although not shown in FIG. 5, the server 301 may include a memory. According to an embodiment, the server 301 may include, for example, an external device 201 management server or cloud sever. In an embodiment, the server 301 may include central control equipment, a hub, an artificial intelligence device, and/or a central server for managing the external device 201 in a smart home environment.

According to an embodiment, the server 301 may store data related to information on a history of operation of the external device 201, based on a user input. According to an embodiment, a function related to control of the external device 201 is performed by the server 301, the server 301 may be operatively associated with the electronic device 101 and the external device 201, and may perform situation recognition or monitoring for the external device 201.

According to an embodiment, the communication circuit 510 of the external device 301 may be a communicator including a circuit for communication processing. According to an embodiment, the communication circuit 510 may communicate with the electronic device 101 and the external device 201 through first designated communication (e.g., short-distance wireless communication) or second designated communication (e.g., long-distance wireless communication). According to an embodiment, the communication circuit 510 may transmit various information (e.g., identification information and operation information) related to the external device 201, based on control by the processor 520 of the server 301. According to an embodiment, the communication circuit 510 may receive, based on the control by the processor 520 of the server 301, control information related to control of the external device 201 (e.g., a command related to control of the external device 201) from the electronic device 101, and transmit the received control information to the external device 201. According to an embodiment, the communication circuit 510 may transmit, to the electronic device 101, identification information of the external device 201, information related to a capability of the external device 201, and/or information related to control of the external device 201. According to an embodiment, the communication circuit 510 may be connected to the electronic device 101 and/or the external device 201, based on a wireless communication channel, and transmit or receive various data through the connected communication channel.

According to an embodiment, the processor 520 of the server 301 may perform a related operation, based on communication with the electronic device 101 in relation to a control function (e.g., a handover control function) of the external device 201 according to various embodiments. According to an embodiment, the processor 520 may detect a trigger related to control of the external device 201 from the external device 201, and analyze a capability of controlling the external device 201, based on the detection of the trigger. According to an embodiment, the processor 520 of the server 301 may generate information related to the control of the external device 201, based on a result of the analysis, and control the communication circuit 510 to provide (e.g., transmit) the generated information to the electronic device 101.

According to an embodiment, the processor 520 of the server 301 may provide (e.g., transmit) information (e.g., a command) for the control of the external device 201, received from the electronic device 101, to the external device 201 so as to allow the external device 201 to perform a related capability according to the information. For example, the external device 201 may operate to control the corresponding capability, based on the information on the control of the external device 201, and output a result of the controlling.

According to various embodiments, FIG. 5 illustrates a configuration and an operation of the sever 301, but the configuration of the server 301 may be omitted from the system 50 according to an embodiment of the disclosure when the electronic device 101 includes a function of the server 301, for example.

According to an embodiment, the external device 201 may include various types of IoT devices 530, 540, 550, 560, and 570 which can be used and/or controlled by a user. For example, the external device 201 may be various devices such as a TV, a robot cleaner, a washing machine, an air purifier, a refrigerator, an air conditioner, an electric curtain, a door lock system, and/or a heating device. For example, FIG. 5 schematically illustrates the external device 201, but the external device 201 may include all or some of the elements of the electronic device 101 illustrated in FIG. 1.

According to an embodiment, the external device 201 may be connected to the electronic device 101 and/or the server 301, based on at least one of a direct (e.g., wired) communication channel and a wireless communication channel According to various embodiments, the external device 201 may provide various information related to an operation of the external device 201 to the electronic device 101 or the server 301, and receive information related to control of a capability from the electronic device 101 or the server 301. The external device 201 may operate to execute the corresponding capability, based on the received information (e.g., command) related to the control of the capability.

An electronic device 101 according to various embodiments of the disclosure may include a communication circuit (e.g., the communication module 192 of FIG. 1 or FIG. 4), a physical input device (e.g., the input module 150 of FIG. 1 or FIG. 4), and a processor (e.g., the processor 120 of FIG. 1 or FIG. 4). According to an embodiment, the processor 120 may detect a trigger related to control of an external device 201 from the electronic device. 101. According to an embodiment, the processor 120 may identify, based on the detection of the trigger, a capability to be controlled by the external device 201. According to an embodiment, the processor 120 may change a first function configured to cause a designated physical input device of the electronic device 101 to operate, to a second function related to control of the identified capability of the external device 201. According to an embodiment, the processor 120 may control, based on detection of a user input through the physical input device, the capability of the external device 201.

According to an embodiment, the processor 120 may control, in response to the detection of the user input from the physical input device, the capability of the external device 201 in association with the physical input device, and display a user interface corresponding to the capability control through the display module 160.

According to an embodiment, the processor 120 may detect a user input through the physical input device, generate, based on the detection of the user input, a command corresponding to the user input, and transmit the command to the external device 201 through the communication circuit.

According to an embodiment, the processor 120 may execute the second function corresponding to an operation of the physical input device, and transmit a command corresponding to the execution of the second function to the external device 201 through designated communication.

According to an embodiment, the processor 120 may directly transmit the command to the external device 201, or indirectly transmit the command to the external device 201 through a designated server 301.

According to an embodiment, the processor 120 may identify a capability to be controlled by the external device 201, and display a user interface related to control of the identified capability through the display module.

According to an embodiment, the processor 120 may provide, based on the detection of the trigger related to control of the external device 201, a corresponding visual affordance. According to an embodiment, the visual affordance may include a representative image and/or text which enables the external device and/or the capability to be controlled by the external device to be identified.

According to an embodiment, the processor 120 may provide the visual affordance through an area which is adjacent to the physical input device of the electronic device 101.

According to an embodiment, the processor 120 may provide, based on a designated area on a screen displayed through the display module 160, the visual affordance in a pop-up window.

According to an embodiment, the processor 120 may map, based on a user input based on the visual affordance, the physical input device to a function related to the control of the capability of the external device, and display a user interface related to the capability of the external device.

According to an embodiment, the processor 120 may release the first function mapped to the physical input device, and perform mapping so that the physical input device operates as the second function related to the capability of the external device.

According to an embodiment, the user interface may visually provide information related to a current level related to the capability to be controlled by the external device 201.

According to an embodiment, the processor 120 may darkly process a background of the electronic device 101 when providing the user interface, and visually distinguish the user interface.

Hereinafter, an operation of the electronic device 101 in various embodiments is described in detail. Operations performed by the electronic device 101 according to various embodiments may be executed by a processor 120 including various processing circuitries and/or executable problem elements of the electronic device 101. According to an embodiment, the operations performed by the electronic device 101 may be stored in a memory 130, and may be executed by instructions which, when executed, cause the processor 120 to operate.

Figure 6:
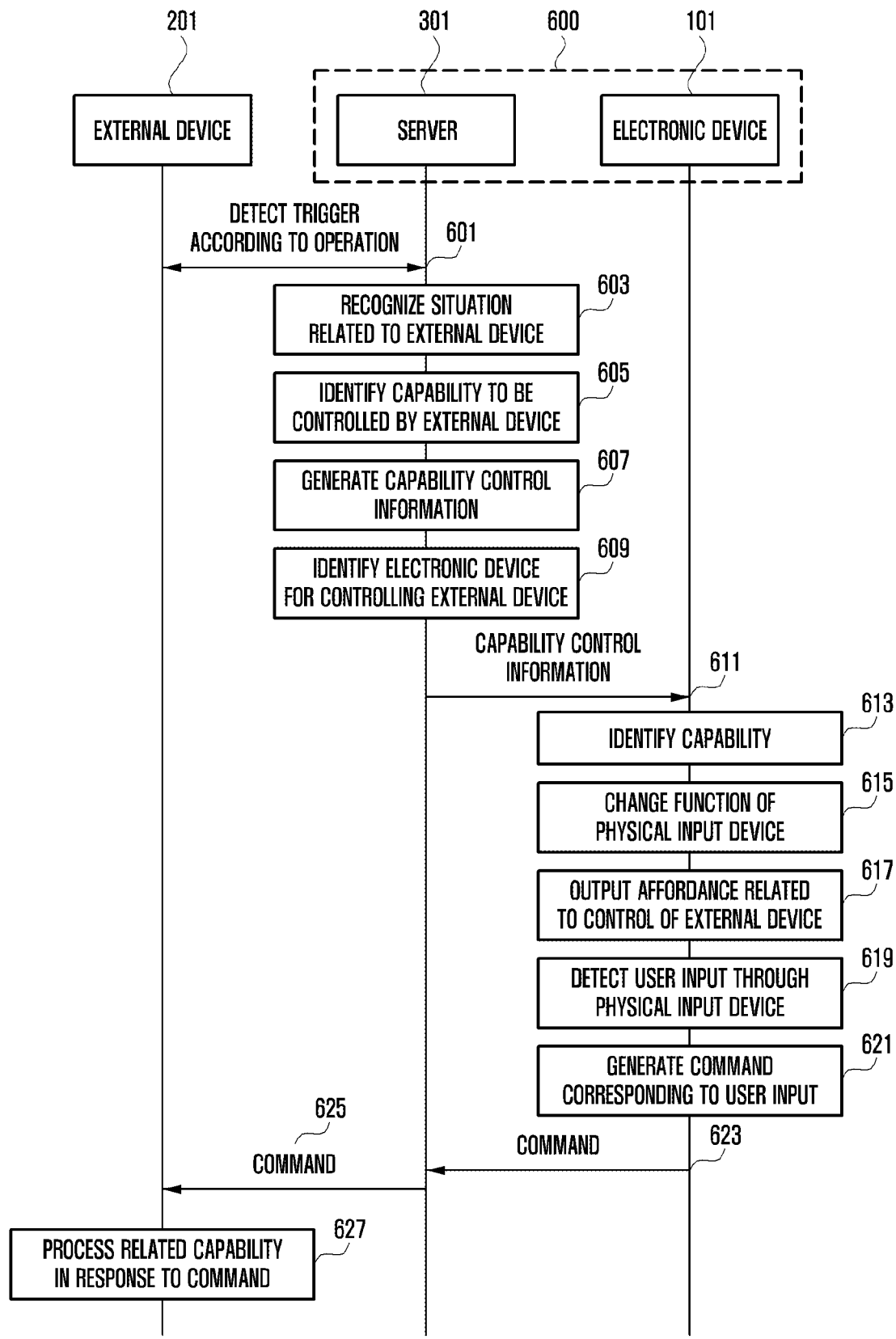
FIG. 6 is a flowchart illustrating an operation among various devices in a system according to various embodiments.

FIG. 6 is a flowchart illustrating an operation among various devices in a system according to various embodiments.

According to various embodiments, an example method for controlling an external device 201 disclosed herein may be performed according to, for example a flowchart illustrated in FIG. 6. The flowchart illustrated in FIG. 6 is merely provided as a flowchart according to an example embodiment of the method for controlling the external device 201, and the order of at least some operations may be changed, or the at least some operations may be simultaneously performed or independently performed. The flowchart illustrated in FIG. 6 illustrates an example of an operation performed through communication between an electronic device 101 and a server 301 according to a system 50 of the disclosure, and according to various embodiments, operations 601 to 625 according to FIG. 6 may be solely performed by a processor 120 of the electronic device 101. For example, the server 301 of the electronic device 101 may be implemented by one device 600 (e.g., the electronic device 101) having integrated roles, according to an embodiment.

Referring to FIG. 6, the method for controlling the external device 201 according to an embodiment may include: an operation 601 in which the server 301 detects a trigger according to an operation of the external device 201; an operation 603 in which the server 301 performs situation recognition related to the external device 201; an operation 605 in which the server 301 identifies a capability to be controlled by the external device 201, based on the situation recognition; an operation 607 in which the server 301 generates capability control information, based on the identified capability; an operation 609 in which the server 301 identifies the electronic device 101 to control (or which can control) the external device 201; an operation 611 in which the server 301 transmits the capability control information to the identified electronic device 101; an operation 613 in which the electronic device 101 identifies the capability of the external device 201, to be controlled, based on reception of the capability control information; an operation 615 in which the electronic device 101 changes a function of a physical input device, based on the identified capability of the external device 201; an operation 617 in which the electronic device 101 outputs an affordance related to the control of the external device 201; an operation 619 in which the electronic device 101 detects a user input through the physical input device; an operation 621 in which the electronic device 101 generates a command corresponding to the user input; an operation 623 in which the electronic device 101 transmits the command to the server 301; an operation 625 in which the server 301 transmits the command received from the electronic device 101 to the corresponding external device 201; and an operation 627 in which the external device 201 processes the related capability in response to the command.

Hereinafter, with reference to the drawing, the detailed contents of embodiments of each operation illustrated in FIG. 6 are described. Hereinafter, in describing the detailed contents of embodiments of each operation illustrated in FIG. 6, an example is described in which a function of controlling the external device 201 is integrated into the electronic device 101 and performed. For example, an embodiment in which all or some of the operations performed by the server 301 are performed by the electronic device 101 (e.g., the electronic device 101 of FIG. 2 or FIG. 3) is described.

Figure 7:
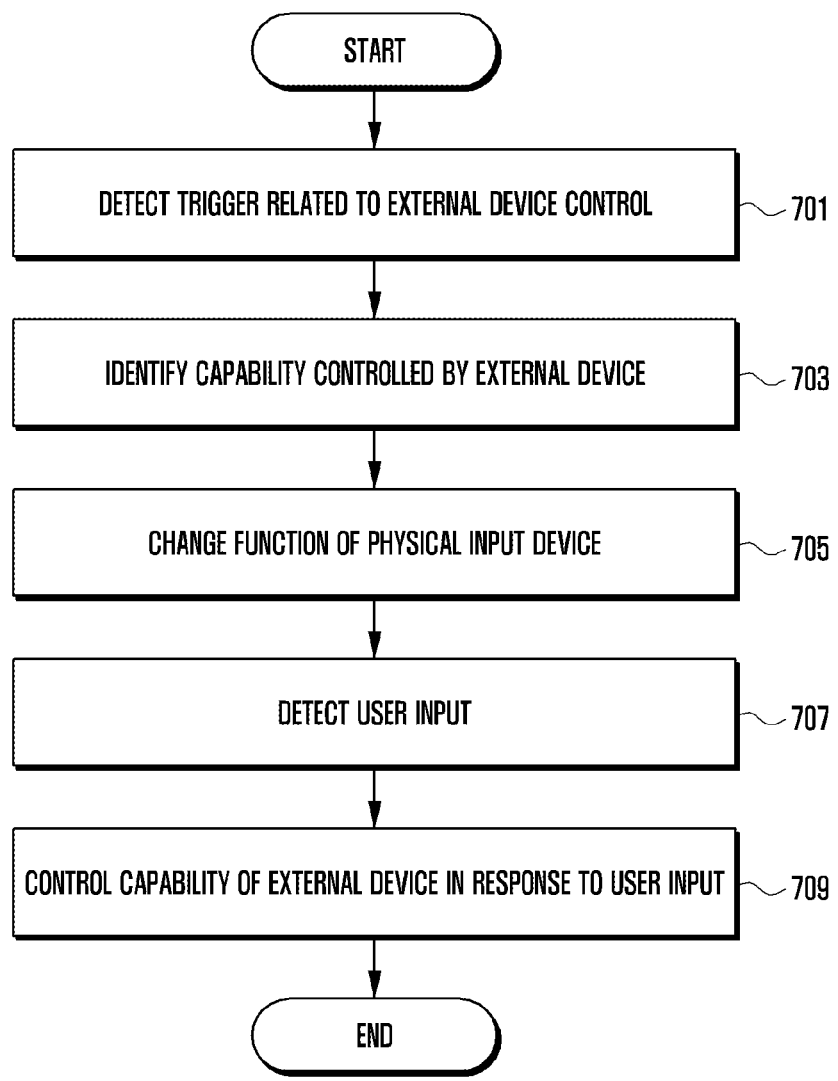
FIG. 7 is a flowchart illustrating an example operation method of an example electronic device according to various embodiments.

FIG. 7 is a flowchart illustrating an example operation method of an example electronic device according to various embodiments.

Referring to FIG. 7, in operation 701, a processor 120 of an electronic device 101 may detect a trigger (e.g., entrance into a handover control mode) related to control of an external device 201. According to an embodiment, the processor 120 may detect a trigger according to an operation of the external device 201. According to an embodiment, the processor 120 may detect a trigger, based on recognition of various situations related to the external device 201. In an example embodiment, the situation recognition may include an operation of recognizing various situations such as a state of an external device recently controlled by a user, whether an ambient environment (e.g., environment information relating to fine dust, noise, and/or temperature/humidity) of the user can be improved through at least one IoT device corresponding to the embodiment environment of the user, and/or a recommended environment based on the user's application and/or function use history. According to an embodiment, the processor 120 may detect a trigger, based on reception of information related to the control of the external device 201 from the server 301 through a communication module (e.g., the communication module 192 of FIG. 2).

In operation 703, the processor 120 may identify a capability to be controlled by the external device 201, based on the detection of the trigger. According to an embodiment, the processor 120 may identify a capability to be controlled by the external device 201, based on the situation recognition. According to an embodiment, the processor 120 may receive, from the server 301 through the communication module 192, information (e.g., capability control information) on the identified capability to be controlled, for the external device 201, and may identify the capability to be controlled by the external device 201, based on the received information.

In operation 705, the processor 120 may change a function of a physical input device (e.g., PUI) (e.g., the input module 150 of FIG. 4) of the electronic device 101. According to an embodiment, the processor 120 may change a first function (e.g., a default function, for example, volume control) designated to allow a designated physical input device of the electronic device 101 to operate, to a designated second function (e.g., controlling the brightness of a lighting device) related to capability control of the external device 201 (or may associate with a physical input device (e.g., PUI) of the external device 201 for capability control of the external device 201). According to an embodiment, the processor 120 may release the first function mapped to the physical input device, and perform mapping (or change) to the physical input device so as to operate as the second function (e.g., a device capability control function) related to the capability of the external device 201.

In operation 707, the processor 120 may detect a user input through the physical input device.

In operation 709, the processor 120 may control the capability of the external device 201, based on the user input through the physical input device. According to an embodiment, the processor 120 may generate a command corresponding the user input, based on the detection of the user input through the physical input device. According to an embodiment, in response to the detection of the user input from the physical input device, the processor 120 may execute a second function (e.g., brightness level increase/decrease) corresponding to the operation of the physical input device, and transmit a command (e.g., a brightness level increase/decrease control signal) corresponding to the execution of the second function to the external device 201 through designated communication. According to an embodiment, the processor 120 may directly transmit the command to the external device 201 or indirectly transmit the command to the external device 201 through the server 301.

Figure 8:
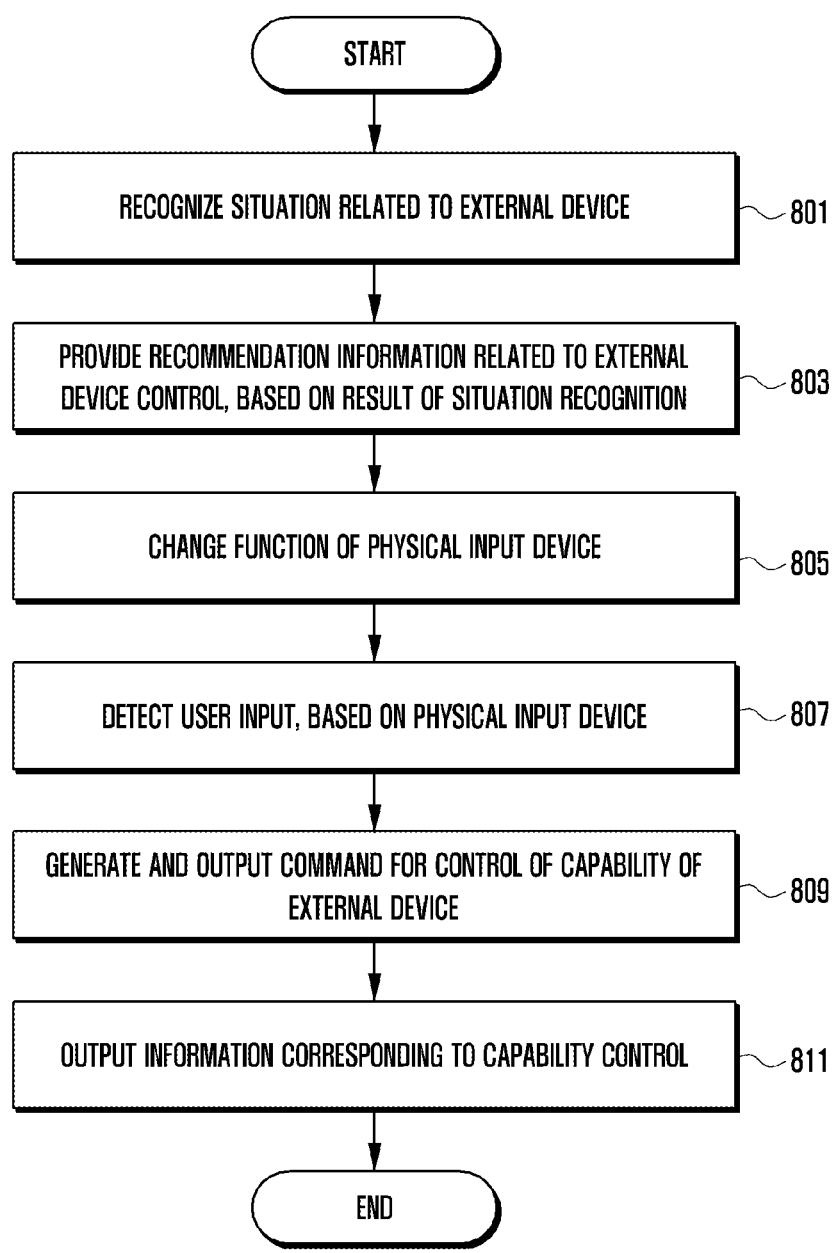
FIG. 8 is a flowchart illustrating an example operation method of an example electronic device according to various embodiments.

FIG. 8 is a flowchart illustrating an example operation method of an example electronic device according to various embodiments.

Referring to FIG. 8, in operation 801, a processor 120 of an electronic device 101 may perform situation recognition related to an external device 201. According to an embodiment, the processor 120 may perform recognition of various situations related to the external device 201, based, for example, on entrance into a handover control mode related to control of the external device 201. In an embodiment, the situation recognition may include an operation of recognizing various situations such as a state of an external device recently controlled by a user, whether an ambient environment (e.g., environment information relating to fine dust, noise, and/or temperature/humidity) of the user can be improved through at least one IoT device corresponding to the embodiment environment of the user, a recommended environment based on the user's application and/or function use history, and/or an on/off state of the external device 201.

In operation 803, the processor 120 may provide recommendation information related to the control of the external device 201, based on a result of the situation recognition. According to an embodiment, the processor 120 may output an affordance related to the control of the external device 201. According to an embodiment, the processor 120 may identify a capability to be performed by the external device 201, and provide a user interface related to control of the identified capability through a display module 160 (e.g., the display 240 or 330 of FIG. 2 or FIG. 3).

In operation 805, the processor 120 may change a function of a physical input device (e.g., PUI) (e.g., the input module 150 of FIG. 4). According to an embodiment, the processor 120 may change a first function (e.g., a default function, for example, volume control) designated to allow a designated physical input device of the electronic device 101 to operate, to a designated second function (e.g., controlling the brightness of a lighting device) related to capability control of the external device 201 (or may associate with a physical input device (e.g., PUI) of the external device 201 for capability control of the external device 201). According to an embodiment, the processor 120 may release the first function mapped to the physical input device, and perform mapping (or change) to the physical input device so as to operate as the second function (e.g., a device capability control function) related to the capability of the external device 201.

In operation 807, the processor 120 may detect a user input, based on the physical input device.

In operation 809, the processor 120 may generate and output a command for capability control of the external device 201. According to an embodiment, the processor 120 may control the capability of the external device 201, based on the detection of the user input through the physical input device. According to an embodiment, the processor 120 may generate a command corresponding to the user input, based on the detection of the user input through the physical input device. According to an embodiment, in response to the detection of the user input from the physical input device, the processor 120 may execute a second function (e.g., brightness level increase/decrease) corresponding to the operation of the physical input device, and transmit a command (e.g., a brightness level increase/decrease control signal) corresponding to the execution of the second function to the external device 201 through designated communication. According to an embodiment, the external device 201 may process (or perform) the capability related to the command associated with the physical input device of the electronic device 101.

In operation 811, the processor 120 may output information corresponding to the capability control. According to an embodiment, in response to the detection of the user input from the physical input device, the processor 120 may provide a related user interface corresponding to the capability control, through a display module (e.g., the display 240 or 330 of FIG. 2 or FIG. 3), while controlling the capability of the external device 201 in association with the physical input device.

In an embodiment, the order of operations 809 and 811 is not limited to the illustrated order, and operations 809 and 811 may be performed in a parallel (or substantially simultaneously), sequentially upon the illustrated order, reversely from the illustrated order, or heuristically.

Figure 9A:
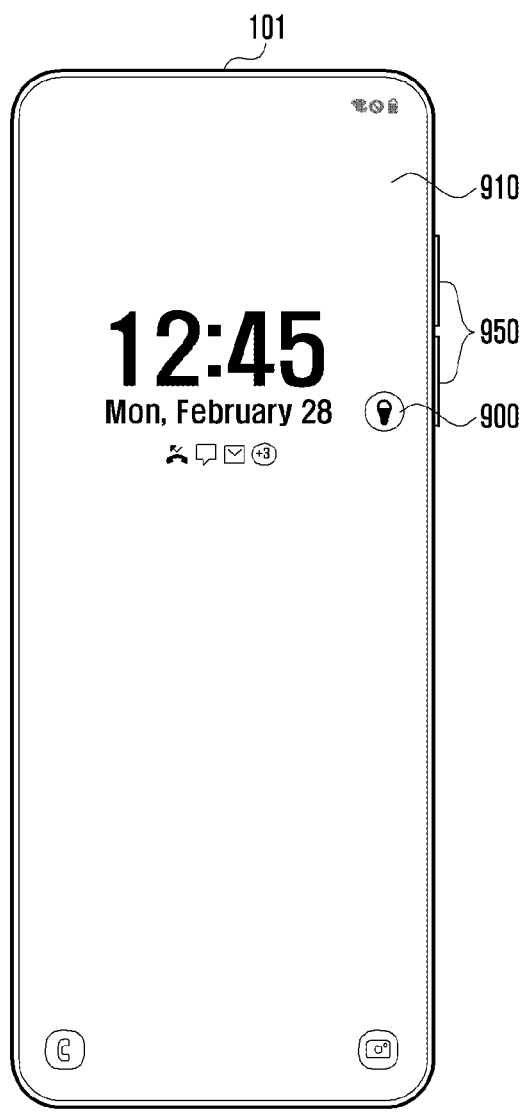
FIGS. 9A and 9B illustrate an example of providing an affordance related to control of an external device by an example electronic device according to various embodiments.
Figure 9B:
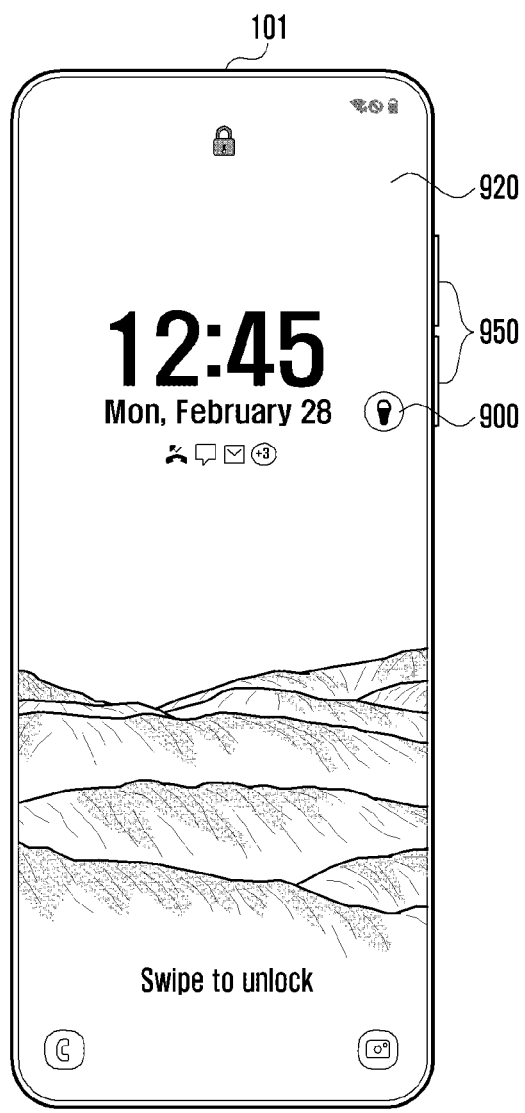

FIGS. 9A and 9B illustrate an example of providing an affordance related to control of an external device by an example electronic device according to various embodiments.

FIGS. 9A and 9B illustrates an example of providing a corresponding visual affordance 900 (e.g., GUI), based on detection of a trigger (e.g., entrance into a handover control mode) related to control of an external device 201 by an electronic device 101. In an embodiment, FIGS. 9A and 9B may indicate an example in which the electronic device 101 is a smartphone.

According to an embodiment, the visual affordance 900 may be provided through a designated identification object (or a representative object) which enables the external device 201 and/or a capability to be controlled by the external device 201 to be identified. For example, when the identified external device 201 is a lighting device, the electronic device 101 may provide, as a visual affordance 900, a representative image and/or text which can indicate the lighting device. In another example, when the identified device 201 is an air purifier, the electronic device 101 may provide, as a visual affordance 900, a representative image which can indicate the air purifier.

According to an embodiment, the visual affordance 900 may be provided through a designated area of an always on display (AOD) screen 910 when the electronic device 101 is in a screen-off state, as shown in FIG. 9A. According to an embodiment, the visual affordance 900 may be provided through a designated area of an execution screen 920 when the electronic device 101 is an operation state (e.g., a screen display state), as shown in FIG. 9B.

According to an embodiment, when providing the visual affordance 900, the electronic device may provide the same through a location (or area) adjacent to a physical input device 950 (e.g., a volume key) of the electronic device 101.

According to an embodiment, in the screen-off state as shown in FIG. 9A, the electronic device 101 may map the physical input device 950 to a function related to control of a capability of the external device 201, based on a first user input (e.g., a double tap) to the visual affordance 900, and provide a user interface related to the capability of the external device 201. According to an embodiment, in the screen display state as shown in FIG. 9B, the electronic device 101 may map the physical input device 950 to a function related to control of the capability of the external device 201, based on a second user input (e.g., a tap) to the visual affordance 900, and provide a user interface related to the capability of the external device 201.

Figure 10:
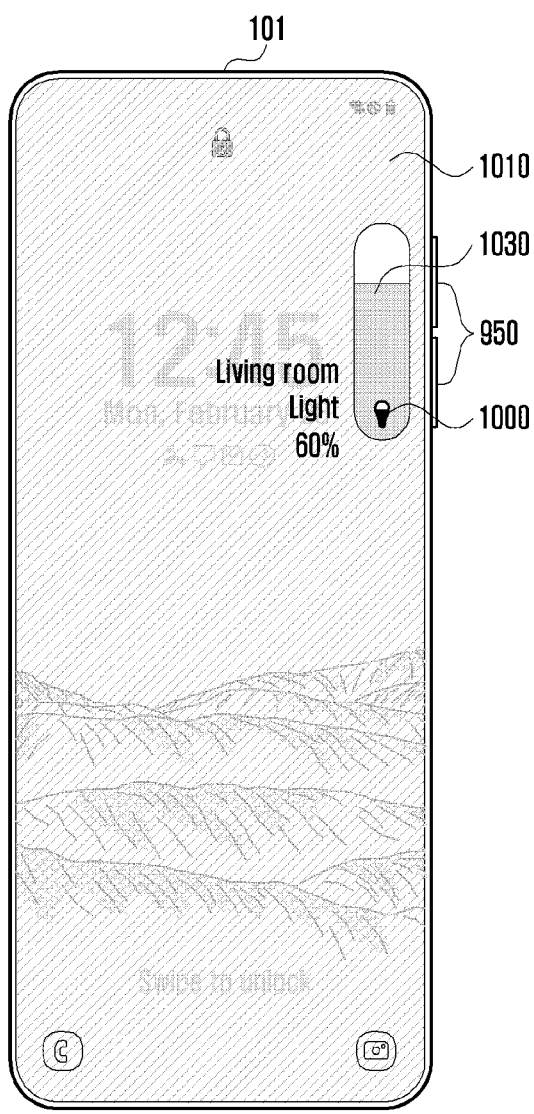
FIG. 10 illustrates an example of controlling an external device in association with a physical input device by an example electronic device according to various embodiments.

FIG. 10 illustrates an example of controlling an external device in association with a physical input device by an example electronic device according to various embodiments.

FIG. 10 illustrates an example of providing a user interface 1000 related to a capability of an external device 201 in response to a user input through the visual affordance in FIG. 9A or FIG. 9B. In an embodiment, FIG. 10 may indicate an example in which an electronic device 101 is a smartphone.

As shown in FIG. 10, the electronic device 101 may switch, in response to a user input to the visual affordance 900, a first object 900 indicating the visual affordance 900 to a second object 1000 (e.g., a capability control object) related to the capability to be controlled by the external device 201, and provide the same. In an embodiment, the switching from the first object 900 to the second object 1000 may include a scheme of extending the first object 900 in a predetermined direction and by a predetermined length, or include a scheme of substituting the first object 900 with a new second object 1000. According to an embodiment, the second object 1000 (e.g., the capability control object) may include information 1030 related to a current level (or range) related to the capability to be controlled by the external device 201, and may be visually provided. The display may also include text identifying the external object (e.g., living room light) and a numerical indicator indicating a current brightness (e.g., 60%) of the living room light.

According to an embodiment, when providing the second object 1000, the electronic device 101 may darkly process (e.g., gray-out or perform DIM processing for) a background 1010 (e.g., an AOD screen or an execution screen) of the electronic device 101, the background remaining after excluding the second object 1000, and provide the second object 1000 so that the second object is visually more distinguished.

FIGS. 11A, 11B, 12A, and 12B illustrate examples of providing an affordance related to control of an external device by an example electronic device according to various embodiments.

As illustrated in FIGS. 11A and 11B, an electronic device 101 according to various embodiments may detect a trigger (e.g., entrance into a handover control mode) related to control of an external device 201 in a first state 1110 (e.g., a screen-off state) in which the electronic device 101 is not being operated by a user as shown in FIG. 11A, or in a second state 1120 (e.g., a screen display state) in which the electronic device 101 is being operated, as shown in FIG. 11B. In an embodiment, FIGS. 11A, 11B, 12A, and 12B may indicate an example in which the electronic device 101 is a watch. According to an embodiment, when the electronic device 101 is a watch, the electronic device 101 may further include a rotatable bezel as a physical input device 1150.

FIGS. 12A and 12B may indicate an example of providing a corresponding visual affordance 1200 by the electronic device 101, based on detection of a trigger related to control of the external device 201 in the first state or the second state.

According to an embodiment, the visual affordance 1200 may be provided through a designated identification object (or a representative object) which enables the external device 201 and/or a capability of the external device 201 to be identified. For example, when the identified external device 201 is a lighting device, the electronic device 101 may provide, as a visual affordance 1200, a representative image and/or text (e.g., "Light") which can indicate the lighting device as in FIG. 12A. In another example, when the identified external device 201 is an air conditioner, the electronic device 101 may provide a visual affordance 1200 with a representative image and/or text (e.g., "Air conditioner") which may indicate the air conditioner.

According to an embodiment, the visual affordance 1200 may be provided through a notification of an operable (or controllable) external device 201 in a pop-up window (e.g., an upper pop-up window) through a designated area (e.g., an upper area) of an execution screen 1210 of the electronic device 101, as shown in FIG. 12A.

According to an embodiment, in the state as shown in FIG. 12A, the electronic device 101 may provide a user interface 1230 related to control of the external device 201 as shown in FIG. 12B, based on a first user input (e.g., swipe down) to the visual affordance 1200. According to an embodiment, the electronic device 101 may provide, based on the first user input to the visual affordance 1200, an operable (or controllable) external device 201 and a guide related to a capability to be controlled by the corresponding external device 201 through a designated user interface 1230, as shown in FIG. 12B. According to an embodiment, in the state as shown in FIG. 12B, the electronic device 101 may map, based on a second user input (e.g., an OK button touch) to the user interface 1230, the physical input device 1150 to a function related to control of the capability of the external device 201, and provide a user interface related to the capability of the external device 201.

According to an embodiment, in the first state or the second state as shown in FIGS. 11A and 11B, the electronic device 101 may also provide a user with a visual affordance for the operable external device 201, based detection of a trigger related to the control of the external device 201 according to the scheme as shown in FIG. 11A or FIG. 11B. According to an embodiment, in the state as shown in FIG. 11A or FIG. 11B, the electronic device 101 may map, based on a user input (e.g., swipe down or OK button touch) to the visual affordance, the physical input device 1150 to a function related to the control of the capability of the external device 201, and provide a user interface related to the capability of the external device 201.

Figure 13A:
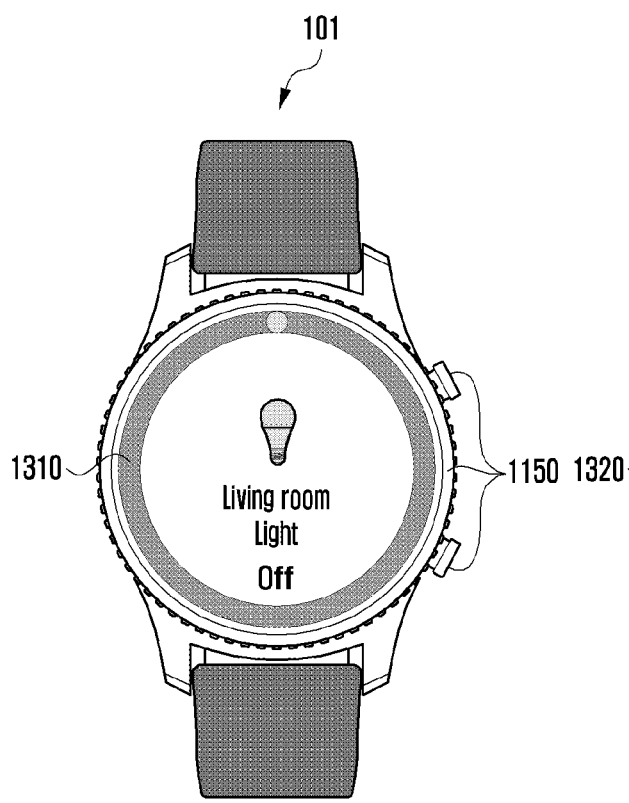
FIGS. 13A and 13B illustrate an example of controlling an external device in association with a physical input device by an example electronic device according to various embodiments.
Figure 13B:
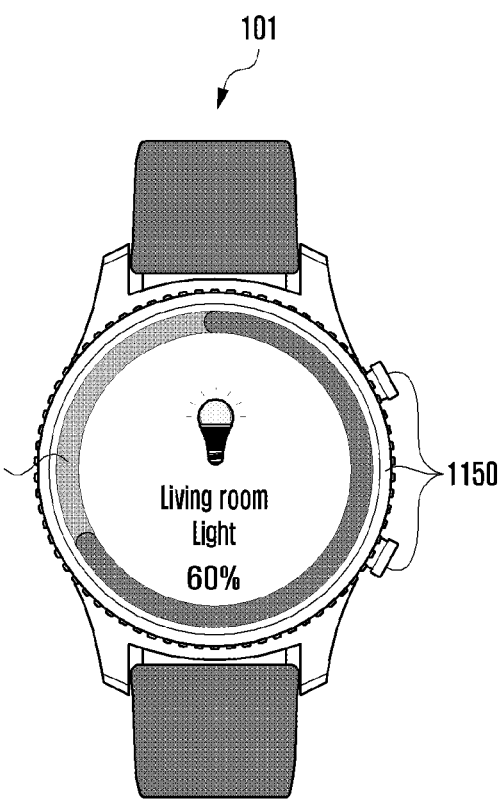

FIGS. 13A and 13B illustrate an example of controlling an external device in association with a physical input device by an electronic device according to various embodiments.

FIGS. 13A and 13B illustrate an example of providing a user interface 1310 or 1320 related to a capability of an external device 201 in response to a user input in FIG. 12A or FIG. 12B.

As illustrated in FIGS. 13A and 13B, when providing, in response to a user input, a user interface related to a capability to be controlled by the external device 201, the electronic device 101 may provide the user interface by reflecting or indicating a current state of the external device 201.

According to an embodiment, when the external device 201 is turned off, the electronic device 101 may provide a first user interface 1310 by including at least one related information piece (e.g., bezel area dim processing and off-state guide text) in the first user interface, so that the state in which the external device 201 is turned off can be indicated as shown in FIG. 13A.

According to an embodiment, when the external device 201 is turned on, the electronic device 101 may provide a second user interface 1320 by including at least one related information piece (e.g., bezel area slider activation and on-state guide text) in the second user interface, so that the state in which the external device 201 is turned on can be indicated as shown in FIG. 13B. According to an embodiment, the second user interface 1320 may be visually provided by including information related to a current level (or range) related to a capability to be controlled by the external device 201.

According to an embodiment, the electronic device 101 may switch a user interface and provide the same in response to turn-on control or turn-off control of the external device 201, based on a user input in the user interface 1310 or 1320. According to an embodiment, the electronic device 101 may provide the user interface by switching the same to the second user interface 1320 corresponding to turn-on control of the external device 201 in response to a designated user input (e.g., a tap) on a designated area (e.g., an area (or a screen central part) in which a representative image of the external device 201 is displayed) in the first user interface 1310. According to an embodiment, the electronic device 101 may provide the user interface by switching the same to the first user interface 1310 corresponding to turn-off control of the external device 201 in response to a designated user input (e.g., a tap) on a designated area (e.g., an area (or a screen central part) in which a representative image of the external device 201 is displayed) in the second user interface 1320.

FIGS. 14A, 14B, 14C, and 14D illustrate an example of an operation for control of an external device by an example electronic device according to various embodiments.

According to an embodiment, FIGS. 14A, 14B, 14C, and 14D may indicate an example in which an electronic device 101 is a watch. According to an embodiment, when the electronic device 101 is a watch, the electronic device 101 may further include a rotatable bezel as a physical input device 1450.

Figure 14A:
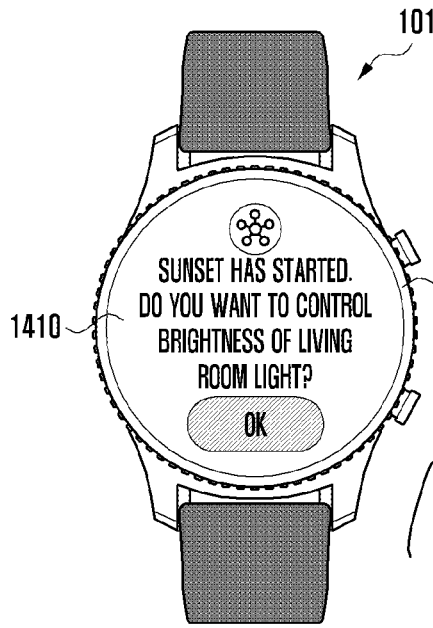
FIGS. 14A, 14B, 14C, and 14D illustrate an example of an operation for control of an external device by an example electronic device according to various embodiments.

Referring to FIG. 14A, the electronic device 101 may provide a corresponding visual affordance 1410 (e.g., GUI), based on detection of a trigger related to control of an external device 201. A user may recognize an operable (or controllable) external device 201, based on the visual affordance 1410, and perform a first user input (e.g., an OK button touch) for executing a control function of the external device 201. The electronic device 101 may detect entrance (or execution) of a handover control mode related to the control of the external device 201 in response to the first user input.

Figure 14B:
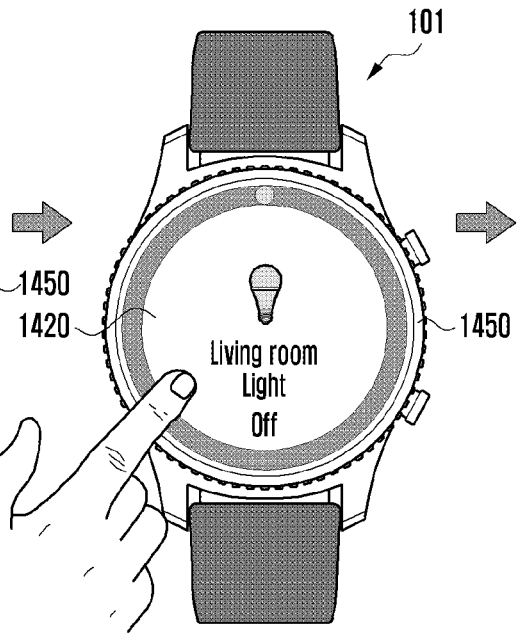
Figure 14C:
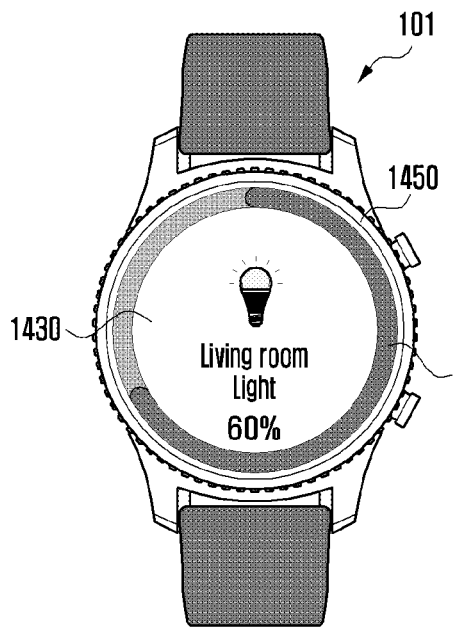

In FIG. 14B or FIG. 14C, the electronic device 101 may provide, in response to the first user input, a user interface 1420 or 1430 related to a capability to be controlled by the external device 201. According to an embodiment, when providing, in response to the first user input, a user interface related to the capability to be controlled by the external device 201, the electronic device 101 may provide the user interface by indicating or reflecting a current state of the external device 201. According to an embodiment, the electronic device 101 may perform, based on entrance into a handover control mode related to the control of the external device 201, recognition of various situations related to the external device 201. In an embodiment, the situation recognition may include an operation of recognizing various situations such as a state of an external device recently controlled by a user, whether an ambient environment (e.g., environment information relating to fine dust, noise, and/or temperature/humidity) of the user can be improved through at least one IoT device corresponding to the embodiment environment of the user, a recommended environment based on the user's application and/or function use history, and/or an on/off state of the external device 201.

According to an embodiment, when the external device 201 is turned off, the electronic device 101 may provide a user interface 1420 by including at least one related information piece (e.g., bezel area dim processing and off-state guide text) in the user interface, so that the state in which the external device 201 is turned off can be indicated as shown in FIG. 14B. According to an embodiment, when the external device 201 is turned on, the electronic device 101 may provide a user interface 1430 by including at least one related information piece (e.g., bezel area slider 1470 activation and on-state guide text) in the user interface, so that the state in which the external device 201 is turned on can be indicated as shown in FIG. 14C. According to an embodiment, the second user interface 1420 may include, in a bezel area slider 1470, information related to a current level (or range) related to the capability to be controlled by the external device 201, and may be visually provided.

According to an embodiment, the electronic device 101 may switch a user interface 1420 or 1430 and provide the same in response to turn-on control or turn-off control of the external device 201, based on a user input in the user interface 1420 or 1430. According to an embodiment, the electronic device 101 may provide the user interface by switching the same to the user interface 1430 of FIG. 14C corresponding to turn-on control of the external device 201 in response to a designated user input (e.g., a tap) on a designated area (e.g., an area (or a screen central part) in which a representative image of the external device 201 is displayed) in the user interface 1420 of FIG. 14B. According to an embodiment, the electronic device 101 may provide the user interface by switching the same to the user interface 1420 of FIG. 14B corresponding to turn-off control of the external device 201 in response to a designated user input (e.g., a tap) on a designated area (e.g., an area (or a screen central part) in which a representative image of the external device 201 is displayed) in the user interface 1430 of FIG. 14C.

Figure 14D:
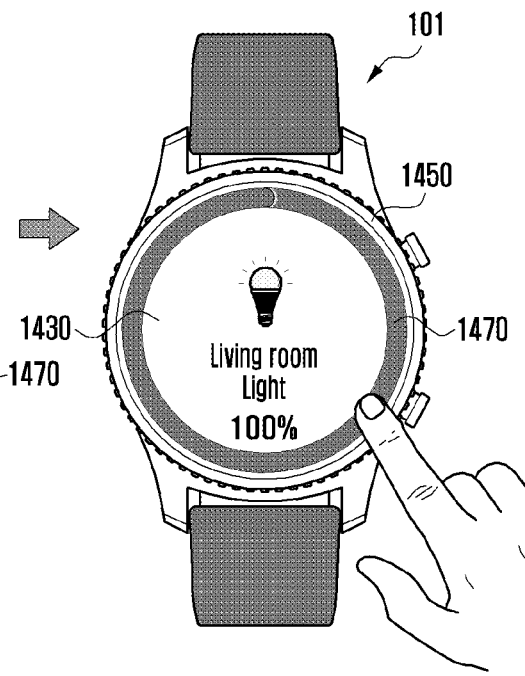

In FIG. 14D, the electronic device 101 may detect a second user input, based on a physical input device 1450. According to an embodiment, the electronic device 101 may output information corresponding to capability control, based on the detection of the second user input through the physical input device 1450. According to an embodiment, the electronic device 101 may adjust and provide a related user interface (e.g., a bezel area slider 1470) corresponding to the capability control, while controlling, in response to the detection of the second user input from the physical input device 1450, the capability of the external device 201 in association with the physical input device 1450. For example, the electronic device 101 may execute, in response to the detection of the user input from the physical input device 1450, a function (e.g., brightness control) corresponding to an operation of the physical input device 1450, and provide the bezel area slider 1470 by changing, in response to the execution of the function, the same according to a level (or range) corresponding to a change (e.g., brightness level increase/decrease) in the capability controlled by the external device 201.

FIGS. 15A, 15B, and 15C illustrate examples of various operations for control of an external device by an example electronic device according to various embodiments.

According to an embodiment, FIGS. 15A, 15B, and 15C may indicate an example of an operation of a watch-type electronic device 101 as illustrated in FIG. 14. According to an embedment, when the electronic device 101 is a watch, the electronic device 101 may further include a rotatable bezel as a physical input device. The operations performed by the electronic device 101 in FIGS. 15A, 15B, and 15C may be identical or similar to the operation illustrated in FIG. 14, and a corresponding detailed description will not be repeated.

FIG. 15A may indicate an example of providing a user interface when an external device 201 to be controlled in association with a physical input device of the electronic device 101 is an air purifier.

As illustrated in FIG. 15A, the electronic device 101 may provide a corresponding visual affordance 1510 (e.g., GUI), based on detection of a trigger related to control of the electronic device 201. A user may recognize, based on the visual affordance 1510, an operable (or controllable) external device 201 (e.g., an air purifier), and perform a user input (e.g., an OK button touch) for executing a control function of the external device 201.

The electronic device 101 may provide, based on the user input, a user interface designated in response to a current state (e.g., an on/off state) of the external device 201. According to an embodiment, when providing the user interface, the electronic device 101 may provide different types of sliders enabling adjustment of a control level in the user interface, according to a type of the external device 201 and/or the capability to be controlled by the external device 201. FIG. 15A may indicate an example of providing a stage slider 1520 through the user interface.

According to an embodiment, the electronic device 101 may change, based on the user input to the physical input device (e.g., bezel), the stage slider 1520 of the user interface, and provide the same. According to an embodiment, the electronic device 101 may adjust and provide a related user interface (e.g., the stage slider 1520) corresponding to capability control, while controlling, based on the detection of the user input through the physical input device, the capability (e.g., the configured air quality) of the external device 201 in association with the physical input device. For example, the electronic device 101 may change, in response to the detection of the user input from the physical input device, the stage slider 1520 according to the level of the capability (e.g., the configured air quality) controlled by the external device 201, and provide the same.

FIG. 15B may indicate an example of providing a user interface when the external device 201 to be controlled in association with the physical input device of the electronic device 101 is an air conditioner.

As illustrated in FIG. 15B, the electronic device 101 may provide a corresponding visual affordance 1530 (e.g., GUI), based on detection of a trigger related to control of the external device 201. A user may recognize, based on the visual affordance 1530, an operable (or controllable) external device 201 (e.g., air conditioner), and perform a user input (e.g., an OK button touch) for executing a control function of the external device 201.

The electronic device 101 may provide, based on the user input, a user interface designated in response to a current state (e.g., an on/off state) of the external device 201. According to an embodiment, when providing the user interface, the electronic device 101 may provide different types of sliders enabling adjustment of a control level in the user interface, according to a type of the external device 201 and/or the capability to be controlled by the external device 201. FIG. 15B may indicate an example of providing a percentage slider 1540 through the user interface.

According to an embodiment, the electronic device 101 may change, based on the user input to the physical input device (e.g., bezel), the percentage slider 1540 of the user interface, and provide the same. According to an embodiment, the electronic device 101 may adjust and provide a related user interface (e.g., the percentage slider 1540) corresponding to capability control, while controlling, based on the detection of the user input through the physical input device, the capability (e.g., the configured temperature) of the external device 201 in association with the physical input device. For example, the electronic device 101 may change, in response to the detection of the user input from the physical input device, the percentage slider 1540 according to the level of the capability (e.g., the configured temperature) controlled by the external device 201, and provide the same.

FIG. 15C may indicate an example of providing a user interface when the external device 201 to be controlled in association with the physical input device of the electronic device 101 is a lighting device.

As illustrated in FIG. 15C, the electronic device 101 may provide a corresponding visual affordance 1550 (e.g., GUI), based on detection of a trigger related to control of the external device 201. A user may recognize, based on the visual affordance 1550, an operable (or controllable) external device 201 (e.g., lighting device), and perform a user input (e.g., an OK button touch) for executing a control function of the external device 201.

The electronic device 101 may provide, based on the user input, a user interface designated in response to a current state (e.g., an on/off state) of the external device 201. According to an embodiment, when providing the user interface, the electronic device 101 may provide different types of sliders enabling adjustment of a control level in the user interface, according to a type of the external device 201 and/or the capability to be controlled by the external device 201. FIG. 15C may indicate an example of providing a color slider 1560 through the user interface.

According to an embodiment, the electronic device 101 may change, based on the user input to the physical input device (e.g., bezel), the color slider 1560 of the user interface, and provide the same. According to an embodiment, the electronic device 101 may adjust and provide a related user interface (e.g., the color slider 1560) corresponding to capability control, while controlling, based on the detection of the user input through the physical input device, the capability (e.g., lighting color) of the external device 201 in association with the physical input device. For example, the electronic device 101 may change, in response to the detection of the user input from the physical input device, the color slider 1560 according to the level of the capability (e.g., the configured color) controlled by the external device 201, and provide the same.

Figure 16:
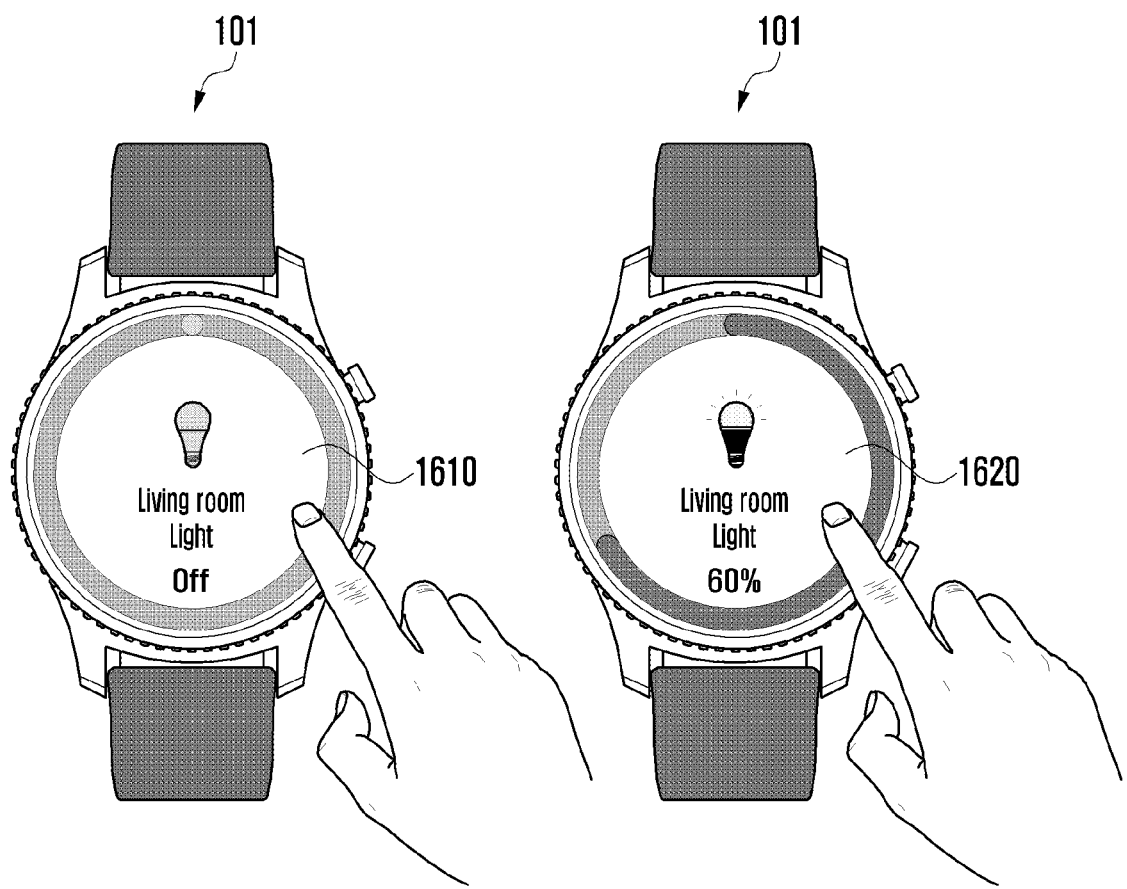
FIG. 16 illustrates an example of an operation of controlling a capability of an external device by an example electronic device according to various embodiments.

FIG. 16 illustrates an example of an operation of controlling a capability of an external device by an example electronic device according to various embodiments.

FIG. 16 may indicate an example of controlling a first capability (e.g., a main capability or a mandatory capability) of an external device 201 by an electronic device 101.

According to an embodiment, the electronic device 101 may switch a user interface and provide the same in response to turn-on control or turn-off control of the external device 201, based on a user input in a user interface 1610 or 1620.

According to an embodiment, the electronic device 101 may perform turn-on control of the external device 201, based on a user input (e.g., a tap) on a designated area (e.g., an area (or a screen central part) in which a representative image of the external device 201 is displayed) in the first user interface 1610. According to an embodiment, the external device 201 in the off-state may be turned on in response to the turn-on control of the electronic device 101. According to an embodiment, the electronic device 101 may switch, in response to turning on of the external device 201, the user interface from the first user interface 1610 to the second user interface 1620, and provide the same.

According to an embodiment, the electronic device 101 may perform turn-off control of the external device 201, based on a user input (e.g., a tap) on a designated area (e.g., an area (or a screen central part) in which a representative image of the external device 201 is displayed) in the second user interface 1620. According to an embodiment, the external device 201 in the on-state may be turned off in response to the turn-off control of the electronic device 101. According to an embodiment, the electronic device 101 may switch, in response to turning off of the external device 201, the user interface from the second user interface 1620 to the first user interface 1610, and provide the same.

FIGS. 17A, 17B, 17C, 17D, 17E, and 17F illustrate examples of an operation of controlling a capability of an external device by an electronic device according to various embodiments.

FIGS. 17A-17F may indicate an example of controlling at least one second capability (e.g., a sub capability) of an external device 201 and/or simultaneously a first capability and a second capability by an electronic device 101. For example, FIGS. 17A-17F may indicate an example of consecutively controlling the first capability and the second capability of the external device 201 using a physical input device (e.g., a bezel) of the electronic device 101.

Figure 17A:
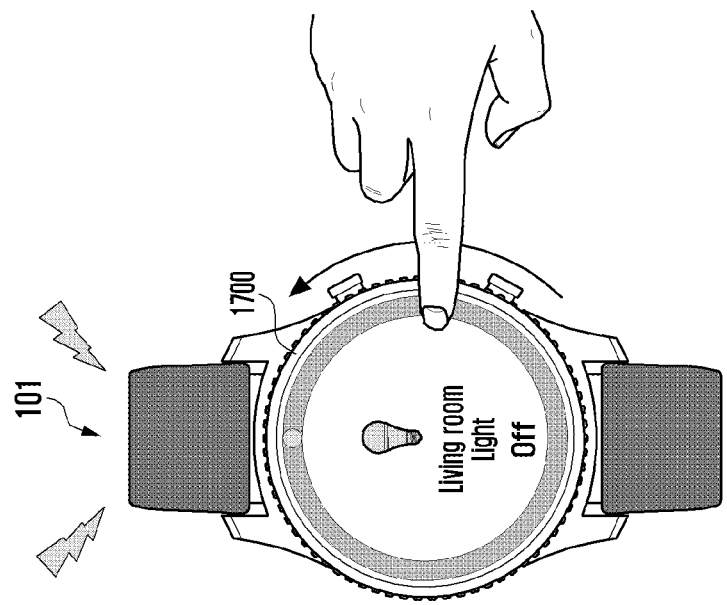
FIGS. 17A, 17B, 17C, 17D, 17E, and 17F illustrate examples of an operation of controlling a capability of an external device by an example electronic device according to various embodiments.
Figure 17B:
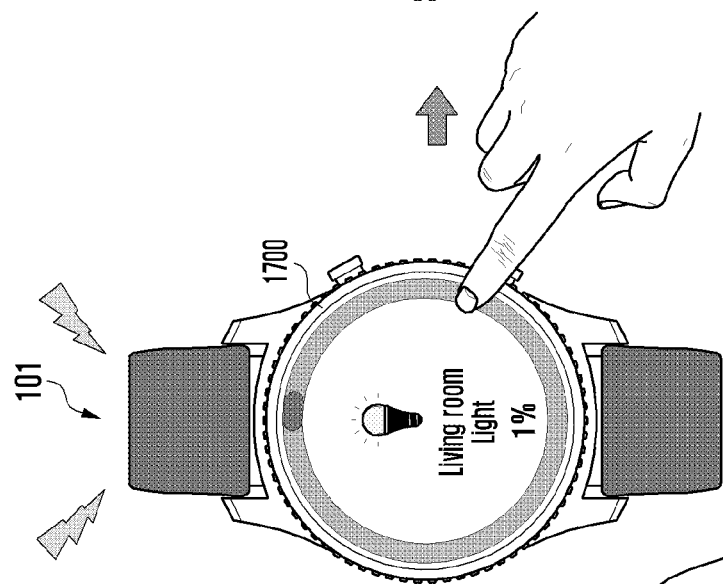
Figure 17C:
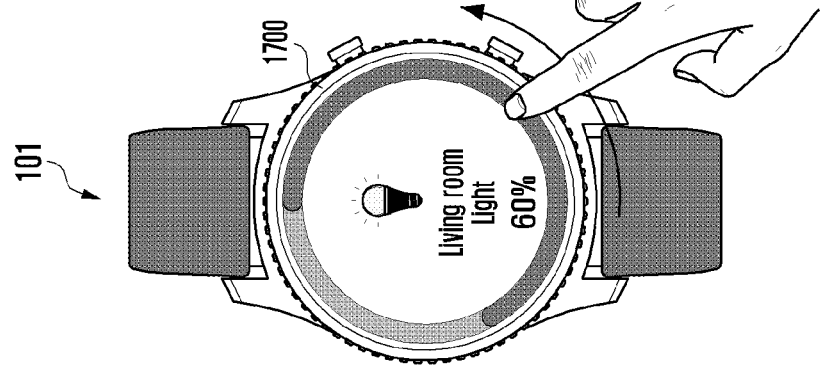

In FIGS. 17A, 17B, and 17C, the electronic device 101 may control a second capability (e.g., a sub capability) of the external device 201 in response to a user input using a physical input device 1700. According to an embodiment, a user may control (e.g., perform counterclockwise rotation of) the physical input device 1700 (e.g., bezel) to gradually control the second capability (e.g., brightness) of the external device 201 (e.g., control the brightness to be gradually decreased). According to an embodiment, the electronic device 101 may control, in response to the user input using the physical input device 1700, the second capability of the external device 201, change, in response to the control of the second capability of the external device 201, in real time, a slider (e.g., decrease a slider) according to the level of the second capability controlled by the external device 201, through a user interface, and provide the same.

According to an embodiment, FIG. 17B may indicate an example of a case where the slider reaches a designated end point upon the user input using the physical input device 1700. According to an embodiment, if reaching the designated end point by the slider in response to the user input is detected, the electronic device 101 may stop moving the slider at a designated minimum value (e.g., about 1%) related to a second capability (e.g., a sub capability such as decreasing the brightness of the external device 201), in combination with a designated type output (e.g., a haptic output).

According to an embodiment, FIG. 17C may indicate an example of a case where the slider exceeds a designated end point upon the user input using the physical input device 1700. According to an embodiment, if an additional input (e.g., a counterclockwise rotation) by the physical input device 1700 is detected at the designated end point, the electronic device 101 may control a function corresponding to a first capability (e.g., a main capability such as turning off the external device 201), in combination with a designated type output (e.g., a haptic output).

Figure 17D:
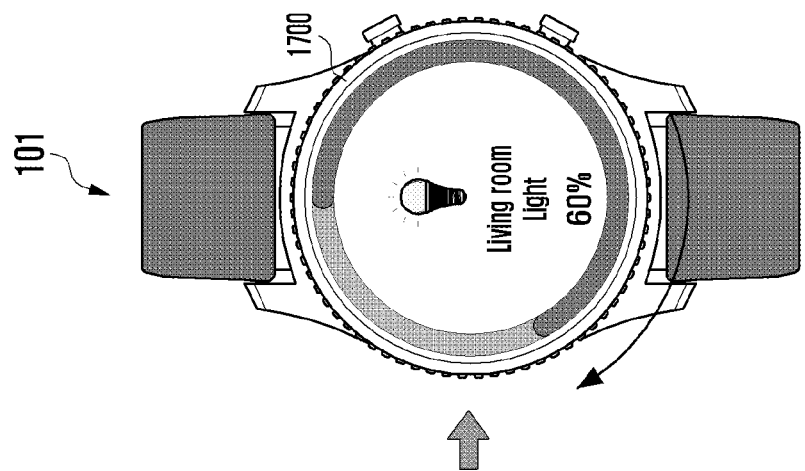
Figure 17E:
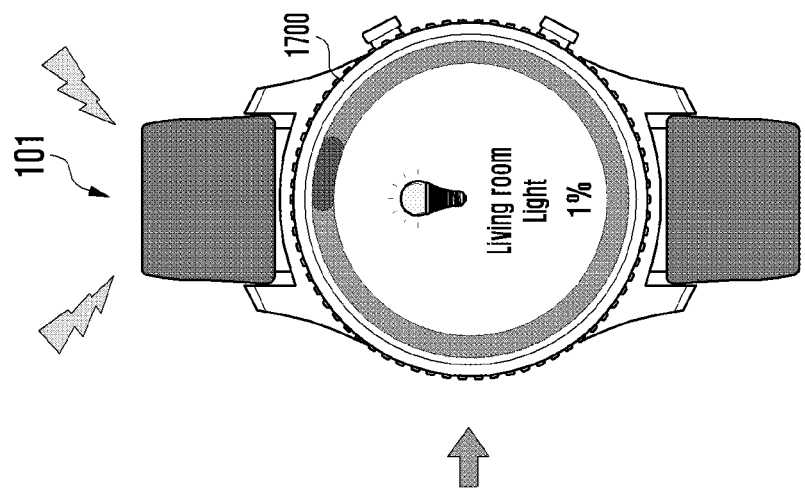
Figure 17F:
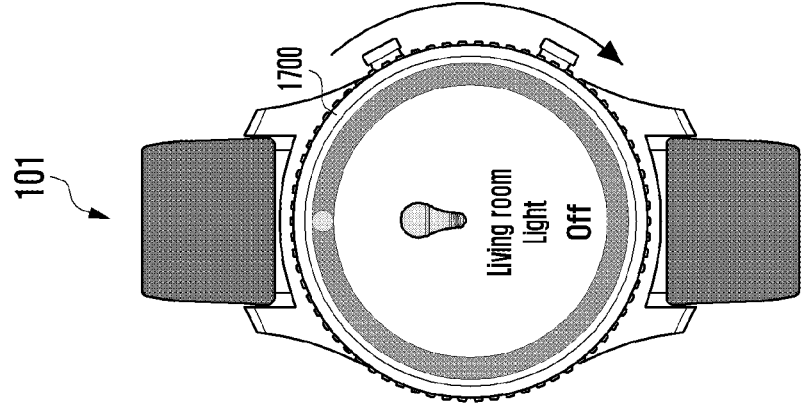

Referring to FIGS. 17D, 17E, and 17F, the electronic device 101 may control a second capability (e.g., a sub capability) of the external device 201 in response to a user input using a physical input device 1700. According to an embodiment, a user may control (e.g., perform counterclockwise rotation of) the physical input device 1700 (e.g., bezel) to control the first capability (e.g., brightness) of the external device 201 (e.g., control the main capability such as turning on the external device 201) in the state as shown in FIG. 17C. FIG. 17D may indicate an example of a case where a slider initiates an operation at a designated end point upon the user input using the physical input device 1700.

According to an embodiment, if an input (e.g., a clockwise rotation) by the physical input device 1700 is detected at the designated end point, the electronic device 101 may control a second capability (e.g., a sub capability such as increasing the brightness of the external device 201), in combination with a designated type output (e.g., a haptic output), as shown in FIG. 17E.

According to an embodiment, as shown in FIG. 17F, the electronic device 101 may control, in response to an additional user input (e.g., a clockwise rotation) by the physical input device 1700, the second capability of the external device 201, change, in response to the control of the second capability of the external device 201, in real time, a slider (e.g., increase a slider) according to the level of the second capability controlled by the external device 201, through a user interface, and provide the same.

Figure 18A:
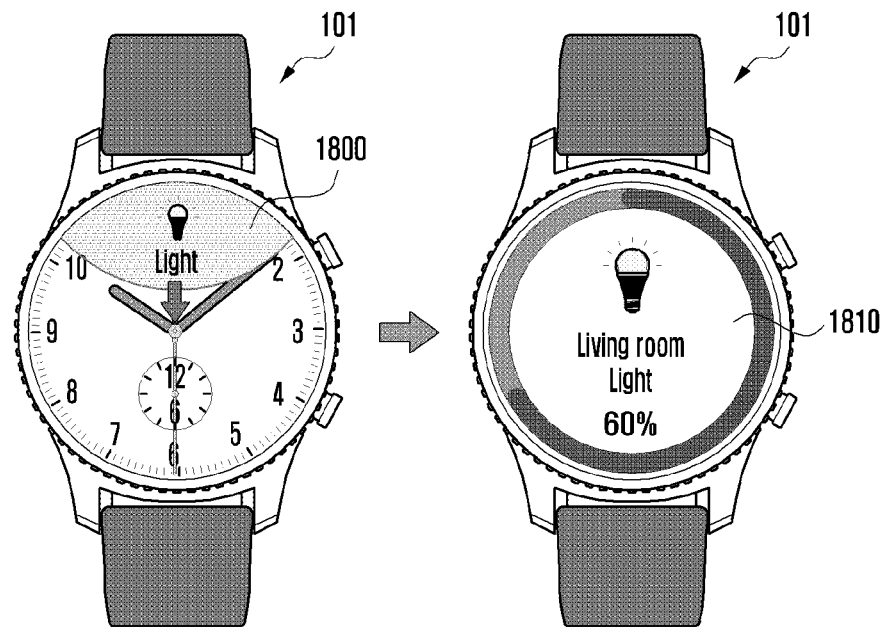
FIGS. 18A and 18B illustrate an example of providing an affordance related to control of an external device by an example electronic device according to various embodiments.
Figure 18B:
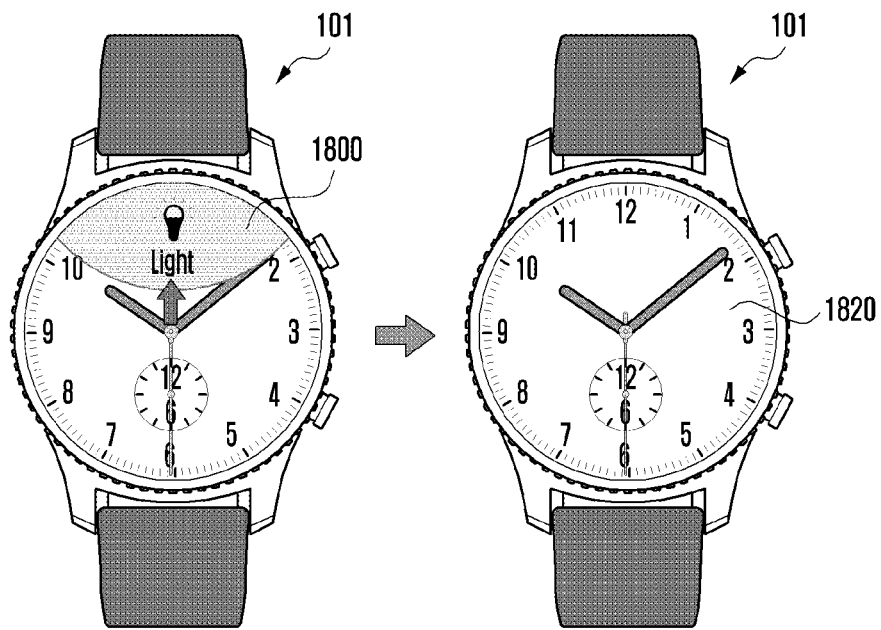

FIGS. 18A and 18B illustrate an example of providing an affordance related to control of an external device by an electronic device according to various embodiments.

FIGS. 18A and 18B may indicate an example of providing a corresponding visual affordance 1800 (e.g., GUI) by an electronic device 101, based on detection of a trigger related to control of an external device 201.

According to an embodiment, the visual affordance 1800 may be provided through a designated identification object (or representative object) which enables the external device 201 and/or a capability to be controlled to the external device 201 to be identified. According to an embodiment, the visual affordance 1800 may be provided through a notification of an operable (or controllable) external device 201 in a pop-up window (e.g., an upper pop-up window) through a designated area (e.g., an upper area) of an execution screen of the electronic device 101, as shown in FIGS. 18A and 18B.

According to an embodiment, the electronic device 101 may provide a user interface 1810 related to control of the external device 201, based on a first user input (e.g., swipe down) to the visual affordance 1800, as shown in FIG. 18A. According to an embodiment, the electronic device 101 may provide a guide related to an operable (or controllable) external device 201 and a capability to be controlled by the external device 201, through the user interface 1810, based on the first user input to the visual affordance 1800. For example, a user may determine whether to execute a function for controlling the external device 201, based on the visual affordance 1800. According to an embodiment, when determining the execution of the function, the user may cause the electronic device 101 to execute the function, through a designated first user input related to the execution of the function.

According to an embodiment, the electronic device 101 may provide an execution screen 1820 that is being executed, based on a second user input (e.g., swipe up) to the visual affordance 1800, as shown in FIG. 18B. For example, the user may determine whether to perform a function for controlling the external device 201, based on the visual affordance 1800. According to an embodiment, when determining not to execute the function, the user may cause the electronic device 101 to cancel the execution of the function, through a designated second user input related to non-execution of the function.

According to an embodiment, as illustrated in FIGS. 18A and 18B, the electronic device 101 may identify the user's intention, and determine whether to perform the execution of the function related to the control of the external device 201, based on the user's intention.

Figure 19:
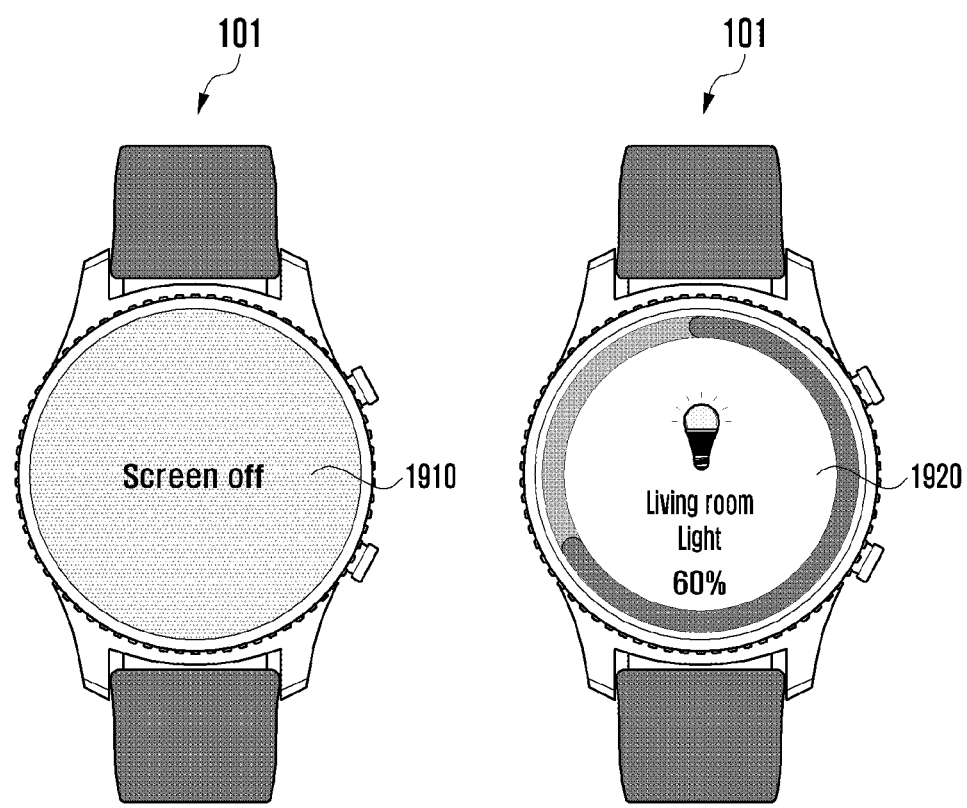
FIG. 19 illustrates an example of an operation based on a state of an example electronic device according to various embodiments.

FIG. 19 illustrates an example of an operation based on a state of an example electronic device according to various embodiments.

According to an embodiment, FIG. 19 may indicate an example of always (or automatically) executing a function for control of an external device 201 by an electronic device 101 in a smart home environment (e.g., indoors).

Referring to FIG. 19, the electronic device 101 may detect a trigger (e.g., entrance into a handover control mode) related to control of the external device 201 in a first state 1910 (e.g., a screen-off state) corresponding to a state in which the electronic device is being operated by a user. According to an embodiment, the electronic device 101 may configure a standby mode related to the control of the external device 201 in the first state, based on the detection of the trigger related to the control of the external device 201.

According to an embodiment, the electronic device 101 may detect, in the standby mode state, a designated user input (e.g., lifting up the electronic device 101, touching a screen, or controlling a physical input device) for wake-up of the electronic device 101. According to an embodiment, the electronic device 101 may immediately execute and provide, based on the detection of the designated user input, a user interface 1920 including a guide related to an operable (or controllable) external device 201 identified during the detection of the trigger, and a capability to be controlled by the external device 201. According to an embodiment, the electronic device 101 may include an operation of mapping a function related to control of the capability of the external device 201 to a physical input device, based on the user input.

Figure 20:
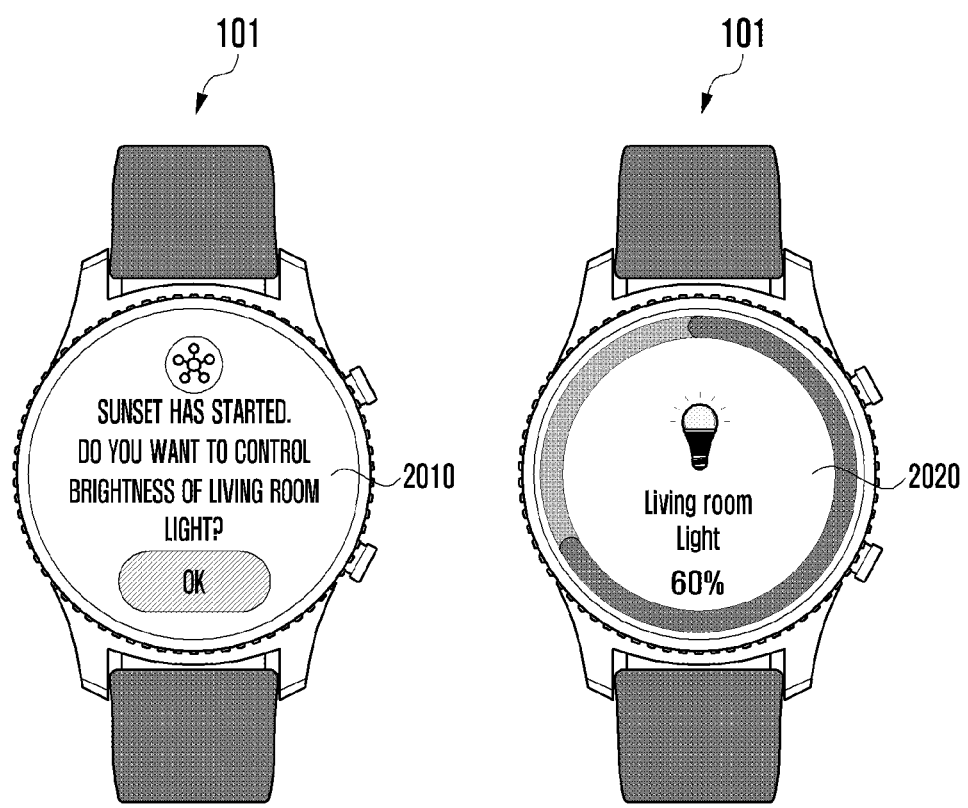
FIG. 20 illustrates an example user interface provided by an example electronic device according to various embodiments.

FIG. 20 illustrates an example user interface provided by an example electronic device according to various embodiments.

According to an embodiment, FIG. 20 may indicate an example of providing a notification of an operable external device by an electronic device 101.

Referring to FIG. 20, the electronic device 101 may provide a corresponding visual affordance 2010 (e.g., GUI), based on detection of a trigger related to control of an external device 201. According to an embodiment, the visual affordance 2010 may be provided through a representative image and/or text (e.g., a guide message) which enables the external device 201 and/or a capability to be controlled by the external device 201 to be identified.

According to an embodiment, the electronic device 101 may map a function related to the control of the capability of the external device 201 to a physical input device, based on a user input (e.g., an OK button touch) to the visual affordance 2010, and provide a user interface 2020 related to the capability of the external device 201.

FIGS. 21A, 21B, 21C, 21D, and 21E illustrate an example user interface related to control of an external device by an example electronic device according to various embodiments.

According to an embodiment, FIGS. 21A-21E may indicate an example of detecting a trigger, based on recognizing an external device 201 recently operated around an electronic device 101 (e.g., an external device 201, the operation execution of which is currently detected), or based on recognizing, based on an operation log of the external device 201, an actuator-type external device 201 around the electronic device 101. According to an embodiment, upon a configuration of the electronic device and based on the detection of the trigger, the electronic device 101 may provide a visual affordance according to a designated scheme, or enter into a state in which a capability of the external device 201 is immediately controllable.

Referring to FIG. 21A, the electronic device 101, in a first state (e.g., a screen-off state) corresponding to a state in which the electronic device is being operated by a user, or in a second state (e.g., a screen display state) corresponding to a state in which the electronic device 101 is not being operated, may detect a trigger (e.g., entrance into a handover control mode) related to control of the external device 201.

In FIG. 21B, the electronic device 101 may provide a corresponding visual affordance 2110 (e.g., GUI), based on the detection of a trigger related to the control of the external device 201 in the first state or the second state. According to an embodiment, the visual affordance 2110 may be provided through a designated identification object (e.g., representative object) which enables the external device 201 and/or a capability to be controlled by the external device 201 to be identified. According to an embodiment, the visual affordance 2110 may provide a notification of an operable (or controllable) external device 201 in a pop-up window (e.g., an upper pop-up window) through a designated area (e.g., an upper area) of an execution screen of the electronic device 101. According to an embodiment, the electronic device 101 may include an operation of mapping a function related to control of a capability of the external device 201 to a physical input device, based on a first user input to the visual affordance 2110.

In FIG. 21C, the electronic device 101 may provide a user interface 2120 related to the control of the external device 201, based on a first user input (e.g., swipe down) to the visual affordance 2110. According to an embodiment, the electronic device 101 may provide, based on the first user input to the visual affordance 2110, a guide related to an operable (or controllable) external device 201 and a capability to be controlled by the external device 201, through a designated user interface 2120.

According to an embodiment, the electronic device 101 may always (or automatically) execute a function for control of the external device 201 in a smart home environment (e.g., indoors). According to an embodiment, the electronic device 101 may also directly enter an operation of FIG. 21C from FIG. 21A, without an operation of FIG. 21B. For example, the electronic device 101 in FIG. 21A may operate as shown in FIG. 21E. In an embodiment, FIG. 21E may correspond to the operation of FIG. 21C. For example, the electronic device 101 may directly execute and provide, based on detection of a trigger, a user interface 2120 including a guide related to an operable (or controllable) external device 201 identified during the detection of the trigger, and a capability to be controlled by the external device 201.

In FIG. 21C (or FIG. 21E) and FIG. 21D, the electronic device 201 may control the capability of the external device 201 in response to a second user input. According to an embodiment, the electronic device 101 may detect a second user input, based on a physical input device (e.g., a bezel). According to an embodiment, the electronic device 101 may output information corresponding to capability control, based on the detection of the second user input through the physical input device. According to an embodiment, in response to the detection of the second user input from the physical input device, while controlling the capability of the external device 201 in association with the physical input device, the electronic device 101 may provide a slider 2130 by changing, in response to the capability control, the slider (e.g., increasing/decreasing slider) according to a level (or range) corresponding to a change in the capability controlled by the external device 201 through the user interface.

FIGS. 22A, 22B, 22C, 22D, and 22E illustrate an example of providing a user interface related to control of an external device by an example electronic device according to various embodiments.

According to an embodiment, FIGS. 22A-22E may indicate an example of detecting a trigger, based on a use pattern and/or indoor environment information of the external device 201 of a user by an electronic device 101. According to an embodiment, the electronic device 101 may recommend an operable external device 201 (e.g., an actuator-type device), based on detection of a trigger.

Referring to FIG. 22A, the electronic device 101, in a first state (e.g., a screen-off state) corresponding to a state in which the electronic device is not being operated by a user, or in a second state (e.g., a screen display state) corresponding to a state in which the electronic device is being operated, may detect a trigger (e.g., entrance into a handover control mode) related to control of the external device 201. According to an embodiment, the electronic device 101 may identify an external device 201 which is controllable in a currently given environment (or an area of interest), based on various situation recognition technologies.

In FIG. 22B, the electronic device 101 may provide a corresponding visual affordance 2210 (e.g., GUI), based on the detection of the trigger related to control of the external device 201 in the first state and the second state. For example, the electronic device 101 may recommend (or identify), based on the visual affordance 2210, an external device 201 which can be controlled in a currently given environment (or area of interest). According to an embodiment, a user may recognize, based on the visual affordance 2210, an operable (or controllable) external device 201, and perform a first user input (e.g., an OK button touch) for executing a function of controlling the external device 201. The electronic device 101 may detect entrance (or execution) of a handover control mode related to the control of the external device 201 in response to the first user input.

In FIG. 22C, the electronic device 101 may provide, in response to the first user input, a user interface 2220 related to a capability to be controlled by the external device 201.

In FIGS. 22C, 22D, and 22E, the electronic device 101 may control a capability of the external device 201 in response to the second user input. According to an embodiment, the electronic device 101 may detect a second user input, based on a physical input device (e.g., a bezel). According to an embodiment, the electronic device 101 may output information corresponding to capability control, based on the detection of the second user input through the physical input device. According to an embodiment, in response to the detection of the second user input from the physical input device, while controlling the capability of the external device 201 in association with the physical input device, the electronic device 101 may provide a slider 2230 by changing, in response to the capability control, the slider (e.g., increasing/decreasing slider) according to a level (or range) corresponding to a change in the capability controlled by the external device 201 through the user interface 2220.

FIGS. 23A, 23B, and 23C illustrate an example of providing a user interface related to control of an external device by an example electronic device according to various embodiments.

According to an embodiment, FIGS. 23A-23C may indicate an example of providing a user interface enabling an electronic device 101 to control multiple external devices 201. According to an embodiment, the electronic device 101 may store (or record) information on an operation log (or a use history) of the external device 201 within a predetermined time interval (e.g., a designated log storage time interval, for example, hourly, daily, weekly, monthly, etc.), and provide a list of one or more external devices 201 used or operated during the predetermined time interval.

Referring to FIG. 23A, the electronic device 101 may provide a notification of an operation of the external device 201. For example, the electronic device 101 may provide a visual affordance 2310. According to an embodiment, the electronic device 101 may receive a first user input, based on the visual affordance 2310, and enter into (or execute) a handover control mode related to control of the external device 201, based on the first user input.

In FIG. 23B, the electronic device 101 may provide a user interface 2320 related to a capability to be controlled by the external device 201, in response to the entrance into the handover control mode. According to an embodiment, the user interface 2320 may include an object 2330 (e.g., a representative image and/or text) which enables an external device 201 to be controlled and/or a capability to be controlled by the external device 201 to be identified.

In FIG. 23B, the electronic device 101 may detect a designated input (e.g., a second user input) for invoking a list of controllable external devices 201. According to an embodiment, the electronic device 101 may detect a designated second user input based on a designated button of the electronic device 101 or a designated area (e.g., the position at which the object 2330 is displayed) of the user interface 2320. According to an embodiment, the electronic device 101 may identify at least one external device 201 used or operated for a predetermined time interval and an operation log order thereof, based on the second user input.

In FIG. 23C, the electronic device 101 may provide a list of controllable external devices 201, based on the identified at least one external device 201 and the operation log order thereof. According to an embodiment, when there is one controllable external device 201 in the list, one object 2330 (e.g., a representative image) corresponding to the external device 201 may be provided, as shown in FIG. 23B. According to an embodiment, when there are multiple controllable external devices 201 in the list, multiple objects 2340 corresponding to the multiple external devices 201, respectively, may be provided, as shown in FIG. 23C.

In FIG. 23C, a user may search for and select a controllable external device 201 through the list. According to an embodiment, the electronic device 101 may detect an input (e.g., a third user input) related to the search of the external device 201 from the list. According to an embodiment, the electronic device 101 may provide the multiple objects 2340 by changing the same according to the operation log order (e.g., performing leftward or rightward scrolling), based on a designated third user input (e.g., left or right swipe) from the list. According to an embodiment, the multiple objects 2340 may be shown, on a screen, as being framed in (or slid in) or framed out (or slid out), based on the third user input.

FIGS. 24A, 24B, 24C, 24D, 24E, and 24F illustrate examples of providing a user interface related to control of an external device by an electronic device according to various embodiments.

According to an embodiment, FIGS. 24A-24F may indicate an example of visually providing information (e.g., a collection of capabilities) on multiple capabilities controllable by an external device 201. In an embodiment, FIG. 24A may indicate an example of a first capability collection related to a first external device (e.g., a lighting device) when the external device 201 is the first external device. In an embodiment, FIG. 24D may indicate an example of a second capability collection related to a second external device (e.g., an air conditioner) when the external device 201 is the second external device. For example, a user may selectively control a main capability or a sub capability of the external device 201.

Figure 24C:
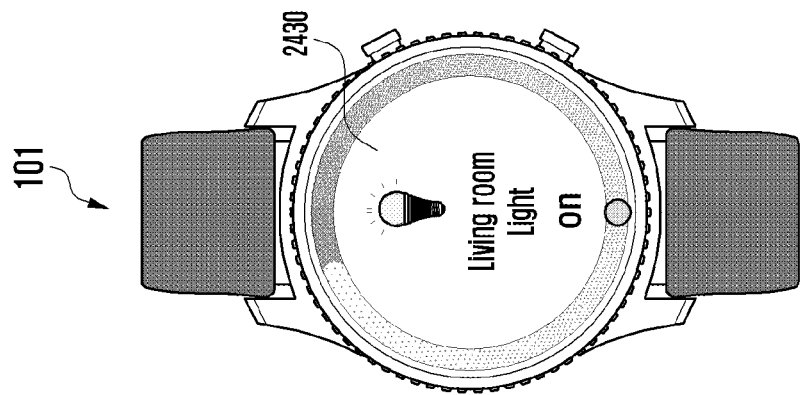
Figure 24B:
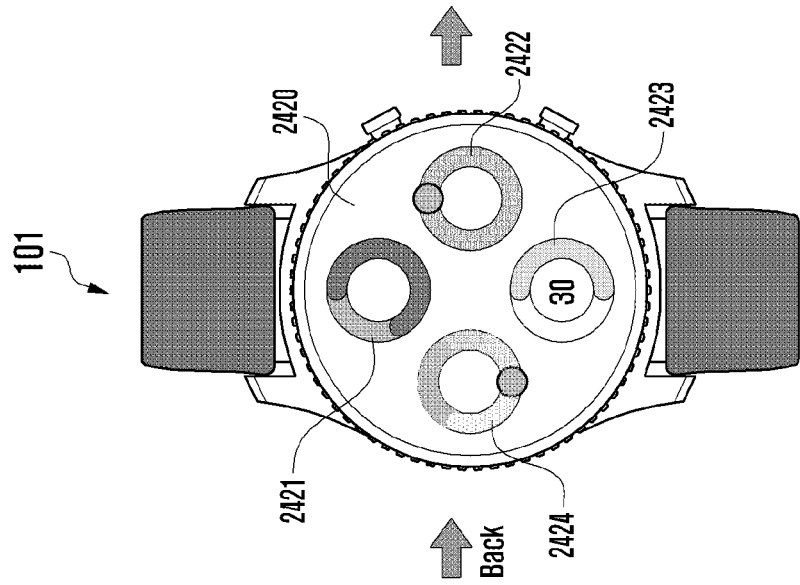
Figure 24A:
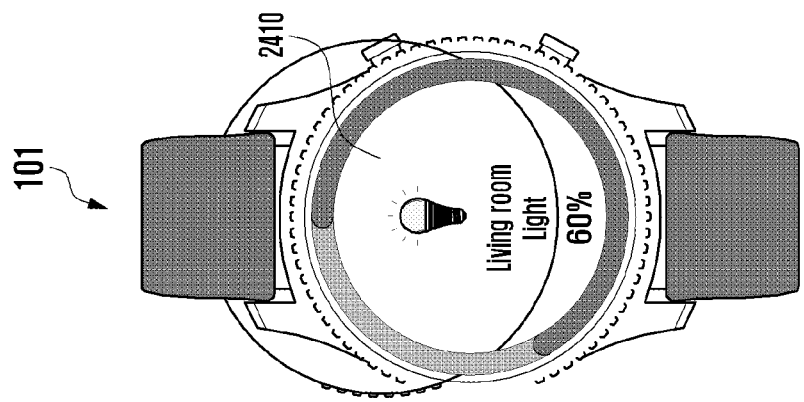

Referring to FIG. 24A, the electronic device 101 may provide a user interface 2410 related to a capability to be controlled by the external device 201 (e.g., the lighting device). According to an embodiment, the user interface 2410 may include an object (e.g., a representative image and/or text) which enables the external device 201 to be controlled and/or a capability to be controlled by the external device 201 to be identified.

In FIG. 24A, the electronic device 101 may detect a designated input (e.g., a first user input (e.g., an input of a back key)) for invoking a collection of capabilities controllable by the external device 201. According to an embodiment, the electronic device 101 may determine a capability controllable by the external device 201, based on the first user input.

In FIG. 24B, the electronic device 101 may provide a designated user interface 2420 for providing a capability collection corresponding to the identified capability. The user interface 2420 may be intuitively provided based on an object (e.g., a representative image) which can indicate each capability of the external device 201. For example, when there are four capabilities controllable by the external device 201, the electronic device 101 may provide a first object 2421 related to a first capability, a second object 2422 related to a second capability, a third object 2423 related to a third capability, and a fourth object 2424 related to a fourth capability by arranging the objects to correspond to a type (e.g., a rotatable type or a button type) of a physical input device.

According to an embodiment, the capabilities controllable by the external device 201 are not limited to four capabilities, at least one object may be included according to the capability controllable by the external device 201, and the arrangement of objects may vary according to the number of controllable capabilities. In an embodiment, a maximum number of displayable capabilities (e.g., a maximum number of capabilities manageable as a capability collection) may be configured. According to an embodiment, each capability-specific object 2421, 2422, 2423, or 2424 may be provided as a representative image through which each capability can be intuitively recognized, and may be provided as a shape corresponding to a shape (e.g., a circle or a bar shape) of a physical input device associated for control of the external device 201.

In FIG. 24C, the electronic device 101 may provide a user interface 2430 related to a capability corresponding to an object selected upon a user input. For example, the electronic device 101 may provide a user interface 2410 related to a first capability (e.g., brightness control) in FIG. 24A, and may provide a user interface 2430 related to a second capability (e.g., color control) in FIG. 24C.

Referring to FIG. 24D, the electronic device 101 may provide user interface 2440 related to a capability to be controlled by the external device 201 (e.g., air conditioner). According to an embodiment, the user interface 2440 may include an object (e.g., a representative image and/or text) which enables the external device 201 to be controlled and/or a capability to be controlled by the external device 201 to be identified.

In FIG. 24D, the electronic device 101 may detect a designated input (e.g., a first user input (e.g., an input of a back key)) for invoking a collection of capabilities controllable by the external device 201. According to an embodiment, the electronic device 101 may determine a capability controllable by the external device 201, based on the first user input.

In FIG. 24E, the electronic device 101 may provide a designated user interface 2450 for providing a capability collection corresponding to the identified capability. The user interface 2450 may be intuitively provided based on an object (e.g., a representative image) which can indicate each capability of the external device 201. For example, when there are four capabilities controllable by the external device 201, the electronic device 101 may provide a first object 2451 related to a first capability, a second object 2452 related to a second capability, a third object 2453 related to a third capability, and a fourth object 2454 related to a fourth capability by arranging the objects to correspond to a type (e.g., a rotatable type or a button type) of a physical input device.

According to an embodiment, the capabilities controllable by the external device 201 are not limited to four capabilities, at least one object may be included according to the capability controllable by the external device 201, and the arrangement of objects may vary according to the number of controllable capabilities. In an embodiment, a maximum number of displayable capabilities (e.g., a maximum number of capabilities manageable as a capability collection) may be configured. According to an embodiment, each capability-specific object 2451, 2452, 2453, or 2454 may be provided as a representative image through which each capability can be intuitively recognized, and may be provided as a shape corresponding to a shape (e.g., a circle or a bar shape) of a physical input device associated for control of the external device 201.

In FIG. 24F, the electronic device 101 may provide a user interface 2460 related to a capability corresponding to an object selected upon a user input. For example, the electronic device 101 may provide a user interface 2440 related to a first capability (e.g., mode control) in FIG. 24D, and may provide a user interface 2460 related to a second capability (e.g., temperature control) in FIG. 24F.

FIGS. 25A and 25B illustrate an example of providing a user interface related to control of an external device by an electronic device according to various embodiments.

According to an embodiment, FIGS. 25A and 25B may indicate an example of providing a user interface enabling an electronic device 101 to control multiple external devices 201. According to an embodiment, the electronic device 101 may store (or record) information on an operation log (or a use history) of the external device 201 within a predetermined time interval (e.g., a designated log storage time interval, for example, hourly, daily, weekly, monthly, etc.), and provide a list of one or more external devices 201 used or operated during the predetermined time interval.

Referring to FIGS. 25A and 25B, the electronic device 101 according to various embodiments may detect a trigger (e.g., entrance into a handover control mode) related to control of the external device 201 in a first state (e.g., a screen-off state or an AOD display state) in which the electronic device 101 is not being operated by a user, or in a second state (e.g., a screen display state) in which the electronic device 101 is being operated, as shown in FIG. 25A.

In FIG. 25A, the electronic device 101 may provide a notification of an operation of the external device 201, based on the detection of the trigger in the first state or the second state. For example, the electronic device 101 may provide a visual affordance 2510. According to an embodiment, the electronic device 101 may receive a first user input, based on the visual affordance 2510, and enter into (or execute) a handover control mode related to control of the external device 201, based on the first user input.

In FIG. 25B, the electronic device 101 may provide a user interface related to a capability to be controlled by the external device 201, in response to the entrance into the handover control mode. According to an embodiment, when providing the user interface, the electronic device 101 may darkly process (e.g., gray-out or perform DIM processing of) a background (e.g., an AOD screen or an execution screen) of the electronic device 101, and provide the user interface so that the entrance into the handover control mode is more visually distinguishable. According to an embodiment, the user interface may include an object 2520 (e.g., a representative image and/or text) which enables the external device 201 to be controlled and/or a capability to be controlled by the external device 201 to be identified.

In FIG. 25B, the electronic device 101 may detect a designated input (e.g., a second user input) for invoking a list of controllable external devices 201. According to an embodiment, the electronic device 101 may detect a designated second user input based on a designated button of the electronic device 101 or a designated area (e.g., the position at which the object is displayed) of the user interface. According to an embodiment, the electronic device 101 may identify at least one external device 201 used or operated for a predetermined time interval and an operation log order thereof, based on the second user input.

The electronic device 101 may provide a list 2520 of controllable external devices 201, based on the identified at least one external device 201 and the operation log order thereof. According to an embodiment, when there is one controllable external device 201 in the list 2520, one object (e.g., a representative image) corresponding to the external device 201 may be provided. According to an embodiment, when there are multiple controllable external devices 201 in the list 2520, multiple objects corresponding to the multiple external devices 201, respectively, may be provided.

A user may search for and select a controllable external device 201 through the list 2520 (e.g., using input devices 2500). According to an embodiment, the electronic device 101 may detect an input (e.g., a third user input) related to the search of the external device 201 from the list 2520. According to an embodiment, the electronic device 101 may provide the multiple objects by changing the same according to the operation log order (e.g., performing upward or downward scrolling), based on a designated third user input from the list. According to an embodiment, the multiple objects may be shown, on a screen, as being framed in (or slid in) or framed out (or slid out), based on the third user input.

Figure 26C:
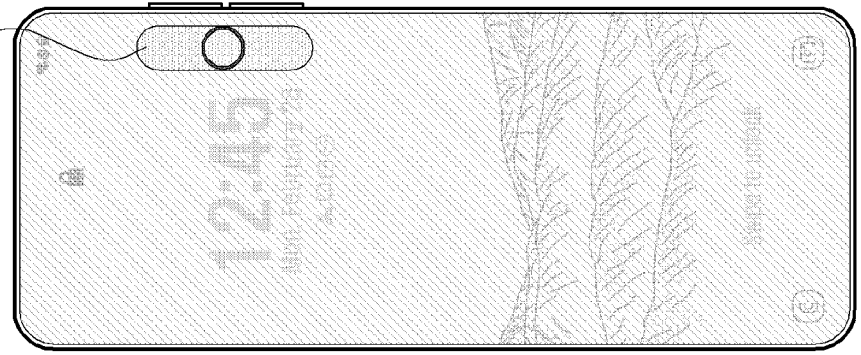
FIGS. 26A, 26B, and 26C illustrate an example user interface related to control of an external device by an example electronic device according to various embodiments.
Figure 26B:
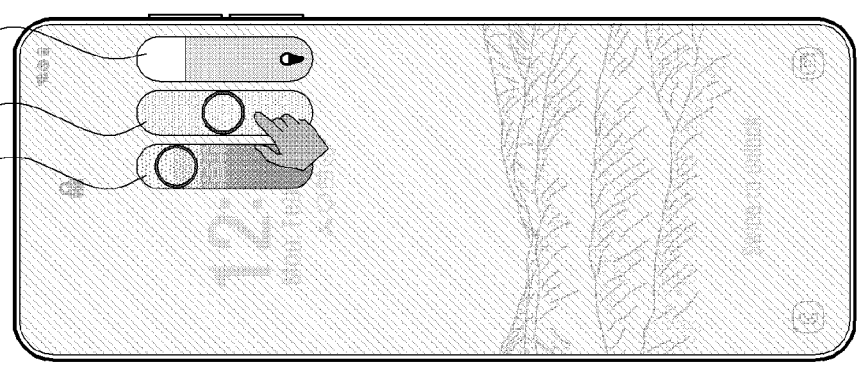
Figure 26A:
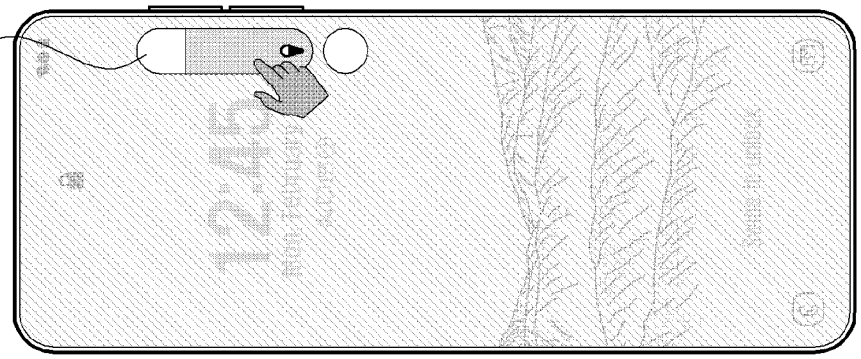

FIGS. 26A, 26B, and 26C illustrate an example user interface related to control of an external device by an example electronic device according to various embodiments.

According to an embodiment, FIGS. 26A-26C may indicate an example of visually providing information (e.g., a collection of capabilities) on multiple capabilities controllable by an external device 201. For example, a user may selectively control a main capability or a sub capability of the external device 201.

Referring to FIG. 26A, the electronic device 101 may provide a user interface 2610 related to a capability to be controlled by the external device 201 (e.g., the lighting device). According to an embodiment, the user interface 2610 may include an object (e.g., a representative image and/or text) which enables the external device 201 to be controlled and/or a capability to be controlled by the external device 201 to be identified.

In FIG. 26A, the electronic device 101 may detect a designated input (e.g., a first user input (e.g., an input of a back key)) for invoking a collection of capabilities controllable by the external device 201. According to an embodiment, the electronic device 101 may determine a capability controllable by the external device 201, based on the first user input.

In FIG. 26B, the electronic device 101 may provide a designated user interface for providing a capability collection corresponding to the identified capability. The user interface may be intuitively provided based on an object (e.g., a representative image) which can indicate each capability of the external device 201. For example, when there are three capabilities controllable by the external device 201, the electronic device 101 may provide a first object 2621 related to a first capability, a second object 2622 related to a second capability, and a third object 2623 related to a third capability, by arranging the objects to correspond to a type (e.g., a rotatable type or a button type) of a physical input device.

According to an embodiment, the capabilities controllable by the external device 201 are not limited to three capabilities, at least one object may be included according to the capability controllable by the external device 201, and the arrangement of objects may vary according to the number of controllable capabilities. In an embodiment, a maximum number of displayable capabilities (e.g., a maximum number of capabilities manageable as a capability collection) may be configured. According to an embodiment, each capability-specific object 2621, 2622, or 2623 may be provided as a representative image through which each capability can be intuitively recognized, and may be provided as a shape corresponding to a shape (e.g., a circle or a bar shape) of a physical input device associated for control of the external device 201.

In FIG. 26C, the electronic device 101 may provide a user interface 2630 related to a capability corresponding to an object selected upon a user input. For example, the electronic device 101 may provide a user interface 2610 related to a first capability (e.g., brightness control) in FIG. 26A, and may provide a user interface 2630 related to a second capability (e.g., color control) in FIG. 26C.

FIGS. 27A, 27B, 27C, and 27D illustrate examples of an operation in a case of using multiple electronic devices according to various embodiments.

According to an embodiment, an electronic device 101 which can control an external device 201 may include multiple devices such as a first electronic device 101A and a second electronic device 101B. According to an embodiment, the electronic device 101 (or the server 301) may determine the most suitable (or the optimal) electronic device 101 for controlling the external device 201, among the multiple electronic devices 101A and 101B, based on recognition of various situations, and perform an operation related to control of the external device 201, based on the determined electronic device 101.

According to an embodiment, a trigger related to control of the external device 201 may be detected by the multiple electronic devices 101A and 101B, and each notification thereof may be provided. According to an embodiment, a user may determine a target electronic device 101 for controlling the external device 201, among the multiple electronic devices 101A and 101B, and perform an operation related to control of the external device 201, based on the determined electronic device 101.

According to an embodiment, FIGS. 27A-27D may indicate an example of an operation in a case of activating a handover control mode (e.g., displaying a visual affordance) when the first electronic device 101A and the second electronic device 101B are not being used by a user.

FIGS. 27A-27D may indicate an example of detecting a trigger (e.g., entrance into a handover control mode) related to control of each external device 201 in a state in which the first electronic device 101A and the second electronic device 101B are not being used. According to an embodiment, the first electronic device 101A and the second electronic device 101B may identify an external device 201 controllable in a currently given environment (or an area of interest), based on various situation recognition technologies.

Figure 27B:
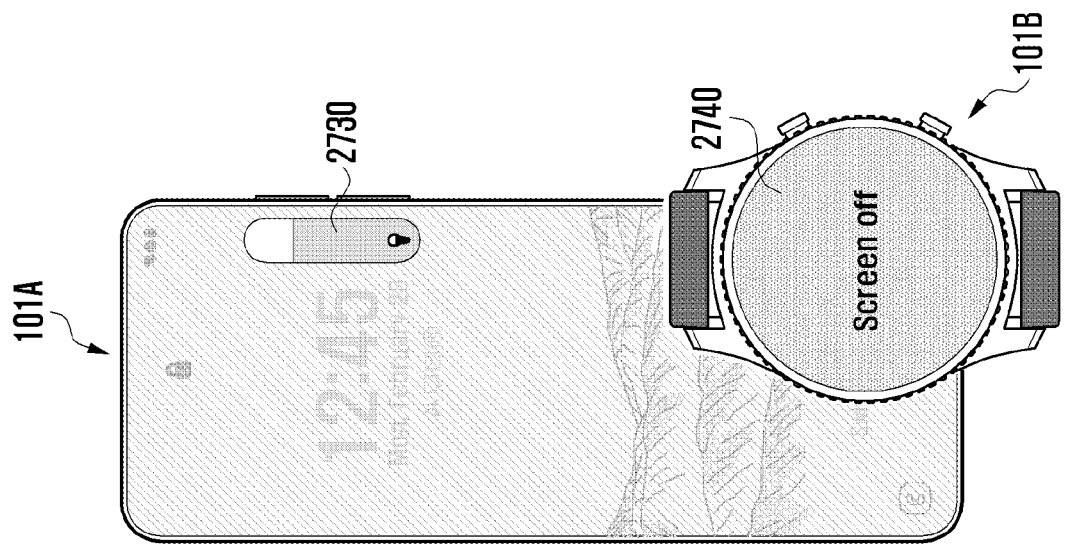
FIGS. 27A, 27B, 27C, and 27D illustrate example operations in a case of using multiple example electronic devices according to various embodiments.
Figure 27A:
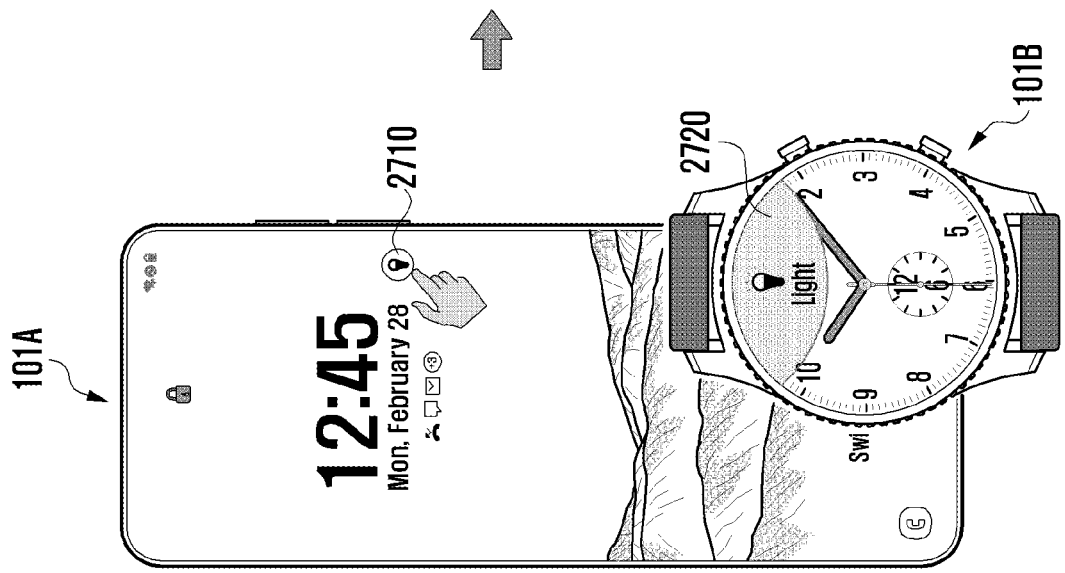
Figure 27C:
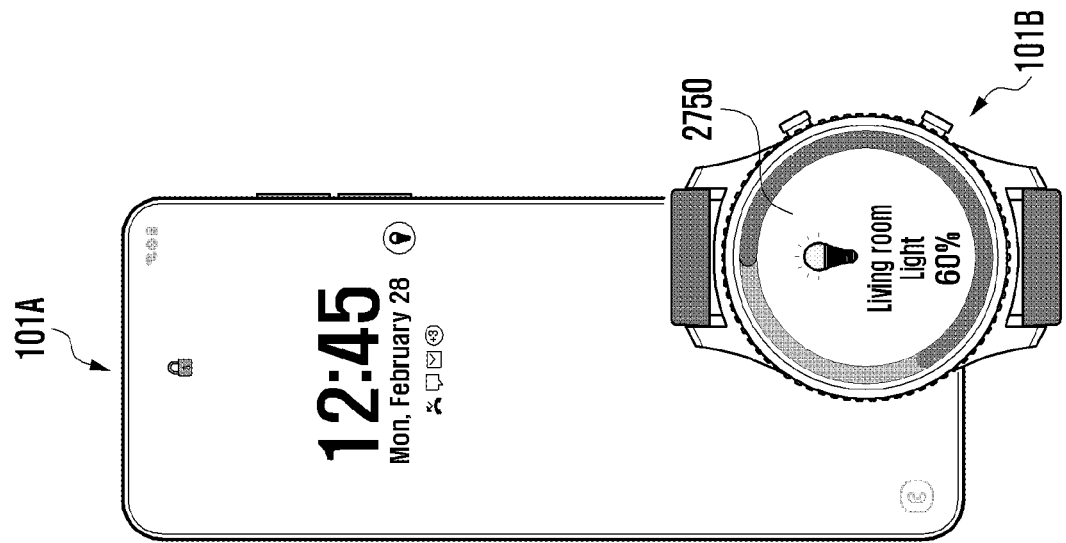

In FIG. 27A or 27C, the first electronic device 101A and the second electronic device 101B may provide corresponding visual affordances 2710 and 2720, respectively, based on the detection of the trigger related to the control of the external device 201. For example, the first electronic device 101A may recommend (or identify) an external device 201 controllable in a currently given environment (e.g., an area of interest), based on a first visual affordance 2710. For example, the second electronic device 101B may recommend an external device 201 controllable in a currently given environment (e.g., an area of interest), based on a second visual affordance 2720. According to an embodiment, an electronic device 101 for executing a control function of the external device 201 may be selected automatically, or by a user.

According to an embodiment, FIGS. 27A and 27B may indicate an example in which the first electronic device 101A is selected as a target electronic device 101 for controlling the external device 201. According to an embodiment, FIGS. 27C and 27D may indicate an example in which the second electronic device 101B is selected as a target electronic device 101 for controlling the external device 201.

Referring to FIGS. 27A and 27B, a user may make determination so that the first electronic device 101A executes control of the external device 201. For example, the user may perform a user input, based on the visual affordance 2710 provided through the first electronic device 101A.

According to an embodiment, in FIG. 27A, the first electronic device 101A may detect entrance into (or execution of) a handover control mode related to control of the external device 201 in response to the user input, and provide a user interface 2730 related to a capability to be controlled by the external device 201, in response to the user input. According to an embodiment, the user interface 2730 may be visually provided by including information related a current level (or range) related to the capability to be controlled by the external device 201. According to an embodiment, when providing the user interface 2730, the first electronic device 101A may darkly process (e.g., gray-out or perform DIM processing of) a background of the first electronic device 101A, and provide the user interface 2730 to be more visually distinguishable.

According to an embodiment, in FIG. 27B, when the first electronic device 101A enters into (or execute) the handover control mode, the second electronic device 101B may turn off a screen of the second electronic device 101B. According to an embodiment, the first electronic device 101A and the second electronic device 101B may identify mutual operation states (e.g., whether the entrance into the handover control mode is performed) through designated wireless communication, or may identify mutual operation states, based on control by the server 301.

Figure 27D:
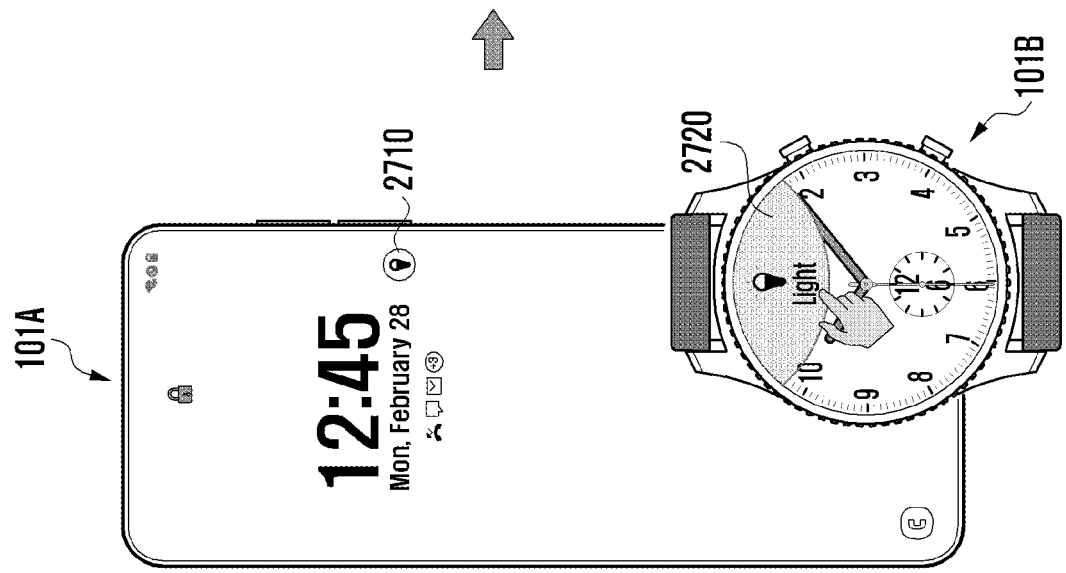

Referring to FIGS. 27C and 27D, the user may make determination so that the second electronic device 101B executes control of the external device 201. For example, the user may perform a user input, based on the visual affordance 2720 provided through the second electronic device 101B.

According to an embodiment, in FIG. 27C, the second electronic device 101B may detect entrance into (or execution of) a handover control mode related to control of the external device 201 in response to the user input, and provide a user interface 2750 related to a capability to be controlled by the external device 201, in response to the user input, in FIG. 27D. According to an embodiment, the user interface 2750 may be visually provided by including information related a current level (or range) related to the capability to be controlled by the external device 201.

According to an embodiment, in FIG. 27D, when the second electronic device 101B enters into (or execute) the handover control mode, the first electronic device 101A may turn off a screen of the first electronic device 101A. According to an embodiment, the first electronic device 101A and the second electronic device 101B may identify mutual operation states (e.g., whether the entrance into the handover control mode is performed) through designated wireless communication, or may identify mutual operation states, based on control by the server 301.

According to an embodiment, as illustrated in FIGS. 27A-27D, when the external device 201 is controllable by multiple electronic devices 101 such as the first electronic device 101A and the second electronic device 101B, the multiple electronic devices 101 may determine whether to execute a function of controlling the external device 201, based on interaction between the multiple electronic devices. According to an embodiment, based on a result of the determination, the multiple electronic devices 101 may provide a related user interface when performing control of the external device 201 is determined, or may switch a mode to a standby mode when control of the external device 201 is determined to be performed by another electronic device.

FIGS. 28A, 28B, 28C, 28D, 28E, and 28F illustrate examples of an operation in a case of using multiple example electronic devices according to various embodiments.

According to an embodiment, an electronic device 101 which can control an external device 201 may include multiple devices such as a first electronic device 101A and a second electronic device 101B. According to an embodiment, the electronic device 101 (or the server 301) may determine the most suitable (or the optimal) electronic device 101 for controlling the external device 201, among the multiple electronic devices 101A and 101B, based on recognition of various situations, and perform an operation related to control of the external device 201, based on the determined electronic device 101.

According to an embodiment, a trigger related to control of the external device 201 may be detected by the multiple electronic devices 101A and 101B, and each notification thereof may be provided. According to an embodiment, a user may determine a target electronic device 101 for controlling the external device 201, among the multiple electronic devices 101A and 101B, and perform an operation related to control of the external device 201, based on the determined electronic device 101.

According to an embodiment, FIGS. 28A-28F may indicate an example of an operation in a case of activating a handover control mode (e.g., displaying a visual affordance) when the first electronic device 101A and the second electronic device 101B are being used by a user.

Figure 28A:
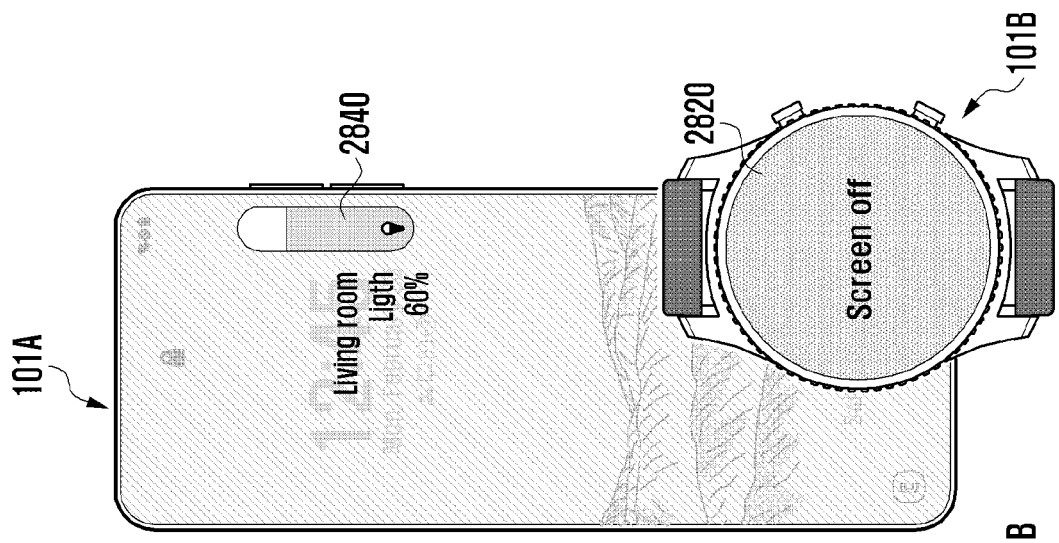
FIGS. 28A, 28B, 28C, 28D, 28E, and 28F illustrate example operations in a case of using multiple example electronic devices according to various embodiments.
Figure 28B:
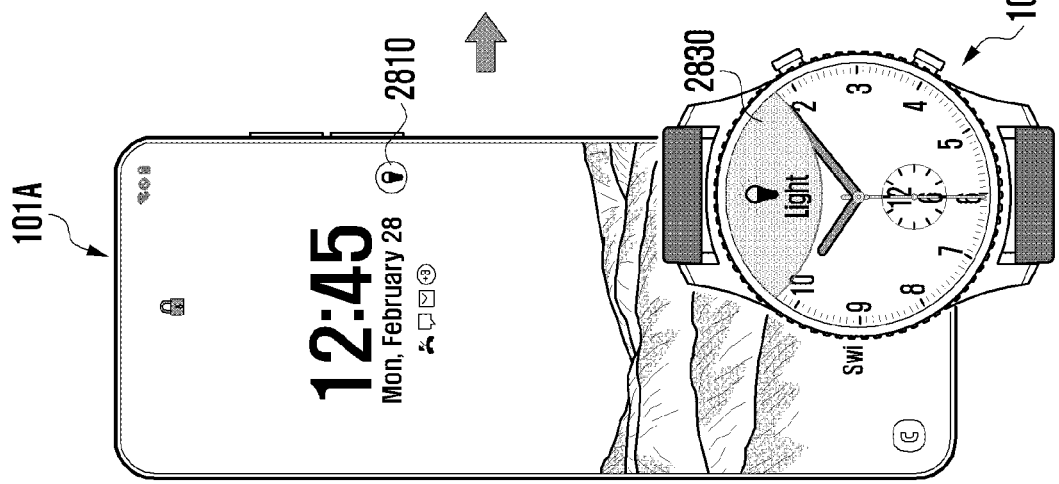
Figure 28C:
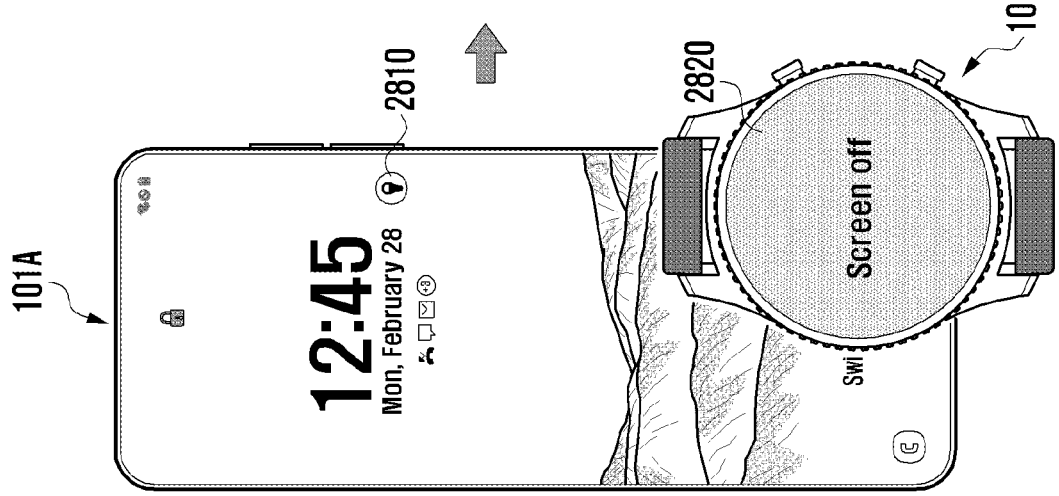
Figure 28D:
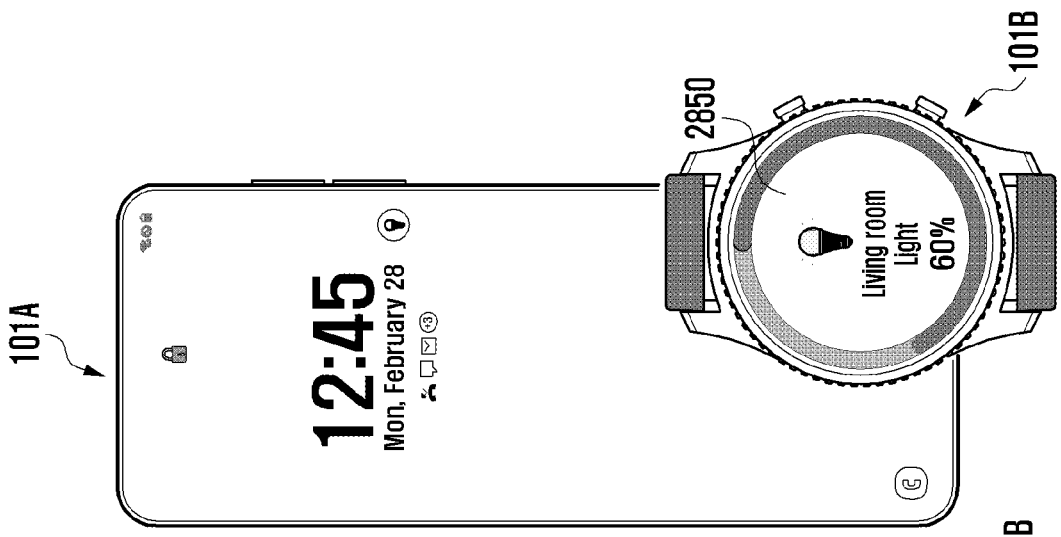
Figure 28E:
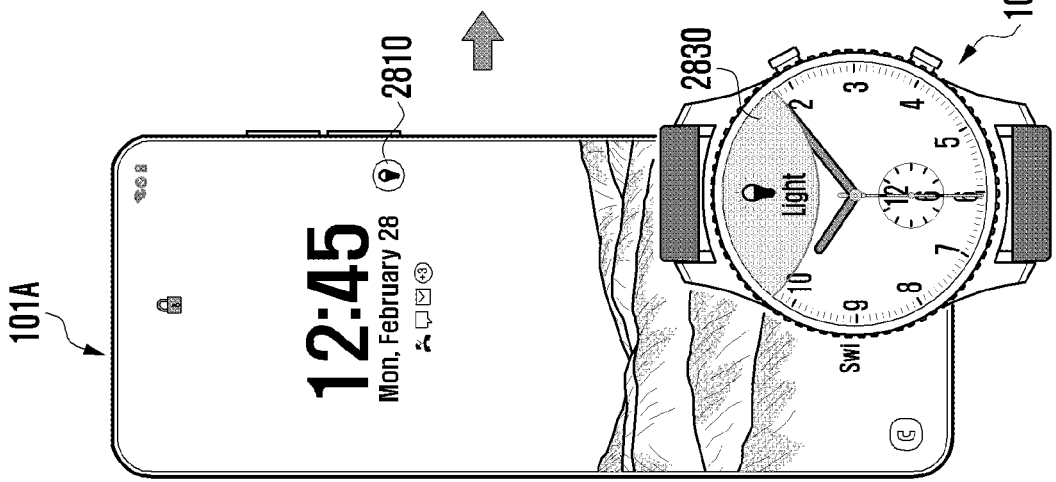
Figure 28F:
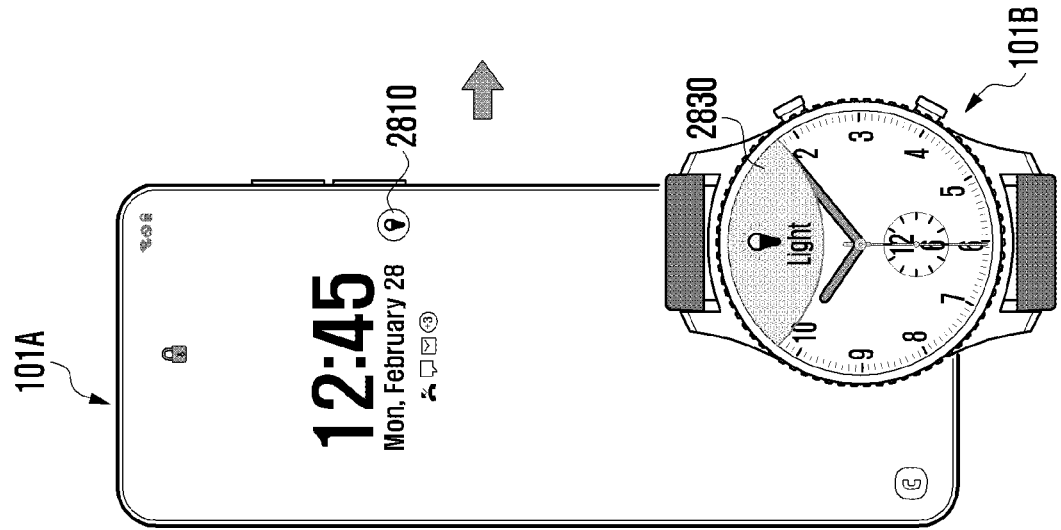

, FIGS. 28A-28C may indicate an example of detecting a trigger (e.g., entrance into a handover control mode) related to control of each external device 201 in a state in which the first electronic device 101A is being used and the second electronic device 101B is not being used (e.g., is in a screen-off state). FIGS. 28D-28F may indicate an example of detecting a trigger (e.g., entrance into a handover control mode) related to control of each external device 201 in a state in which the first electronic device 101A is not being used (e.g., is in a screen-off state and/or an AOD display state) and the second electronic device 101B is being used. According to an embodiment, the first electronic device 101A and the second electronic device 101B may identify an external device 201 controllable in a currently given environment (or an area of interest), based on various situation recognition technologies.

In FIG. 28A, the first electronic device 101A and the second electronic device 101B may detect a trigger related to control of the external device 201. According to an embodiment, the first electronic device 101A in the use state may provide a corresponding visual affordance 2810. According to an embodiment, the second electronic device 101B in the non-use state may configure a standby mode related to control of the external device 201, based on the detection of the trigger related to the control of the external device 201. According to an embodiment, the second electronic device 101B in the non-use state may be in a screen-off state 2820. For example, the first electronic device 101A may recommend or identify an external device 201 controllable in a currently given environment (or an area of interest), based on the visual affordance 2810. For example, in the standby state, the second electronic device 101B may wait for a designated user input for wake-up of the second electronic device 101B. According to an embodiment, an electronic device 101 for executing a control function of the external device 201 may be selected automatically, or by a user.

In FIG. 28B, in the standby mode state, the second electronic device 101B may detect a designated user input (e.g., lifting up the electronic device 101, touching a screen, or controlling a physical input device) for wake-up of the second electronic device 101B. According to an embodiment, the second electronic device 101B may provide a corresponding visual affordance 2830, based on the detection of the designated user input. For example, the first electronic device 101A that is in the use state and the second electronic device 101B that is switched to the use state may provide corresponding visual affordances 2810 and 2830, respectively.

According to an embodiment, FIGS. 28A-28C may indicate an example in which the first electronic device 101A is selected as a target electronic device 101 for controlling the external device 201. According to an embodiment, a user may make a determination so that the first electronic device 101A executes control of the external device 201. For example, the user may perform a user input, based on the visual affordance 2810 provided through the first electronic device 101A.

According to an embodiment, in FIG. 28C, the first electronic device 101A may detect entrance into (or execution of) a handover control mode related to control of the external device 201 in response to the user input, and provide a user interface 2840 related to a capability to be controlled by the external device 201, in response to the user input. According to an embodiment, the user interface 2840 may be visually provided by including information related a current level (or range) related to the capability to be controlled by the external device 201. According to an embodiment, when providing the user interface 2840, the first electronic device 101A may darkly process (e.g., grayout or perform DIM processing of) a background of the first electronic device 101A, and provide the user interface 2840 to be more visually distinguishable.

According to an embodiment, in FIG. 28C, when the first electronic device 101A enters into (or executes) the handover control mode, the second electronic device 101B may switch the state of a screen of the second electronic device 101B into a screen-off 2820 state. According to an embodiment, the first electronic device 101A and the second electronic device 101B may identify mutual operation states (e.g., whether the entrance into the handover control mode is performed) through designated wireless communication, or may identify mutual operation states, based on control by the server 301.

In FIG. 28D, the first electronic device 101A and the second electronic device 101B may detect a trigger related to control of the external device 201. According to an embodiment, the first electronic device 101A in the non-use state and the second electronic device 101B in the use state may provide corresponding visual affordances 2810 and 2830, respectively. According to an embodiment, the first electronic device 101A in the non-use state may be in a screen-off state. For example, the first electronic device 101A and the second electronic device 101B may recommend or identify an external device 201 controllable in a currently given environment (or an area of interest), based on the visual affordances 2810 and 2830. According to an embodiment, an electronic device 101 for executing a control function of the external device 201 may be selected automatically, or by a user.

In FIG. 28E, in the standby mode state, the first electronic device 101A may detect a designated user input (e.g., touching a screen or controlling a physical input device) for wake-up of the first electronic device 101A. According to an embodiment, the first electronic device 101A may provide, based on the detection of the designated user input, a corresponding visual affordance 2810 together with the second electronic device 2830. For example, the first electronic device 101A that is switched to the use state and the second electronic device 101B that is in the use state may provide corresponding visual affordances 2810 and 2830, respectively.

According to an embodiment, FIGS. 28D-28F may indicate an example in which the second electronic device 101B is selected as a target electronic device 101 for controlling the external device 201. According to an embodiment, a user may make determination so that the second electronic device 101B executes control of the external device 201. For example, the user may perform a user input, based on the visual affordance 2830 provided through the second electronic device 101B.

According to an embodiment, in FIG. 28F, the second electronic device 101B may detect entrance into (or execution of) a handover control mode related to control of the external device 201 in response to the user input, and provide a user interface 2850 related to a capability to be controlled by the external device 201, in response to the user input. According to an embodiment, the user interface 2850 may be visually provided by including information related a current level (or range) related to the capability to be controlled by the external device 201.

According to an embodiment, in FIG. 28F, when the second electronic device 101B enters into (or executes) the handover control mode, the first electronic device 101A may switch the state of a screen of the first electronic device 101A into a screen-off state. According to an embodiment, the first electronic device 101A and the second electronic device 101B may identify mutual operation states (e.g., whether the entrance into the handover control mode is performed) through designated wireless communication, or may identify mutual operation states, based on control by the server 301.

According to an embodiment, as illustrated in FIGS. 28A-28F, when the external device 201 is controllable by multiple electronic devices 101 such as the first electronic device 101A and the second electronic device 101B, the multiple electronic devices 101 may determine whether to execute a function of controlling the external device 201, based on interaction between the multiple electronic devices. According to an embodiment, based on a result of the determination, the multiple electronic devices 101 may provide a related user interface when performing control of the external device 201 is determined, or may switch a mode to a standby mode when control of the external device 201 is determined to be performed by another electronic device.

FIGS. 29A, 29B, 29C, 29D, 29E, and 29F illustrate examples of mapping a function of a physical input device by an example electronic device according to various embodiments.

FIGS. 29A-29F may indicate examples of mapping a function of a designated physical input device 2900 related to control of an external device 201 by an electronic device 101, based on detection of a trigger (e.g., entrance into a handover control mode) related to control of the external device 201 by the electronic device 101. In an embodiment, FIGS. 29A-29F may indicate an example in which the electronic device 101 is a smartphone.

Figure 29A:
Figure 29B:

According to an embodiment, the electronic device 101 may have an application (e.g., a media application) which is being executed in the background or foreground and is controlled by a physical input device 2900 in the electronic device 101, in a screen-off state as shown in FIG. 29A or a screen display state as shown in FIG. 29B. For example, the physical input device 2900 of the electronic device 101 may be mapped to a designated first function (e.g., a default function, for example, volume control) so as to operate in the application. For example, the electronic device 101 may operate to cause the physical input device 2900 to preferentially control the designated first function, before entering into a handover control mode.

According to an embodiment, in FIG. 29C, the electronic device 101 may receive a user input in the state of FIG. 29A or FIG. 29B, based on a visual affordance. According to an embodiment, in FIG. 29D, the electronic device 101 may provide a user interface related to a capability to be controlled by the external device 201, in response to the user input.

According to an embodiment, the electronic device 101 may map the physical input device 2900 to a function related to control of a capability of the external device 201, based on the user input. For example, the electronic device 101 may operate to cause the physical input device 2900 to preferentially control a designated second function, in a state in which the handover control mode is activated. For example, the electronic device 101 may change a function of the physical input device 2900. According to an embodiment, the electronic device 101 may change a first function (e.g., a default function, for example, volume control) designated for the physical input device 2900 of the electronic device 101 to operate to a designated second function (e.g., controlling brightness of a lighting device) related to control of a capability of the external device 201 (or may be associated with the physical input device 2900 of the external device 201 to control the capability of the external device 201). According to an embodiment, the electronic device 101 may release the first function mapped to the physical input device 2900, and perform mapping (or change) so that the physical input device 2900 operates as the second function (e.g., a device capability control function) related to the capability of the external device 201.

According to an embodiment, in FIG. 29E, the electronic device 101 may deactivate (or release) the handover control mode, based on the user input. According to an embodiment, in FIG. 29F, the electronic device 101 may operate to cause the physical input device 2900 to preferentially control a designated first function, in a state in which the handover control mode is deactivated. For example, the electronic device 101 may change the function of the physical input device 2900. According to an embodiment, the electronic device 101 may change the second function designated for the physical input device 2900 of the electronic device 101 to operate to the designated first function. According to an embodiment, the electronic device 101 may release the second function mapped to the physical input device 2900, and perform mapping (or change) so that the physical input device 2900 operates as the first function.

FIGS. 30A, 30B, 30C, 30D, and 30E illustrate examples of mapping a function of a physical input device by an example electronic device according to various embodiments.

FIGS. 30A-30E may indicate examples of mapping a function of a designated physical input device 3000 related to control of an external device by an electronic device 101, based on detection of a trigger (e.g., entrance into a handover control mode) related to control of the external device 201 by the electronic device 101. In an embodiment, FIGS. 30A-30F may indicate an example in which the electronic device 101 is a watch.

Figure 30A:
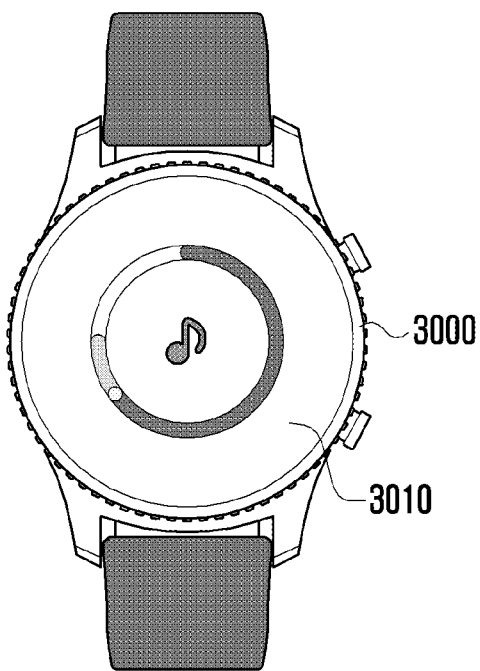
FIGS. 30A, 30B, 30C, 30D, and 30E illustrate examples of mapping a function of a physical input device by an example electronic device according to various embodiments.

According to an embodiment, in FIG. 30A, the electronic device 101 may have an application (e.g., a media application) which is being executed in the background or foreground and is controlled by a physical input device 3000 in the electronic device 101, in a screen-off state or a screen (e.g., application execution screen 3010) display state. For example, the physical input device 3000 of the electronic device 101 may be mapped to a designated first function (e.g., a default function, for example, volume control) so as to operate in the application. For example, the electronic device 101 may operate to cause the physical input device 3000 to preferentially control the designated first function, before entering into a handover control mode.

Figure 30B:
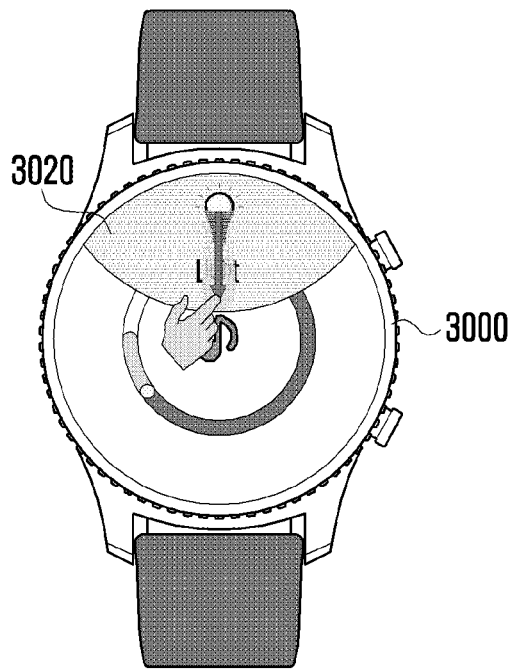
Figure 30C:
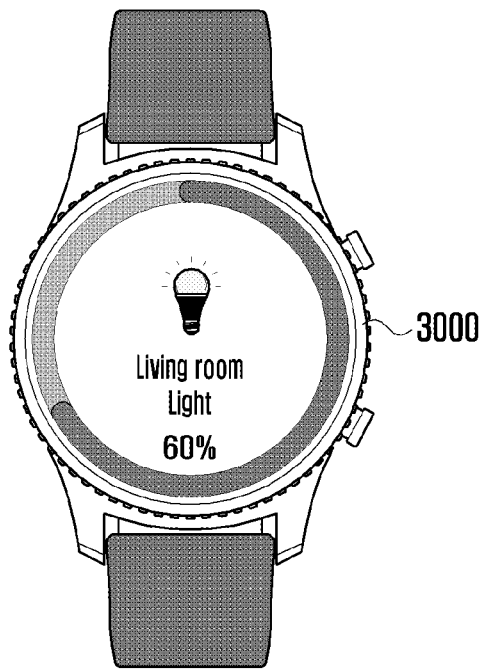

According to an embodiment, in FIG. 30B, the electronic device 101 may receive a user input, based on a visual affordance 3020. According to an embodiment, in FIG. 30C, the electronic device 101 may provide a user interface related to a capability to be controlled by the external device 201, in response to the user input.

According to an embodiment, the electronic device 101 may map the physical input device 3000 to a function related to control of a capability of the external device 201, based on the user input. For example, the electronic device 101 may operate to cause the physical input device 3000 to preferentially control a designated second function, in a state in which the handover control mode is activated. For example, the electronic device 101 may change a function of the physical input device 3000. According to an embodiment, the electronic device 101 may change a first function (e.g., a default function, for example, volume control) designated for the physical input device 3000 of the electronic device 101 to operate to a designated second function (e.g., controlling brightness of a lighting device) related to control of a capability of the external device 201 (or may be associated with the physical input device 3000 of the external device 201 to control the capability of the external device 201). According to an embodiment, the electronic device 101 may release the first function mapped to the physical input device 3000, and perform mapping (or change) so that the physical input device 3000 operates as the second function (e.g., a device capability control function) related to the capability of the external device 201.

Figure 30D:
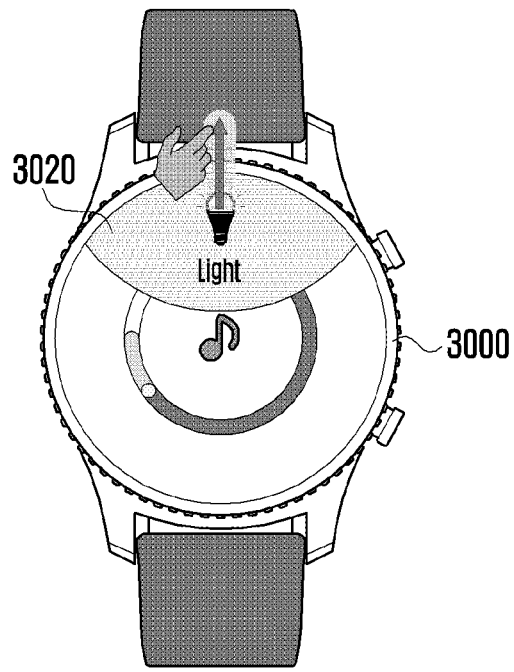
Figure 30E:
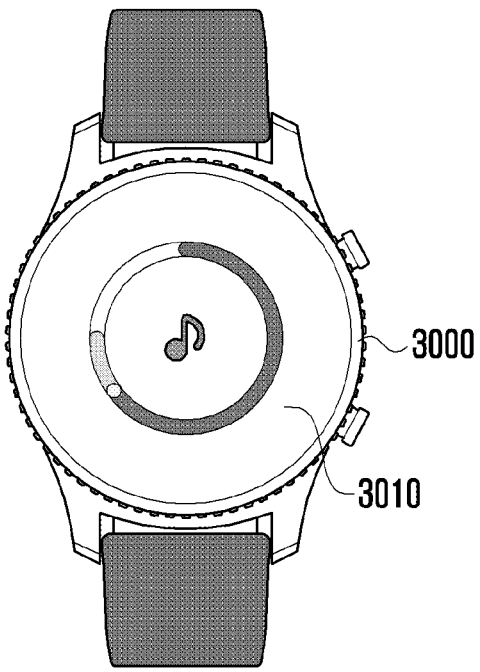

According to an embodiment, in FIG. 30D, the electronic device 101 may deactivate (or release) the handover control mode, based on the user input. According to an embodiment, in FIG. 30E, the electronic device 101 may operate to cause the physical input device 3000 to preferentially control a designated first function, in a state in which the handover control mode is deactivated. For example, the electronic device 101 may change the function of the physical input device 3000. According to an embodiment, the electronic device 101 may change the second function designated for the physical input device 3000 of the electronic device 101 to operate to the designated first function. According to an embodiment, the electronic device 101 may release the second function mapped to the physical input device 3000, and perform mapping (or change) so that the physical input device 3000 operates as the first function.

An operation method performed by an electronic device 101 according to an embodiment of the disclosure may include: detecting a trigger related to control of an external device 201 from the electronic device 101; identifying, based on the detection of the trigger, a capability to be controlled by the external device 201; changing a first function configured to cause a designated physical input device of the electronic device 101 to operate, to a second function related to control of the identified capability of the external device 201; and controlling, based on detection of a user input through the physical input device, the capability of the external device 201.

According to an embodiment, the controlling may include: in response to the detection of the user input from the physical input device, controlling the capability of the external device in association with the physical input device; and displaying a user interface corresponding to the capability control through a display module.

According to an embodiment, the controlling may include: detecting a user input through the physical input device; generating, based on the detection of the user input, a command corresponding to the user input; and transmitting the command to the external device through the communication circuit.

According to an embodiment, the transmitting may include: executing the second function corresponding to an operation of the physical input device; and transmitting a command corresponding to the execution of the second function to the external device through designated communication.

According to an embodiment, the operation method performed by the electronic device 101 may include: identifying a capability to be controlled by the external device; and displaying a user interface related to control of the identified capability through a display module.

According to an embodiment, the displaying may include providing, based on the detection of the trigger related to control of the external device, a corresponding visual affordance.

According to an embodiment, the visual affordance may include a representative image and/or text which enables the external device and/or the capability to be controlled by the external device to be identified.

According to an embodiment, the displaying may include: mapping, based on a user input based on the visual affordance, the physical input device to a function related to the control of the capability of the external device; and displaying a user interface related to the capability of the external device.

According to an embodiment, the user interface may visually provide information related to a current level related to the capability to be controlled by the external device.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein

What is claimed is:

1. An electronic device comprising:
   communication circuitry;
   a display;
   a physical input interface;
   one or more processors; and
   memory storing instructions that, when executed by the one or more processors, cause the electronic device to perform operations comprising:
   detecting a trigger related to external device control;
   performing situation recognition related to at least one external device;
   identifying, based on a result of the situation recognition, an external device and a capability of the external device to be controlled;
   displaying a user interface related to control of the identified capability of the identified external device on the display, the user interface including at least one object related to control of the identified capability based on the result of the situation recognition as a priority;
   changing a function associated with the physical input interface from a first function related to control of the electronic device to a second function different from the first function and related to control of the identified capability of the identified external device; and
   controlling, based on detection of an input to the physical input interface, the identified capability of the identified external device.

2. The electronic device of claim 1, comprising memory storing instructions that, when executed by the one or more processors, cause the electronic device to perform operations comprising:
   in response to the detection of the input to the physical input interface, controlling the capability of the identified external device in association with the physical input interface; and
   displaying a user interface corresponding to the capability control on the display.

3. The electronic device of claim 1, comprising memory storing instructions that, when executed by the one or more processors, cause the electronic device to perform operations comprising:
   detecting the input to the physical input interface;
   generating, based on the detection of the input, a command corresponding to the input; and
   transmitting the command to the identified external device through the communication circuitry.

4. The electronic device of claim 3, comprising memory storing instructions that, when executed by the one or more processors, cause the electronic device to perform operations comprising:
   executing the second function; and
   transmitting a command corresponding to the execution of the second function to the external device through designated communication.

5. The electronic device of claim 4, comprising memory storing instructions that, when executed by the one or more processors, cause the electronic device to perform operations comprising directly transmitting the command to the identified external device, or indirectly transmitting the command to the identified external device through a designated server.

6. The electronic device of claim 1, comprising memory storing instructions that, when executed by the one or more processors, cause the electronic device to perform operations comprising providing, based on the detection of the trigger, a visual affordance,
   wherein the visual affordance comprises a representative image and/or text enabling identification of the external device and/or the capability to be controlled.

7. The electronic device of claim 6, wherein the visual affordance is provided in an area adjacent to the physical input interface.

8. The electronic device of claim 6, comprising memory storing instructions that, when executed by the one or more processors, cause the electronic device to perform operations comprising providing, based on a designated area on a screen displayed on the display, the visual affordance in a pop-up window.

9. The electronic device of claim 6, comprising memory storing instructions that, when executed by the one or more processors, cause the electronic device to perform operations comprising:
  mapping, based on an input based on the visual affordance, the physical input interface to a function related to control of the capability of the identified external device; and
  displaying a user interface related to the capability of the identified external device.

10. The electronic device of claim 9, comprising memory storing instructions that, when executed by the one or more processors, cause the electronic device to perform operations comprising:
  releasing the first function mapped to the physical input interface; and
  performing mapping so that the physical input interface operates the second function related to the capability of the identified external device.

11. The electronic device of claim 9, wherein the user interface is configured to visually provide information related to a current level related to the capability to be controlled.

12. The electronic device of claim 9, comprising memory storing instructions that, when executed by the one or more processors, cause the electronic device to perform operations comprising:
  darkly processing a background of the electronic device when providing the user interface; and
  visually distinguishing the user interface.

13. An operation method of an electronic device, the method comprising:
  detecting a trigger related to external device control;
  performing situation recognition related to at least one external device;
  identifying, based on a result of the situation recognition, an external device and a capability of the external device to be controlled;
  displaying a user interface related to control of the identified capability of the identified external device on a display, the user interface including at least one object related to control of the identified capability based on the result of the situation recognition as a priority;
  changing a function associated with a physical input interface from a first function related to control of the electronic device to a second function different from the first function and related to control of the identified capability of the identified external device; and
  controlling, based on detection of an input to the physical input interface, the identified capability of the identified external device.

14. The method of claim 13, comprising:
  in response to the detection of the input to the physical input interface, controlling the capability of the identified external device in association with the physical input interface; and
  displaying a user interface corresponding to the capability control on the display.

15. The method of claim 13, comprising:
  detecting the to the physical input interface;
  generating, based on the detection of the input, a command corresponding to the input; and
  transmitting the command to the identified external device through communication circuitry of the electronic device.

16. The method of claim 15, comprising:
  executing the second function corresponding to an operation of the physical input interface; and
  transmitting a command corresponding to the execution of the second function to the external device through designated communication.

17. The method of claim 15, wherein the displaying comprises providing, based on the detection of the trigger, a visual affordance, and
  wherein the visual affordance comprises a representative image and/or text enabling identification of the external device and/or the capability to be controlled.

18. The method of claim 15, wherein the displaying comprises:
  mapping, based on an input based on the visual affordance, the physical input interface to a function related to the control of the capability of the identified external device; and
  displaying a user interface related to the capability of the identified external device,
  wherein the user interface is configured to visually provide information related to a current level related to the capability to be controlled.

* * * * *